June 12, 1962 H. C. HANSEN 3,038,727

RECORD FEEDING ARRANGEMENTS

Filed Aug. 25, 1955 59 Sheets-Sheet 1

INVENTOR

Hans Christian Hansen

BY Dicke and Craig

ATTORNEYS

INVENTOR.

HANS CHRISTIAN HANSEN

BY

Dicke and Craig

ATTORNEYS.

RECORD FEEDING ARRANGEMENTS

Filed Aug. 25, 1955 59 Sheets-Sheet 3

INVENTOR.
HANS CHRISTIAN HANSEN
BY
Dicke and Craig
ATTORNEYS.

June 12, 1962 H. C. HANSEN 3,038,727

RECORD FEEDING ARRANGEMENTS

Filed Aug. 25, 1955 59 Sheets-Sheet 4

INVENTOR

Hans Christian Hansen

BY Dicke and Craig

ATTORNEYS

June 12, 1962 H. C. HANSEN 3,038,727

RECORD FEEDING ARRANGEMENTS

Filed Aug. 25, 1955 59 Sheets-Sheet 5

INVENTOR

Hans Christian Hansen

BY Dicke and Craig

ATTORNEYS

June 12, 1962 H. C. HANSEN 3,038,727

RECORD FEEDING ARRANGEMENTS

Filed Aug. 25, 1955 59 Sheets-Sheet 6

INVENTOR

Hans Christian Hansen

BY Dicke and Craig

ATTORNEYS

June 12, 1962 H. C. HANSEN 3,038,727

RECORD FEEDING ARRANGEMENTS

Filed Aug. 25, 1955 59 Sheets-Sheet 7

INVENTOR.
HANS CHRISTIAN HANSEN
BY Dicke and Craig
ATTORNEYS.

June 12, 1962 H. C. HANSEN 3,038,727

RECORD FEEDING ARRANGEMENTS

Filed Aug. 25, 1955 59 Sheets-Sheet 8

INVENTOR

Hans Christian Hansen

BY Dicke and Craig

ATTORNEYS

June 12, 1962 H. C. HANSEN 3,038,727

RECORD FEEDING ARRANGEMENTS

Filed Aug. 25, 1955 59 Sheets-Sheet 9

INVENTOR

Hans Christian Hnasen

BY Dicke and Craig

ATTORNEYS

June 12, 1962 H. C. HANSEN 3,038,727

RECORD FEEDING ARRANGEMENTS

Filed Aug. 25, 1955 59 Sheets-Sheet 10

INVENTOR.
HANS CHRISTIAN HANSEN
BY Dicke and Craig
ATTORNEYS

June 12, 1962 H. C. HANSEN 3,038,727

RECORD FEEDING ARRANGEMENTS

Filed Aug. 25, 1955 59 Sheets-Sheet 11

INVENTOR.

HANS CHRISTIAN HANSEN

BY Dicke and Craig

ATTORNEYS

June 12, 1962

H. C. HANSEN 3,038,727

RECORD FEEDING ARRANGEMENTS

Filed Aug. 25, 1955

59 Sheets-Sheet 12

INVENTOR.
HANS CHRISTIAN HANSEN
BY Dicke and Craig
ATTORNEYS

INVENTOR
Hans Christian Hansen
BY Dicke and Craig
ATTORNEYS

June 12, 1962 H. C. HANSEN 3,038,727

RECORD FEEDING ARRANGEMENTS

Filed Aug. 25, 1955 59 Sheets-Sheet 14

INVENTOR

Hans Christian Hansen

BY Dicke & Craig

ATTORNEYS

INVENTOR
Hans Christian Hansen
BY Dicke & Craig
ATTORNEYS

June 12, 1962 H. C. HANSEN 3,038,727

RECORD FEEDING ARRANGEMENTS

Filed Aug. 25, 1955 59 Sheets-Sheet 16

INVENTOR.
Hans Christian Hansen
BY Dicke & Craig
ATTORNEYS

June 12, 1962 H. C. HANSEN 3,038,727

RECORD FEEDING ARRANGEMENTS

Filed Aug. 25, 1955 59 Sheets-Sheet 17

INVENTOR.
HANS CHRISTIAN HANSEN
BY Dicke & Craig
ATTORNEYS

INVENTOR.
HANS CHRISTIAN HANSEN
BY Dicke & Craig
ATTORNEYS

INVENTOR.
HANS CHRISTIAN HANSEN
BY
Dicke & Craig
ATTORNEYS

INVENTOR:
Hans Christian Hansen,
BY
Dicke & Craig
ATTORNEYS

June 12, 1962 H. C. HANSEN 3,038,727

RECORD FEEDING ARRANGEMENTS

Filed Aug. 25, 1955 59 Sheets-Sheet 21

INVENTOR:
Hans Christian Hansen
BY Dicke & Craig
ATTORNEYS

June 12, 1962 H. C. HANSEN 3,038,727

RECORD FEEDING ARRANGEMENTS

Filed Aug. 25, 1955 59 Sheets-Sheet 22

INVENTOR:
Hans Christian Hansen,
BY Dicke & Craig
ATTORNEYS

INVENTOR
Hans Christian Hansen
BY Dicke & Craig
ATTORNEYS

INVENTOR
Hans Christian Hansen
BY Dicke & Craig
ATTORNEYS

June 12, 1962 H. C. HANSEN 3,038,727

RECORD FEEDING ARRANGEMENTS

Filed Aug. 25, 1955 59 Sheets-Sheet 25

INVENTOR.

Hans Christian Hansen

BY Dicke & Craig

ATTORNEYS.

June 12, 1962 H. C. HANSEN 3,038,727

RECORD FEEDING ARRANGEMENTS

Filed Aug. 25, 1955 59 Sheets-Sheet 26

INVENTOR.
Hans Christian Hansen,
BY
Dicke & Craig
ATTORNEYS

June 12, 1962 H. C. HANSEN 3,038,727

RECORD FEEDING ARRANGEMENTS

Filed Aug. 25, 1955 59 Sheets-Sheet 27

INVENTOR.
Hans Christian Hansen,

BY Dicke & Craig

ATTORNEYS

INVENTOR.
HANS CHRISTIAN HANSEN
BY
Lieke & Craig
ATTORNEYS.

INVENTOR:
Hans Christian Hansen,
BY
Dicke & Craig
ATTORNEYS

INVENTOR.
HANS CHRISTIAN HANSEN
BY Dicke & Craig
ATTORNEYS

INVENTOR.
Hans Christian Hansen,
BY Dicke & Craig
ATTORNEYS

INVENTOR.
Hans Christian Hansen,
BY Dicke & Craig
ATTORNEYS

INVENTOR.
Hans Christian Hansen,
BY
Dicke & Craig
ATTORNEYS

June 12, 1962 H. C. HANSEN 3,038,727

RECORD FEEDING ARRANGEMENTS

Filed Aug. 25, 1955 59 Sheets-Sheet 34

INVENTOR:
Hans Christian Hansen,
BY
Dicke & Craig
ATTORNEYS

June 12, 1962 H. C. HANSEN 3,038,727

RECORD FEEDING ARRANGEMENTS

Filed Aug. 25, 1955 59 Sheets-Sheet 35

INVENTOR.
HANS CHRISTIAN HANSEN
BY
Dicke & Craig
ATTORNEYS

INVENTOR.
Hans Christian Hansen,
BY
Dicke & Craig
ATTORNEYS

June 12, 1962 H. C. HANSEN 3,038,727

RECORD FEEDING ARRANGEMENTS

Filed Aug. 25, 1955 59 Sheets-Sheet 37

INVENTOR:
Hans Christian Hansen,
BY
Dicke & Craig
ATTORNEYS

RECORD FEEDING ARRANGEMENTS

INVENTOR:
Hans Christian Hansen,
BY Dicke & Craig
ATTORNEYS

INVENTOR.
Hans Christian Hansen,
BY Dicke & Craig
ATTORNEYS

June 12, 1962 H. C. HANSEN 3,038,727

RECORD FEEDING ARRANGEMENTS

Filed Aug. 25, 1955 59 Sheets-Sheet 40

INVENTOR.
HANS CHRISTIAN HANSEN
BY
Dicke & Craig
ATTORNEYS

June 12, 1962 H. C. HANSEN 3,038,727

RECORD FEEDING ARRANGEMENTS

Filed Aug. 25, 1955 59 Sheets-Sheet 41

INVENTOR.
Hans Christian Hansen,

BY Dicke & Craig
ATTORNEYS

June 12, 1962 H. C. HANSEN 3,038,727

RECORD FEEDING ARRANGEMENTS

Filed Aug. 25, 1955 59 Sheets-Sheet 42

INVENTOR.

HANS CHRISTIAN HANSEN

BY

Dicke & Craig

ATTORNEYS.

June 12, 1962 H. C. HANSEN 3,038,727

RECORD FEEDING ARRANGEMENTS

Filed Aug. 25, 1955 59 Sheets-Sheet 43

INVENTOR.
HANS CHRISTIAN HANSEN
BY Dicke & Craig
ATTORNEYS.

June 12, 1962 H. C. HANSEN 3,038,727

RECORD FEEDING ARRANGEMENTS

Filed Aug. 25, 1955 59 Sheets-Sheet 44

INVENTOR.
HANS CHRISTIAN HANSEN
BY
Dicke & Craig
ATTORNEYS.

INVENTOR.
HANS CHRISTIAN HANSEN
BY
Dicke & Craig
ATTORNEYS.

RECORD FEEDING ARRANGEMENTS

INVENTOR.
HANS CHRISTIAN HANSEN

BY Dicke a Craig
ATTORNEYS.

INVENTOR.
HANS CHRISTIAN HANSEN
BY
Dicke & Craig
ATTORNEYS.

INVENTOR.
HANS CHRISTIAN HANSEN
BY
Dicke & Craig
ATTORNEYS.

June 12, 1962 H. C. HANSEN 3,038,727

RECORD FEEDING ARRANGEMENTS

Filed Aug. 25, 1955

59 Sheets-Sheet 49

INVENTOR.
HANS CHRISTIAN HANSEN
BY
Dicke & Craig
ATTORNEYS.

June 12, 1962 H. C. HANSEN 3,038,727

RECORD FEEDING ARRANGEMENTS

Filed Aug. 25, 1955 59 Sheets-Sheet 50

INVENTOR.

HANS CHRISTIAN HANSEN

BY

Dicke & Craig

ATTORNEYS.

INVENTOR.
HANS CHRISTIAN HANSEN
BY
Dicke & Craig
ATTORNEYS.

June 12, 1962 H. C. HANSEN 3,038,727

RECORD FEEDING ARRANGEMENTS

Filed Aug. 25, 1955 59 Sheets-Sheet 52

INVENTOR.
HANS CHRISTIAN HANSEN
BY
Dicke & Craig
ATTORNEYS.

June 12, 1962 H. C. HANSEN 3,038,727

RECORD FEEDING ARRANGEMENTS

Filed Aug. 25, 1955 59 Sheets-Sheet 53

INVENTOR.

HANS CHRISTIAN HANSEN

BY

Dicke & Craig

ATTORNEYS.

RECORD FEEDING ARRANGEMENTS

Filed Aug. 25, 1955 59 Sheets-Sheet 54

INVENTOR.
Hans Christian Hansen,
BY
Dicke & Craig
ATTORNEYS

RECORD FEEDING ARRANGEMENTS

Filed Aug. 25, 1955

INVENTOR.
HANS CHRISTIAN HANSEN
BY
Dicke & Craig
ATTORNEYS.

INVENTOR.
HANS CHRISTIAN HANSEN
BY
Dicke & Craig
ATTORNEYS.

INVENTOR.
HANS CHRISTIAN HANSEN
BY
Dicke & Craig
ATTORNEYS.

INVENTOR.
HANS CHRISTIAN HANSEN
BY
Dicke a Craig
ATTORNEYS.

INVENTOR.
HANS CHRISTIAN HANSEN
BY
Dicke & Craig
ATTORNEYS.

3,038,727

RECORD FEEDING ARRANGEMENTS

Hans Christian Hansen, 38 Slotsvej Charlottenlund, Copenhagen, Denmark

Filed Aug. 25, 1955, Ser. No. 530,450
Claims priority, application Denmark Aug. 27, 1954
31 Claims. (Cl. 274—10)

Figure 1:
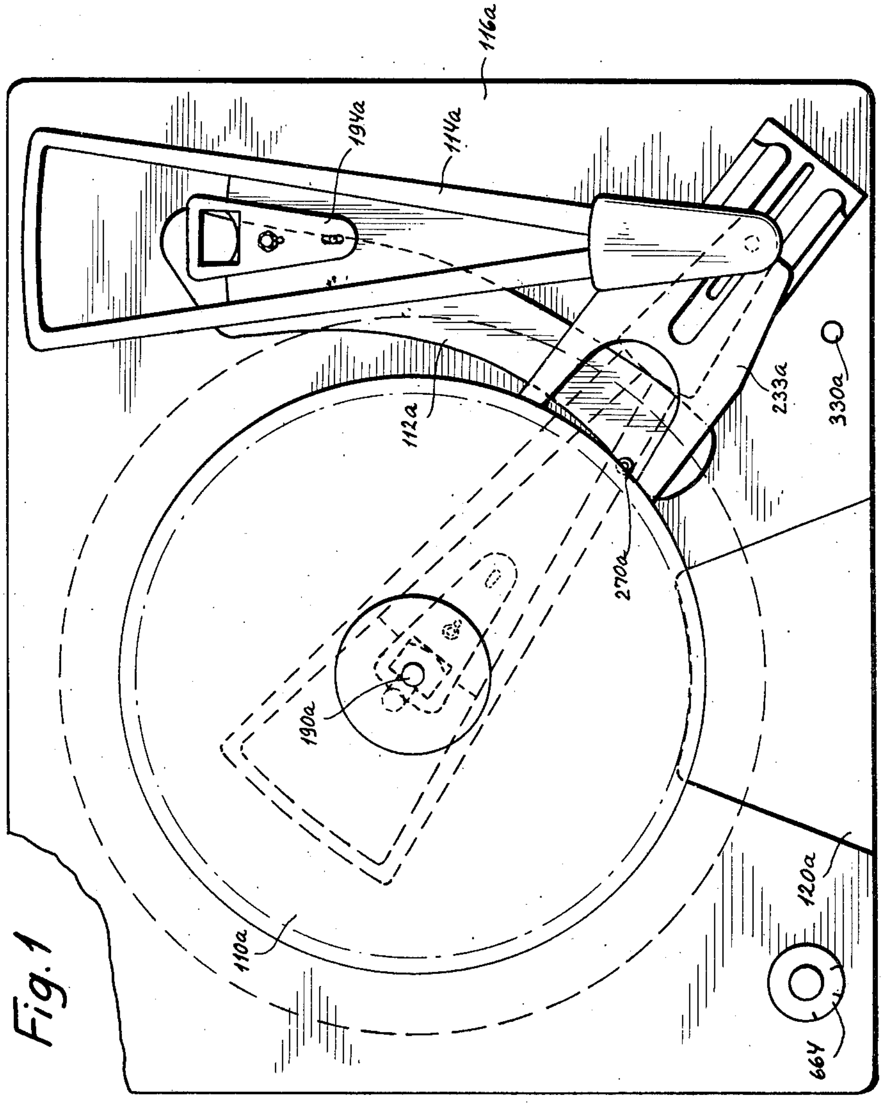

This application is a continuation-in-part application of my applications Serial Number 225,946, filed May 12, 1951, Serial Number 440,487, filed June 30, 1954, and Serial Number 491,422, filed March 1, 1955, all relating to record changing phonographs.

It is a general object of my invention to provide a record changing phonograph which is capable of performing a plurality of functions, and in which the number of movable parts is reduced considerably.

One object of the invention is to provide a record changing phonograph capable of playing a plurality of different sizes of records and feeding the records to the playing position irrespective of the fact whether the sizes are mixed.

Another object of the invention is to provide a record changing phonograph in which the necessity of having a separate member for testing the size of the record to be played is avoided.

Another object of the invention is to provide a record changing phonograph in which the function of testing the size of the next record to be played is taken over by the tone arm.

Still another object of the invention is to provide a record changing phonograph in which the feeding of the records to the playing position is controlled by the movement of the tone arm between each playing of a record.

Still another object of the invention is to provide a movement for control of the tone arm in a record changing phonograph capable of selectively moving the tone arm in a plurality of paths between each playing of a record corresponding to a plurality of sizes of records.

Another object of the invention is to provide a record changing phonograph in which the movement of the tone arm between each playing of a record is controlled in response to abutment of a record size feeler member against the record.

A further object is to provide a tone arm control for a record changing phonograph in which a member on the tone arm is caused to travel across the surface of the next record to be played in the direction from the centre towards the edge of said record, and in which said tone arm control member is caused to abut against the edge of said record.

Still another object of the invention is to provide a record changing phonograph that will enable any size of records to be played, also sizes that are not standard sizes.

A further object of the invention is a sub-combination to provide a record size feeler arrangement that is associated with the tone arm of the phonograph and with control means for moving the tone arm between each playing of the records that can be designed to test any size of a record, also such sizes that are not standard sizes.

Still another object of the invention is to provide as an article of manufacture a cam disc for controlling the movements of the tone arm in a record changing phonograph, in a manner to enable said tonearm to test the size of the next record to be played, and thereafter selectively control the further movement of said tone arm in a path in response to the size of said record tested.

With these and other objects in mind, that will appear from the specification as the latter proceeds, the invention will now be described in detail with reference to the drawings, in which—

Figure 2:
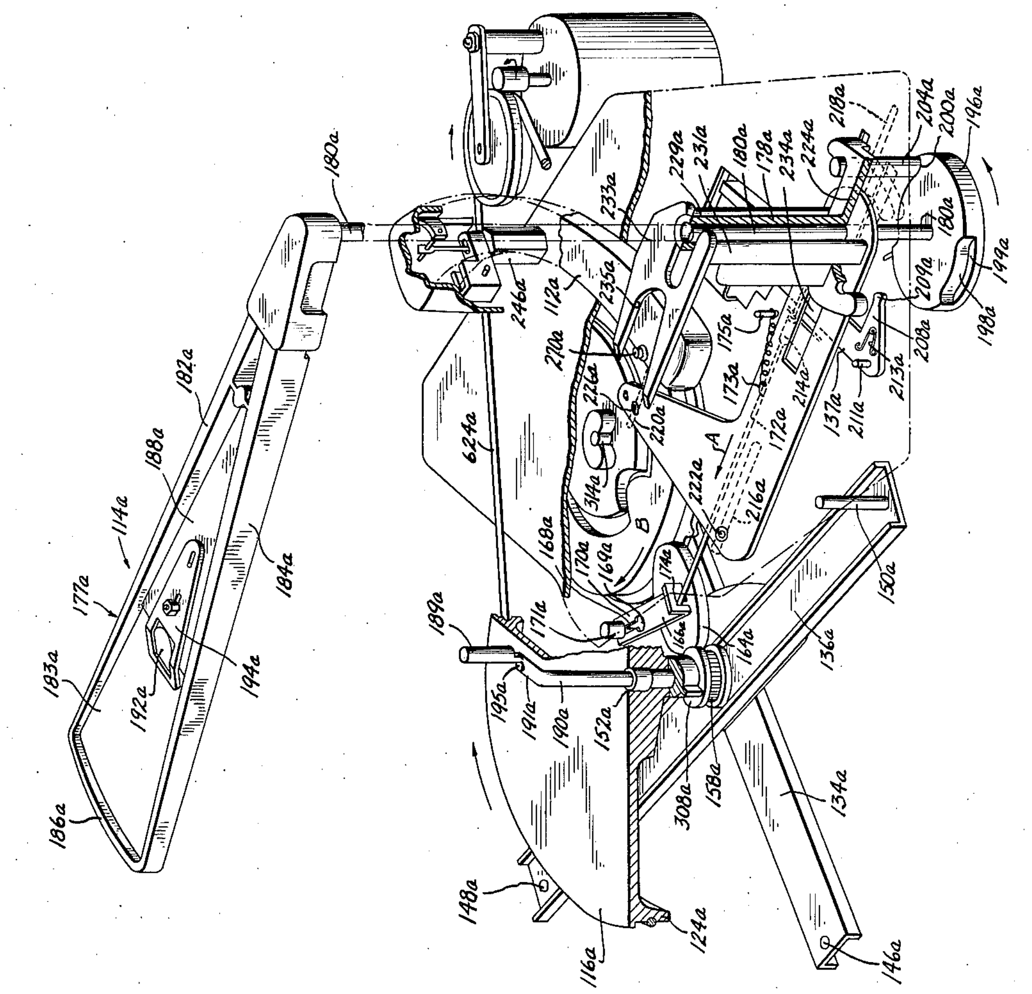
Figures 3, 4, 5:
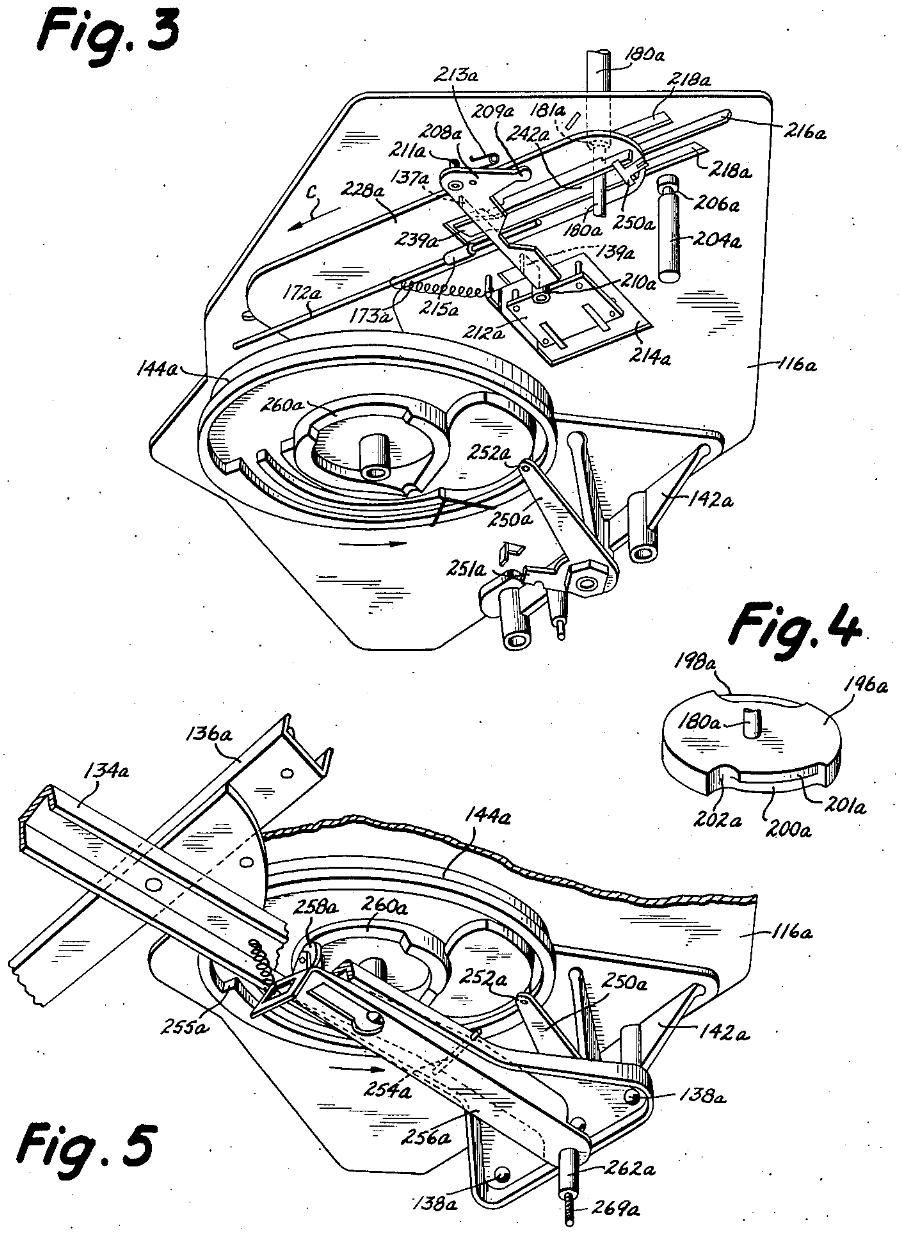
Figures 6, 7:
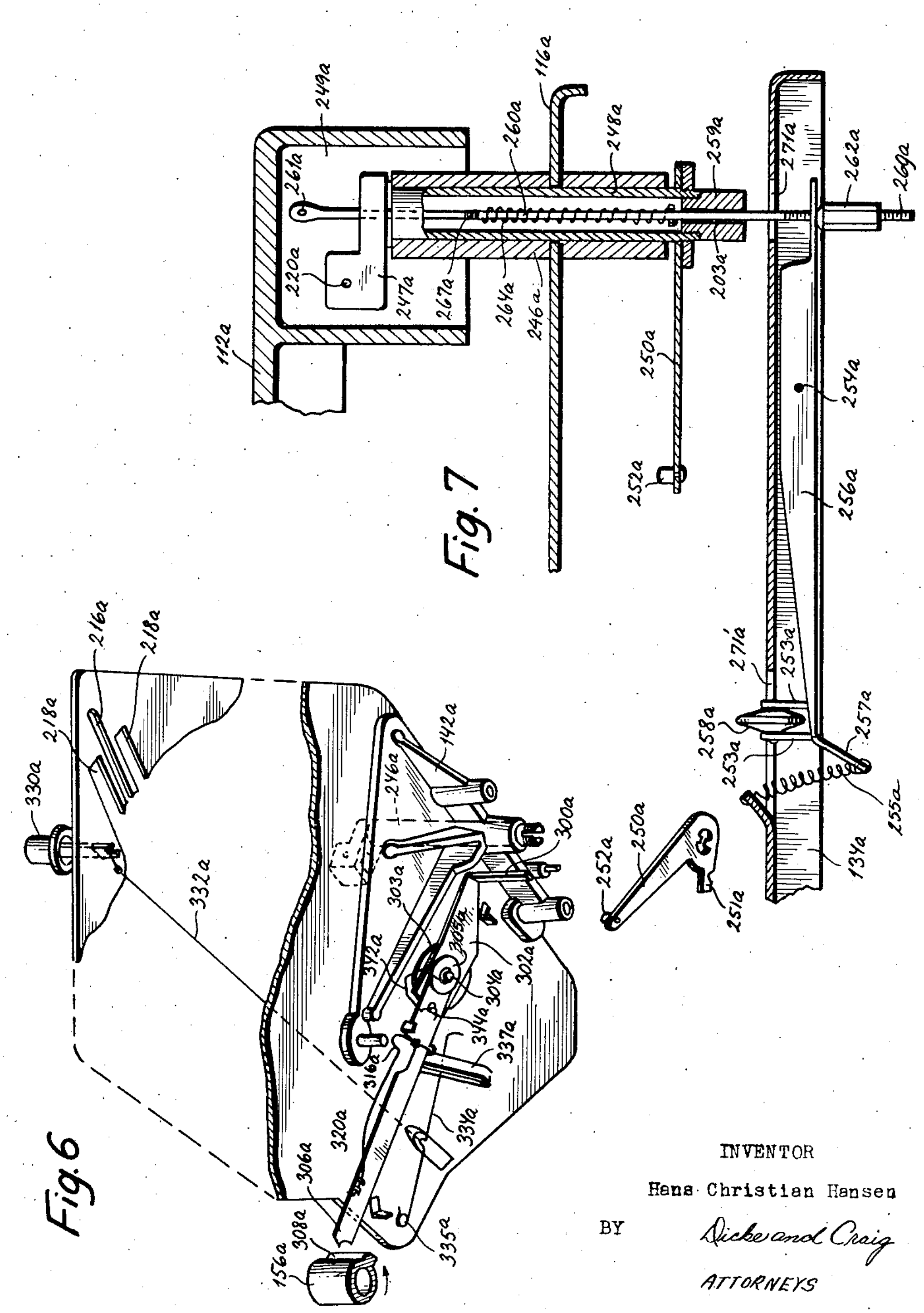
Figure 8:
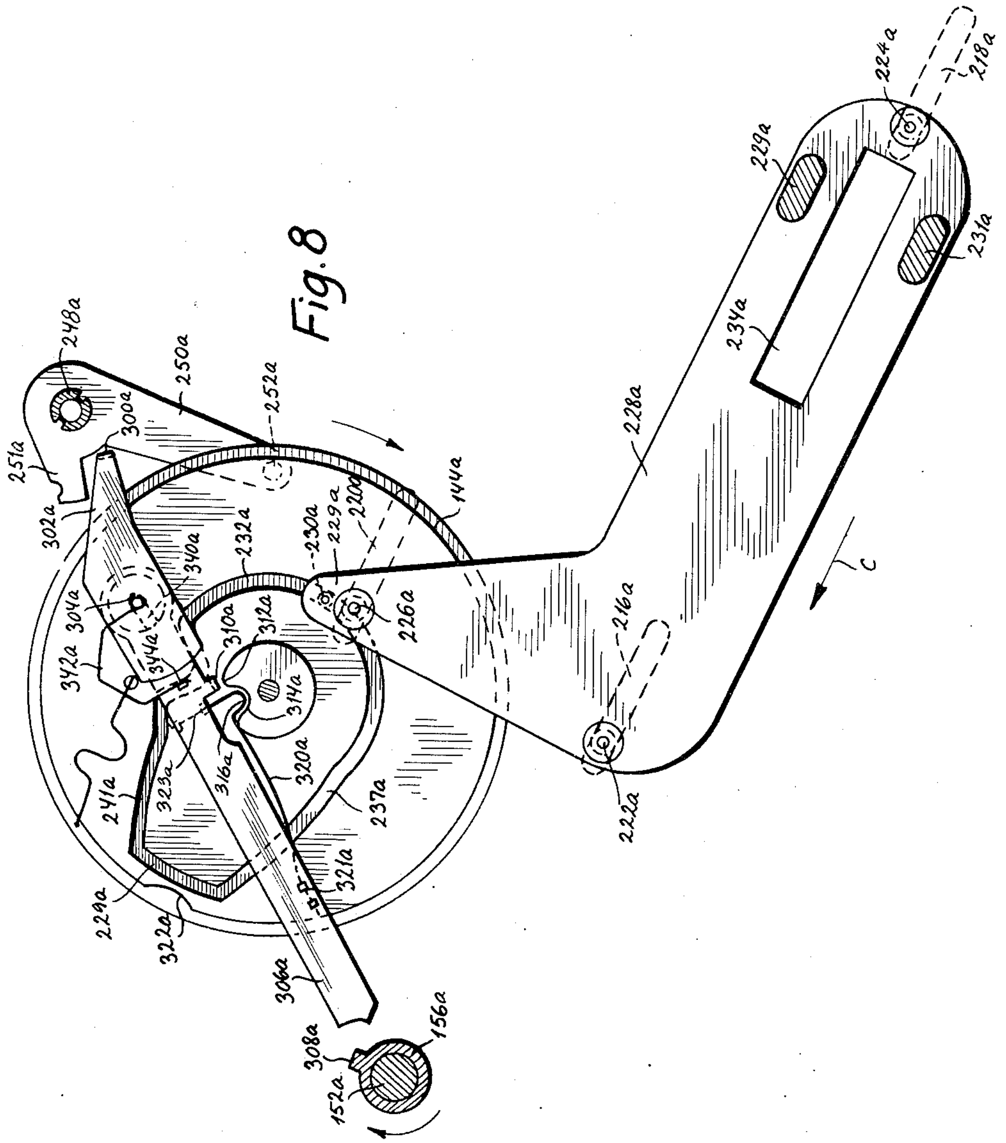
Figure 9:
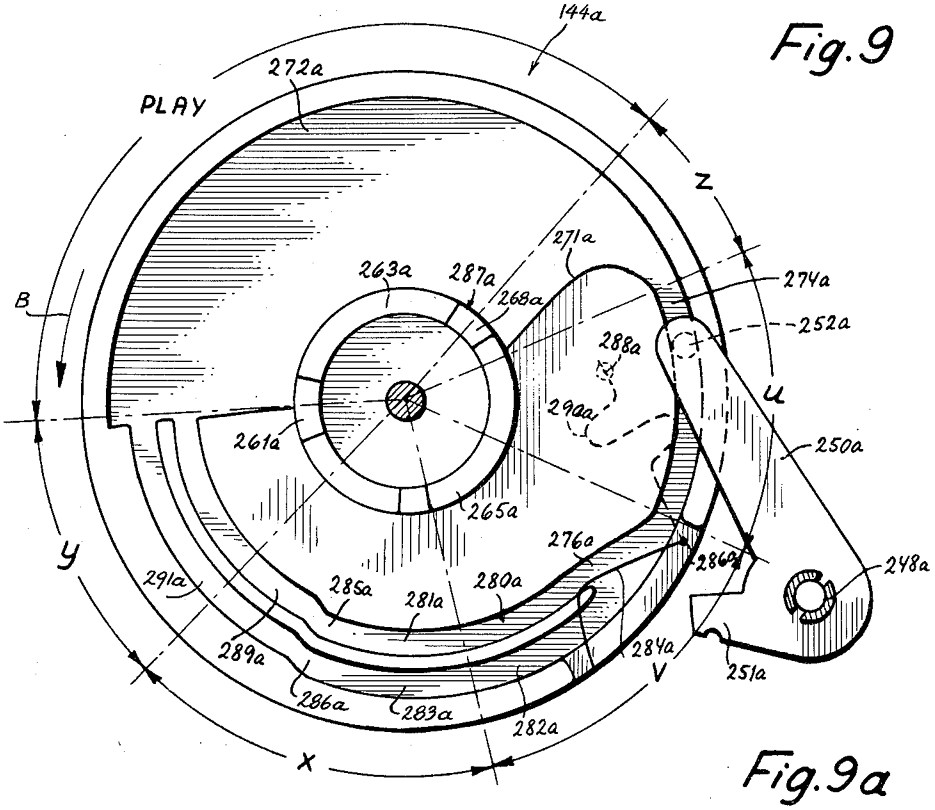
Figure 9A:
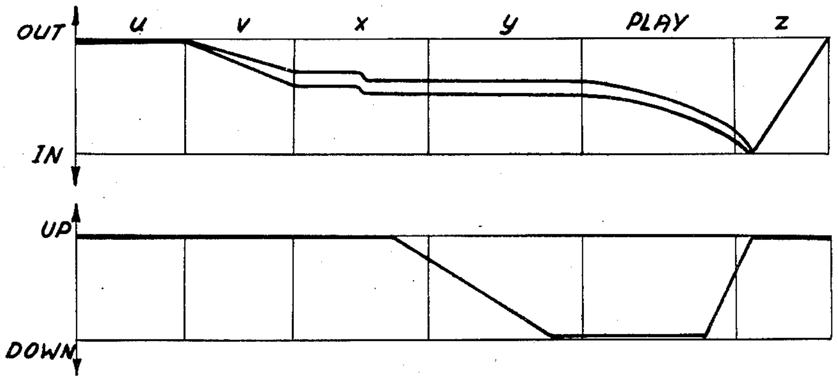
Figure 10:
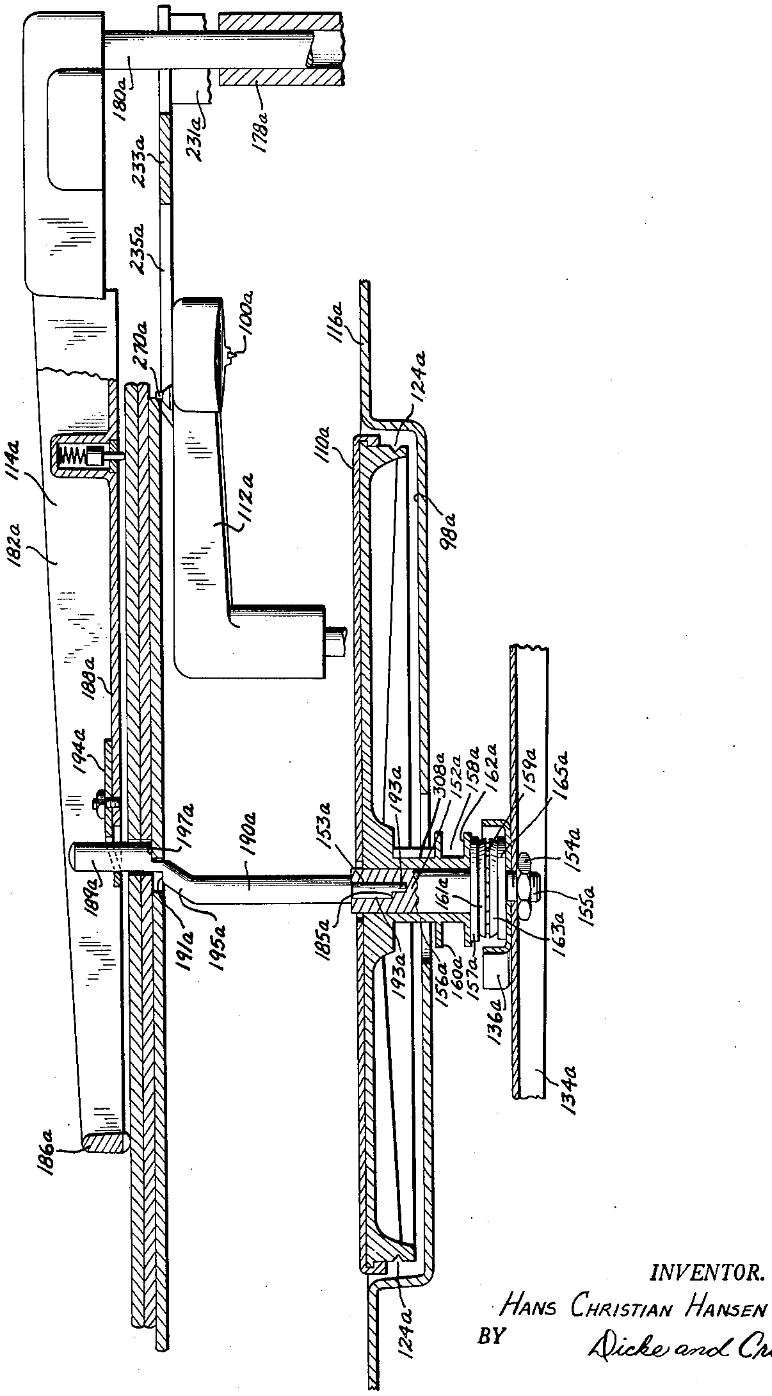
Figure 11:
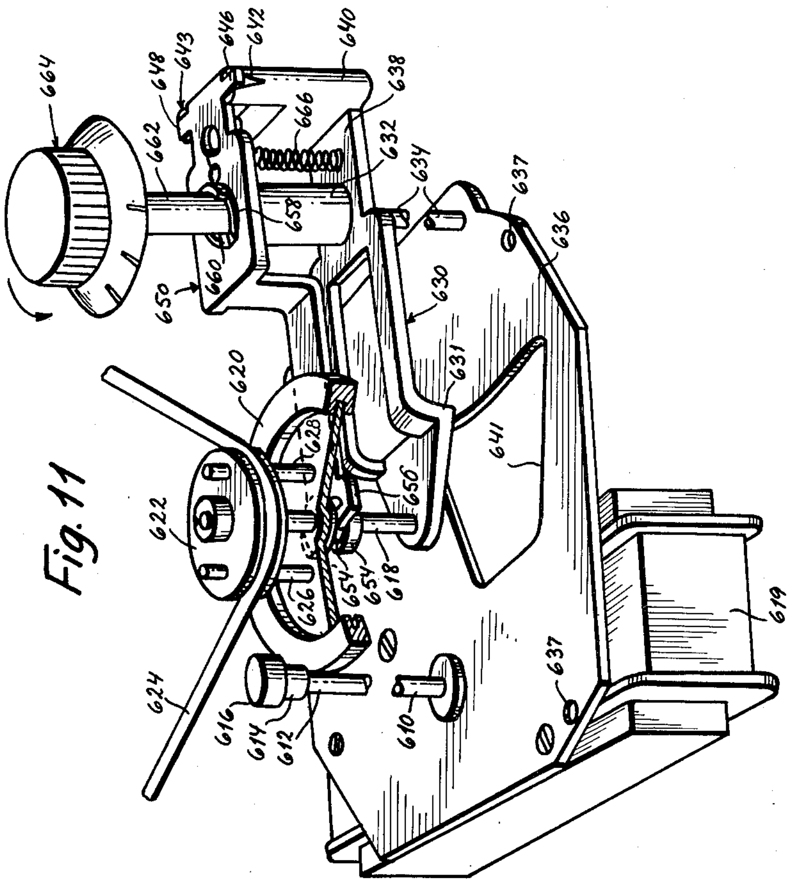
Figure 11A:
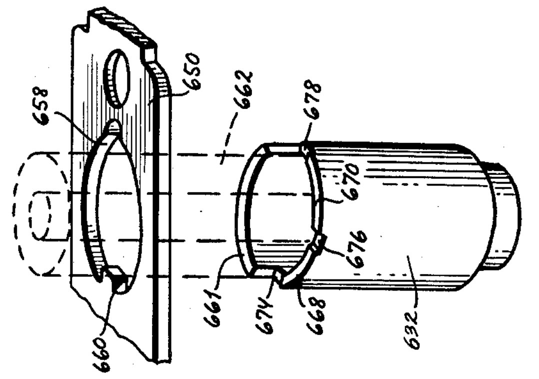
Figure 12:
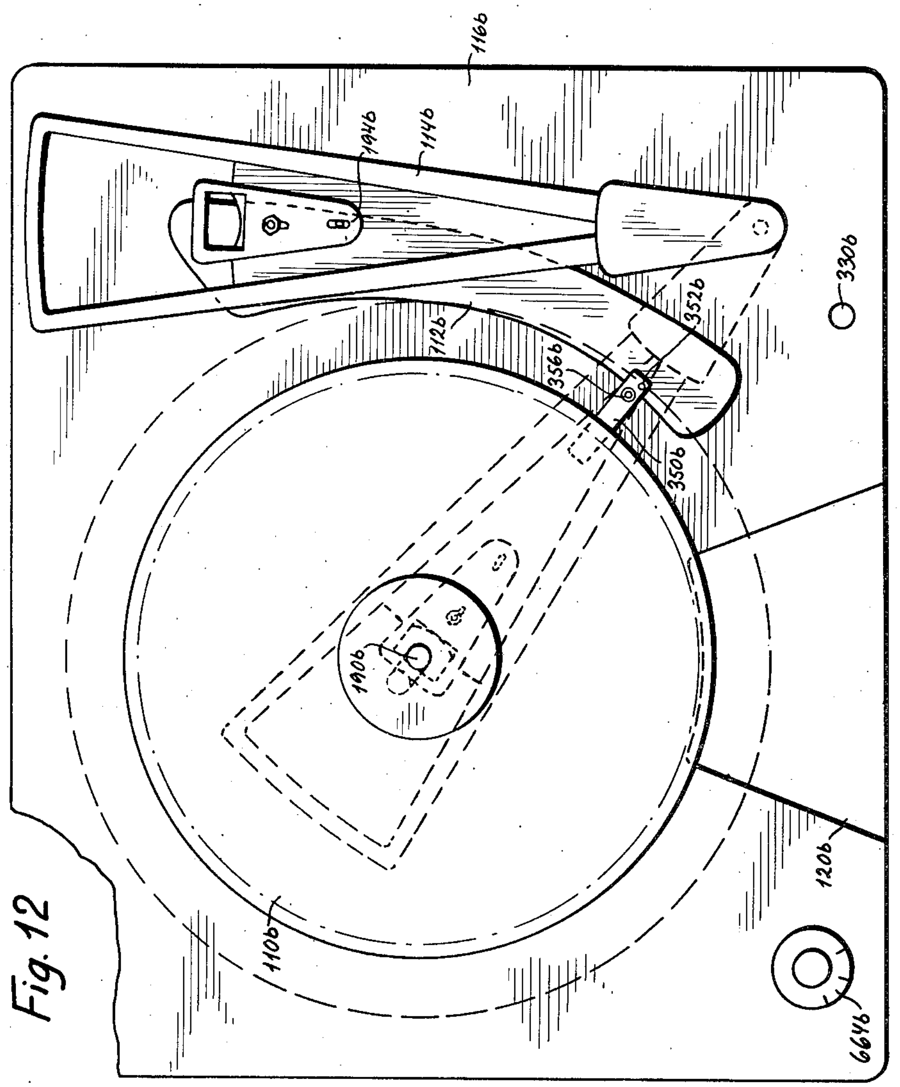
Figure 13:
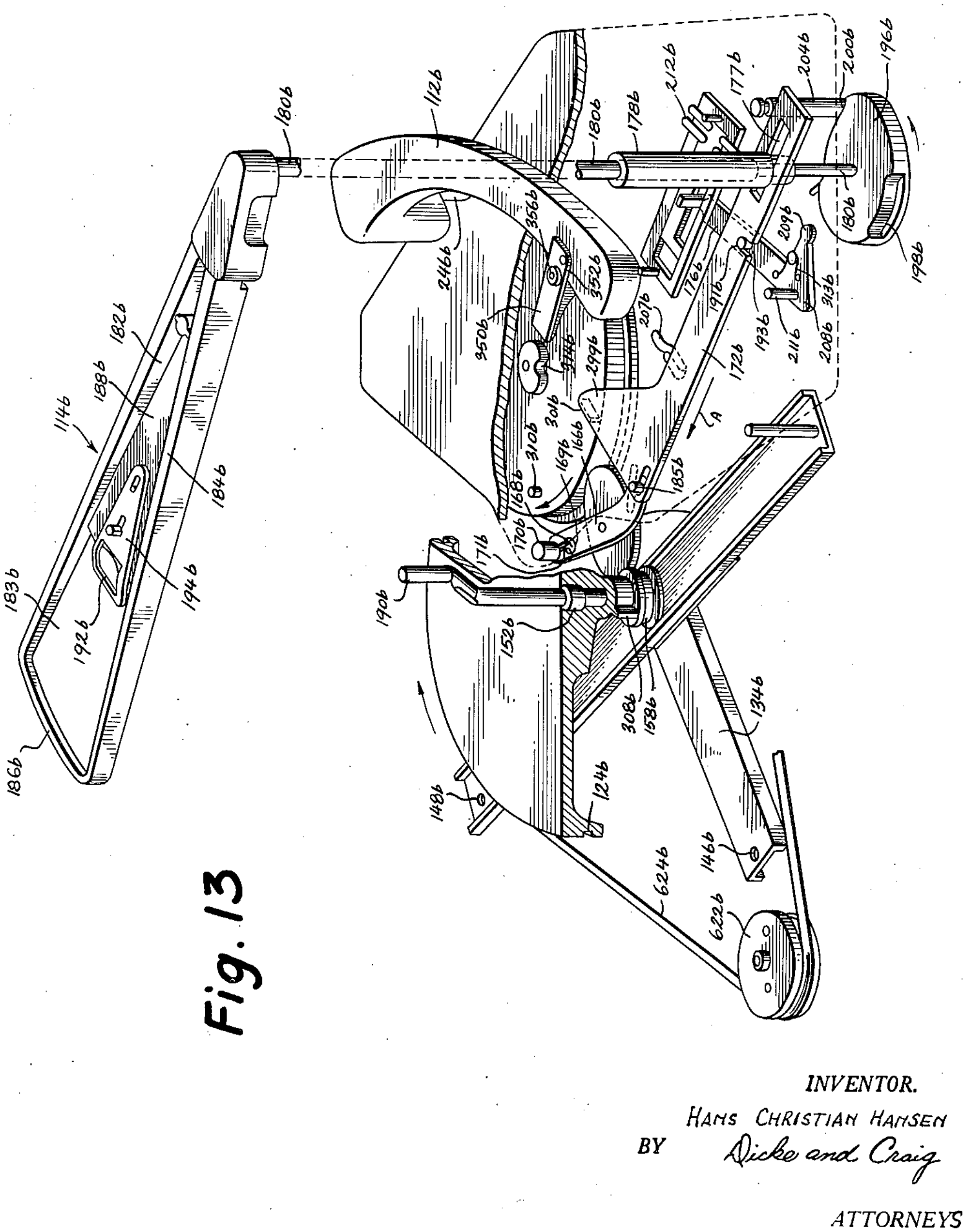
Figures 14, 15, 16:
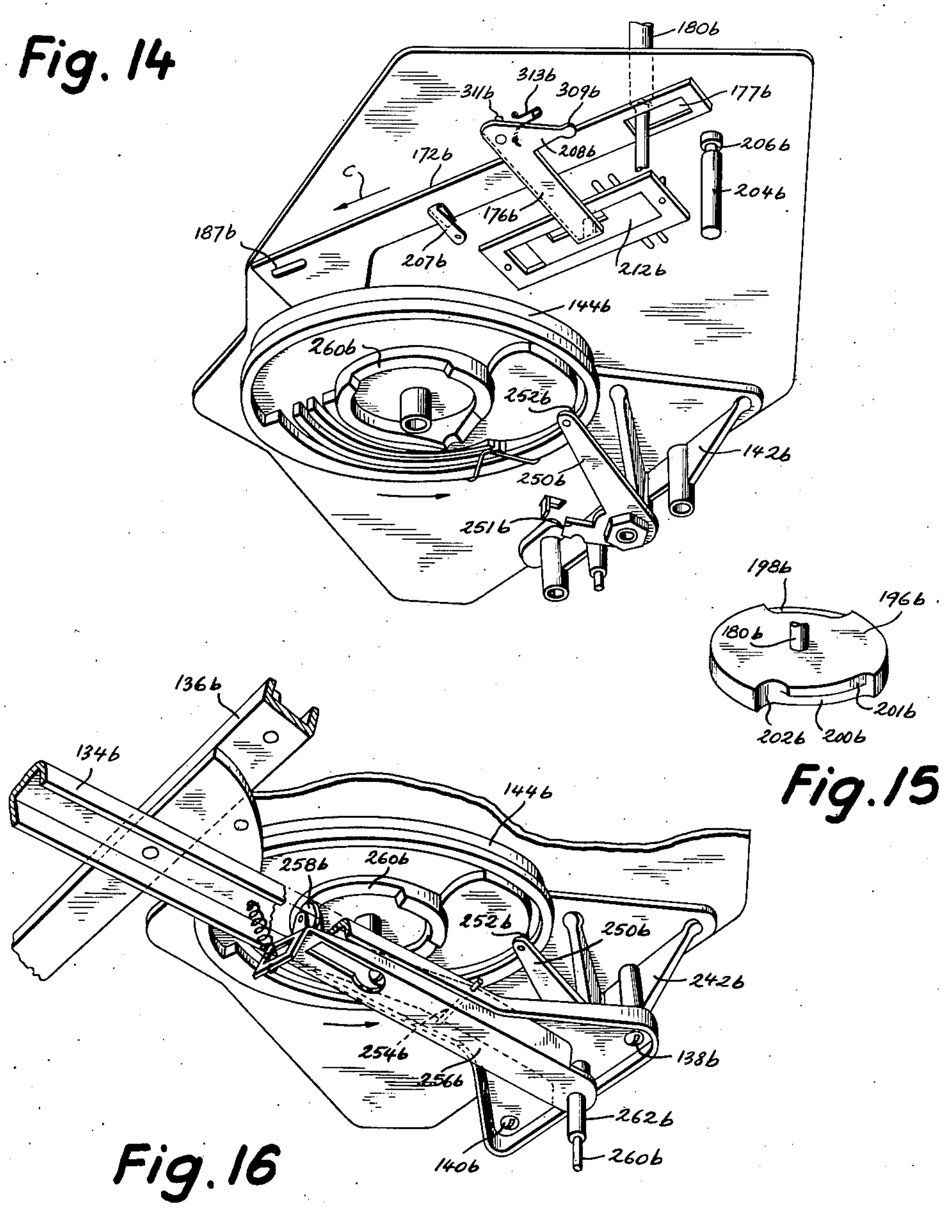
Figure 17:
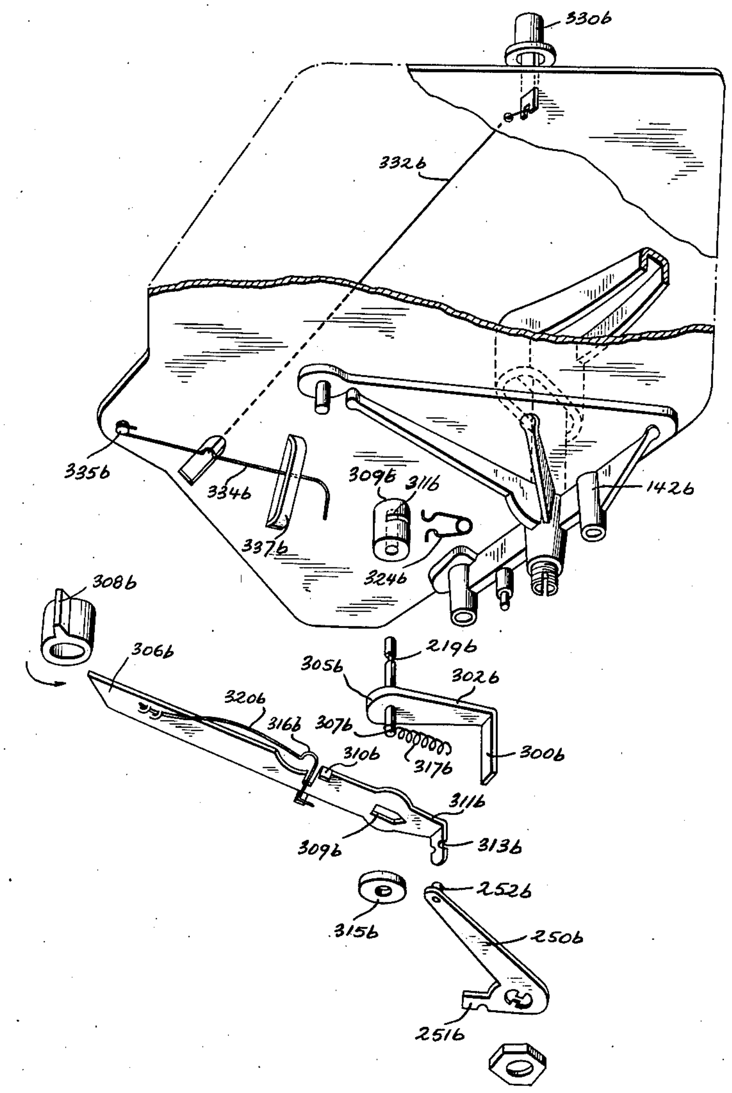
Figure 18:
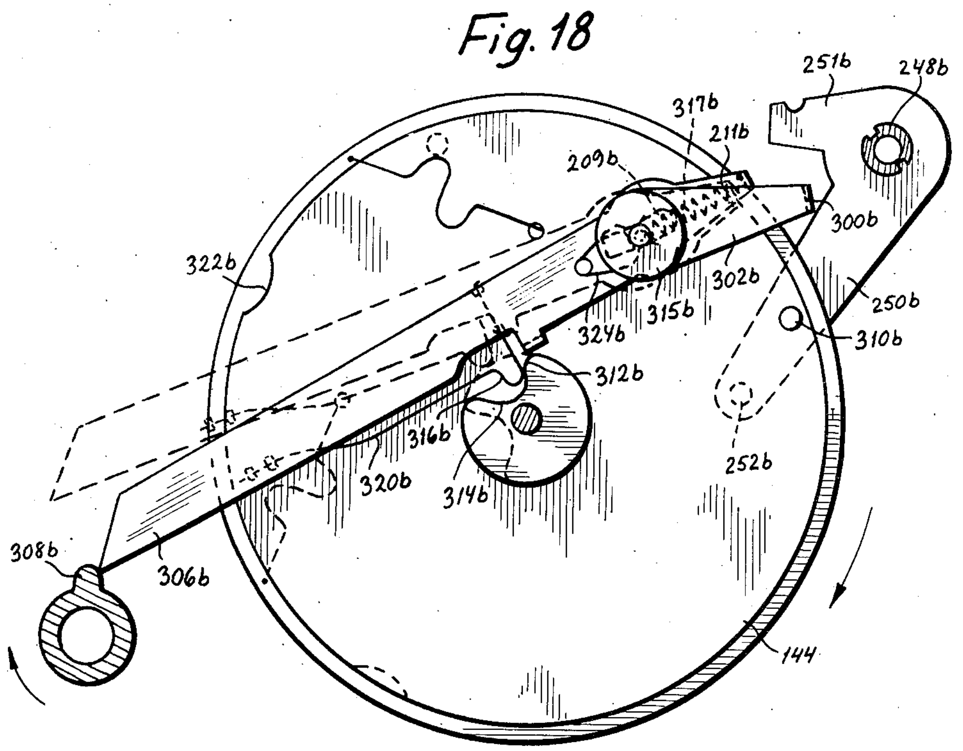
Figure 18A:
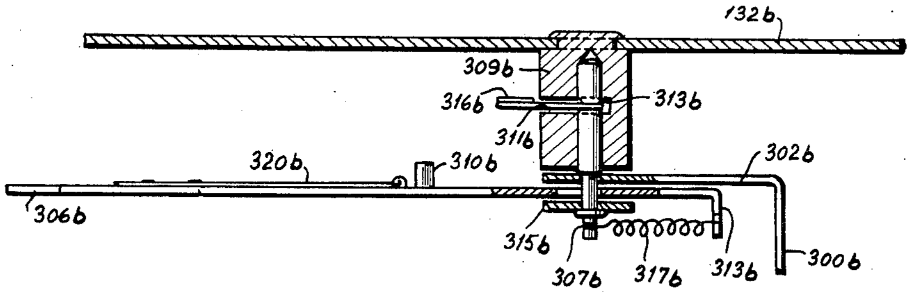
Figures 19, 19A:
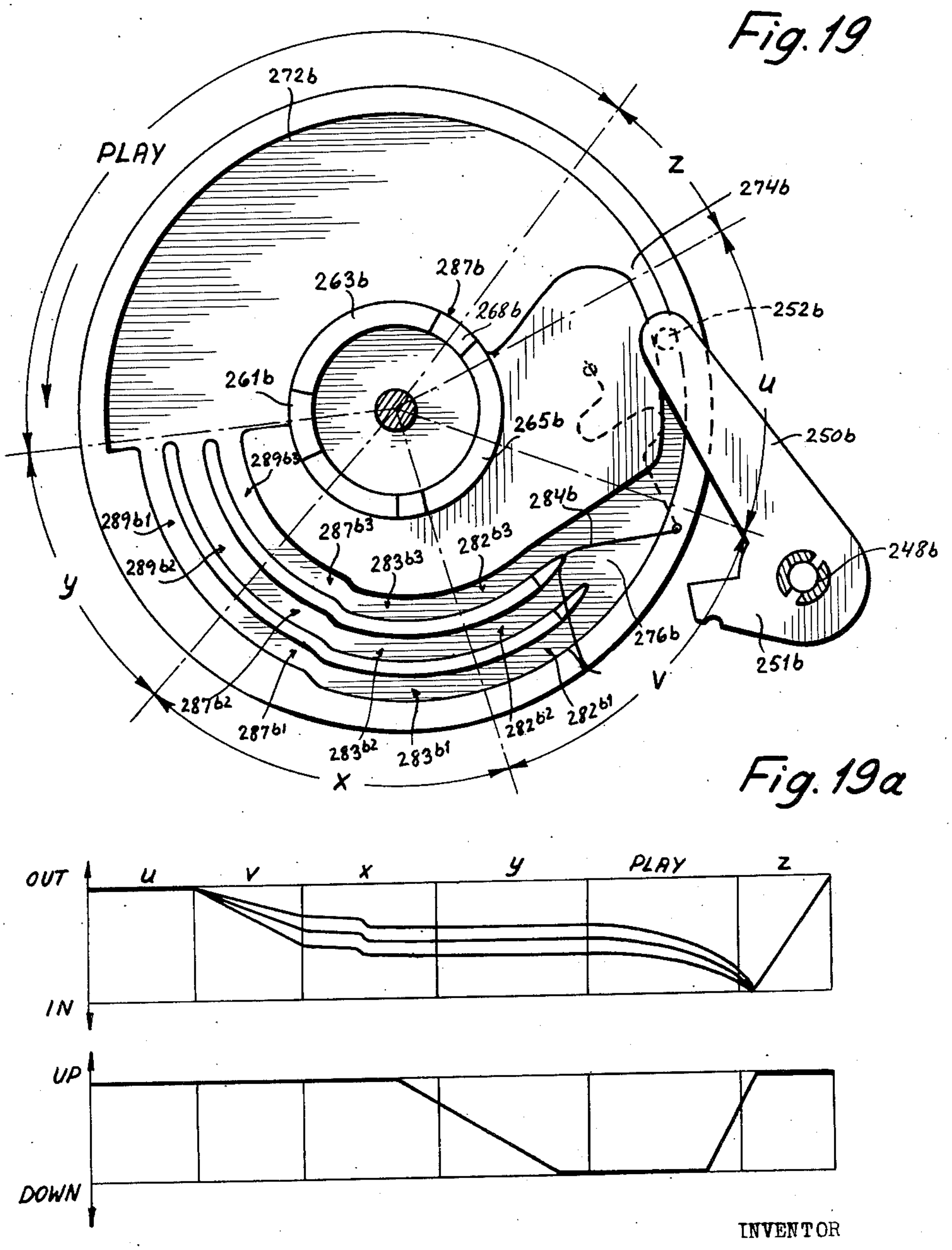
Figure 21:
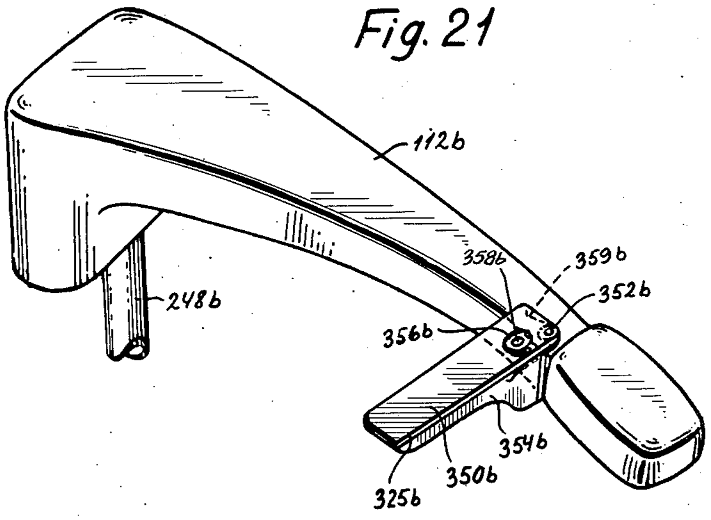
Figure 20:
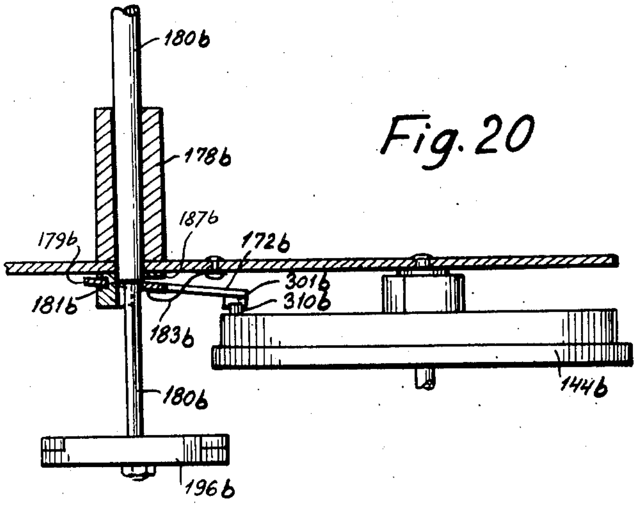
Figure 23:
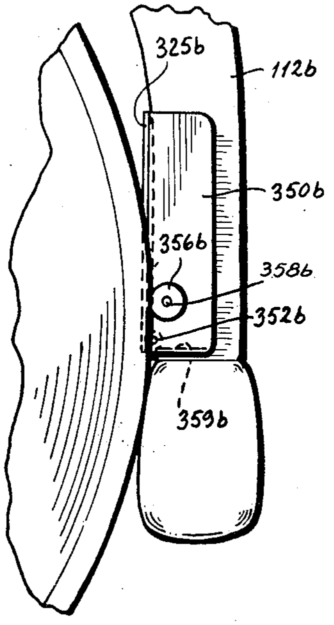
Figure 22:
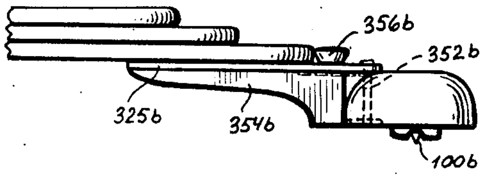
Figure 24:
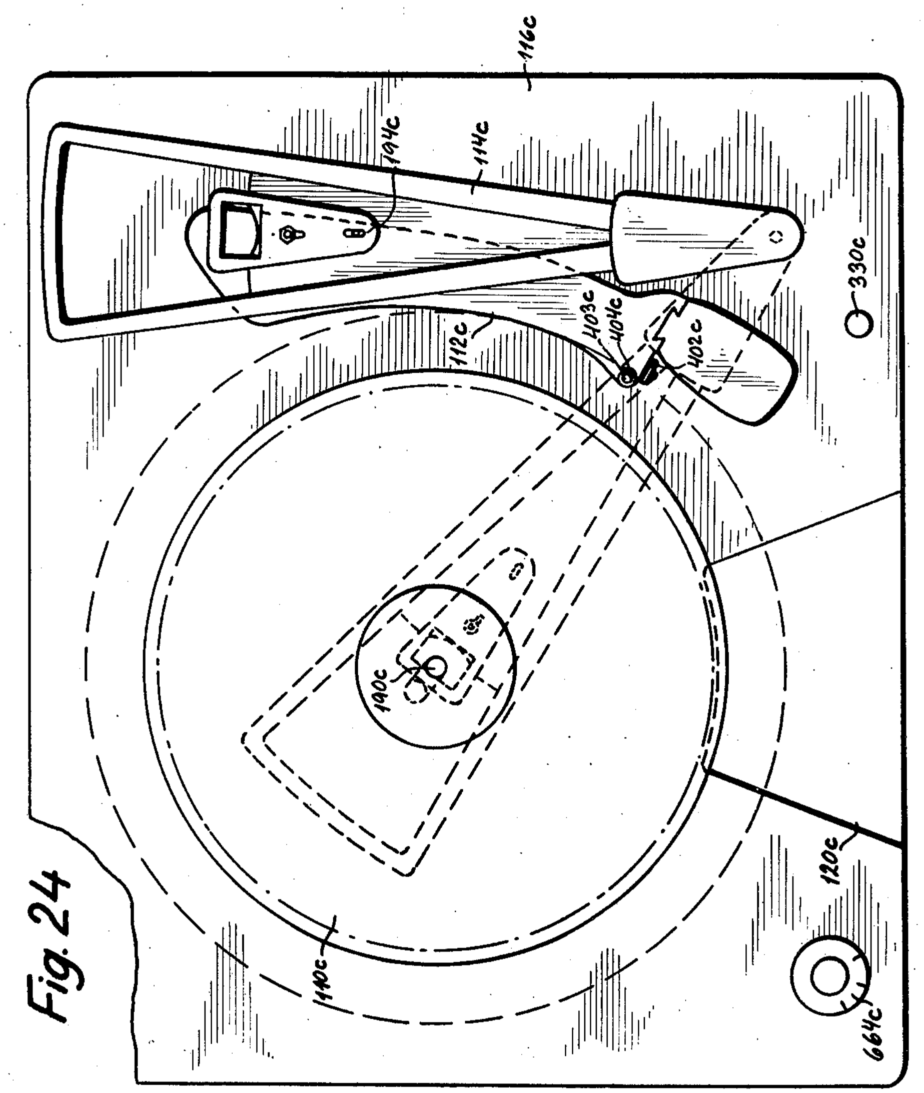
Figure 25:
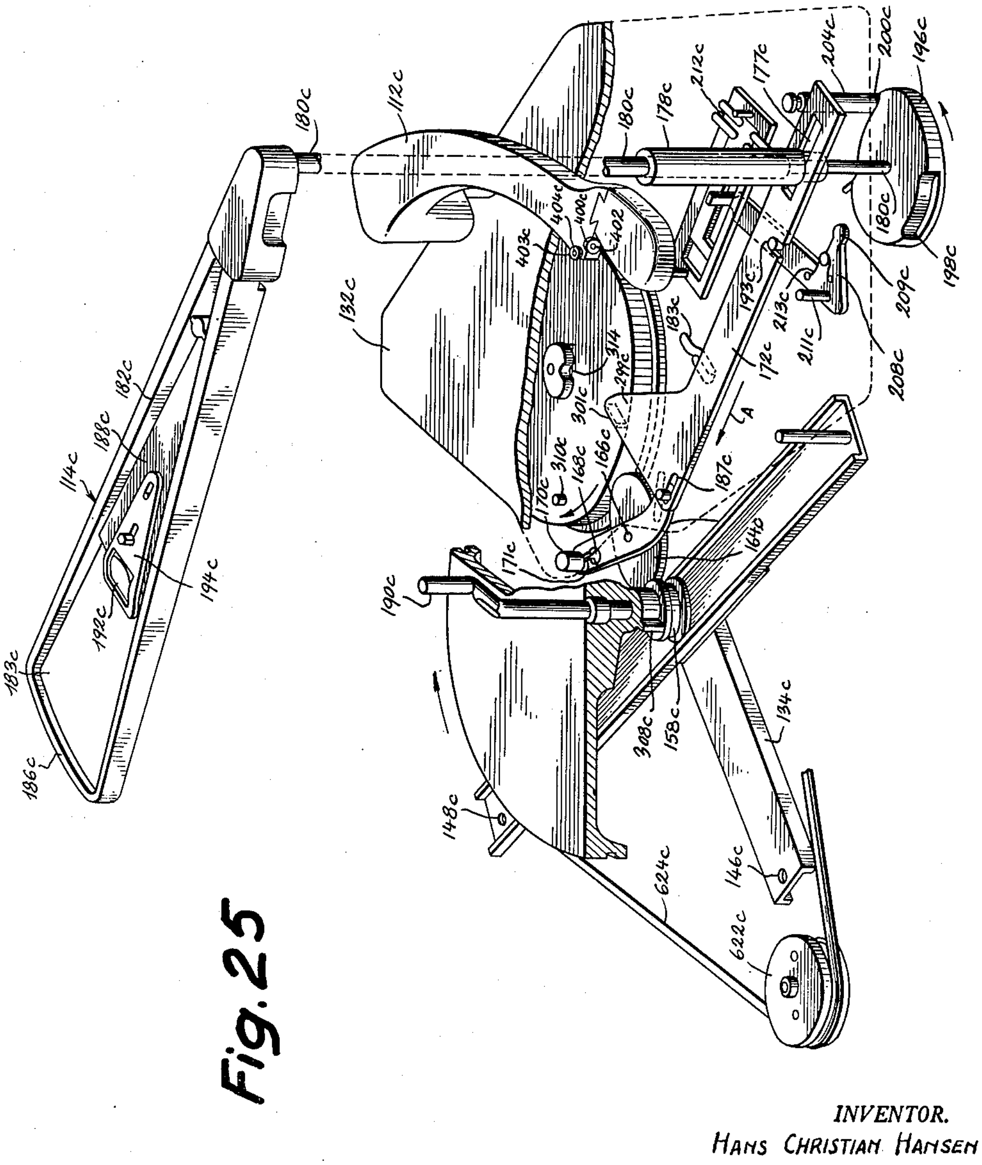
Figures 26, 27, 28:
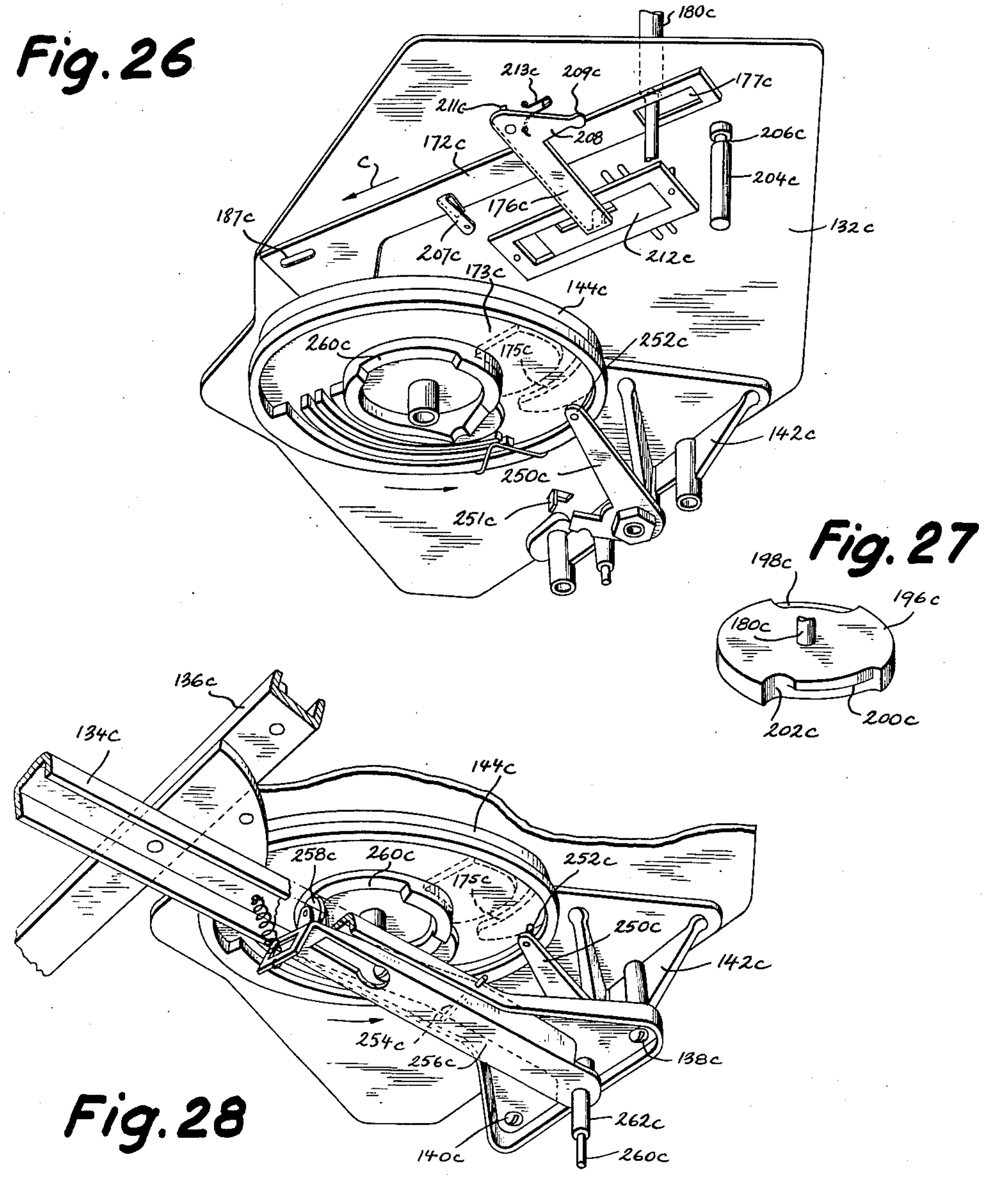
Figure 29:
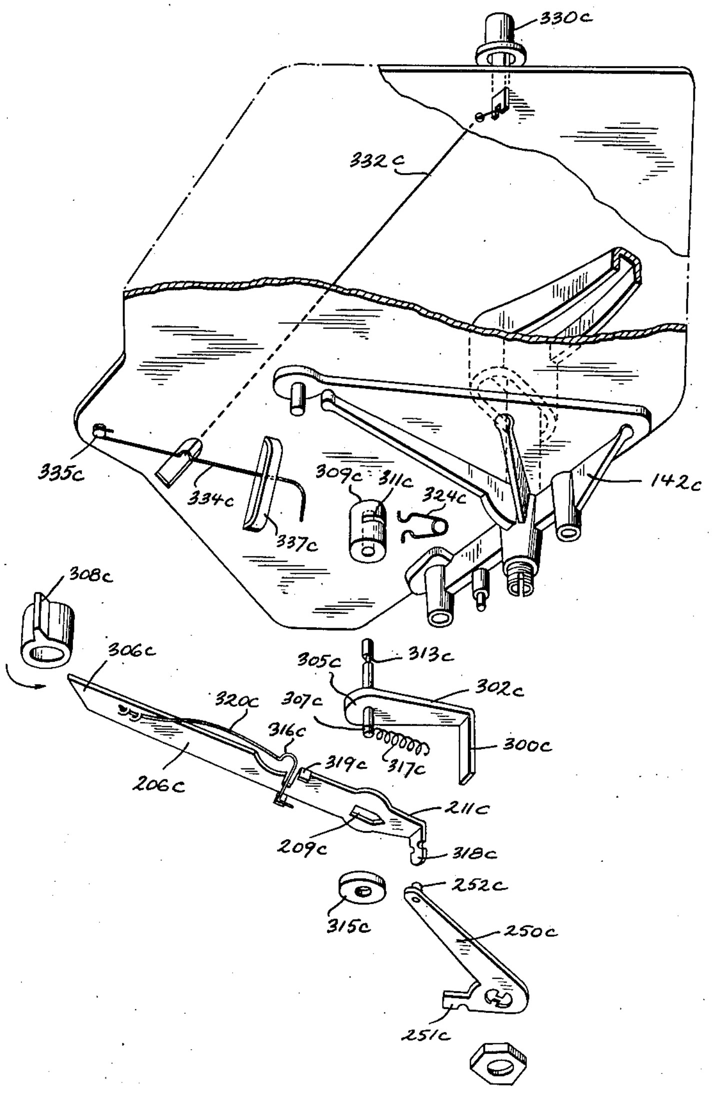
Figure 30:
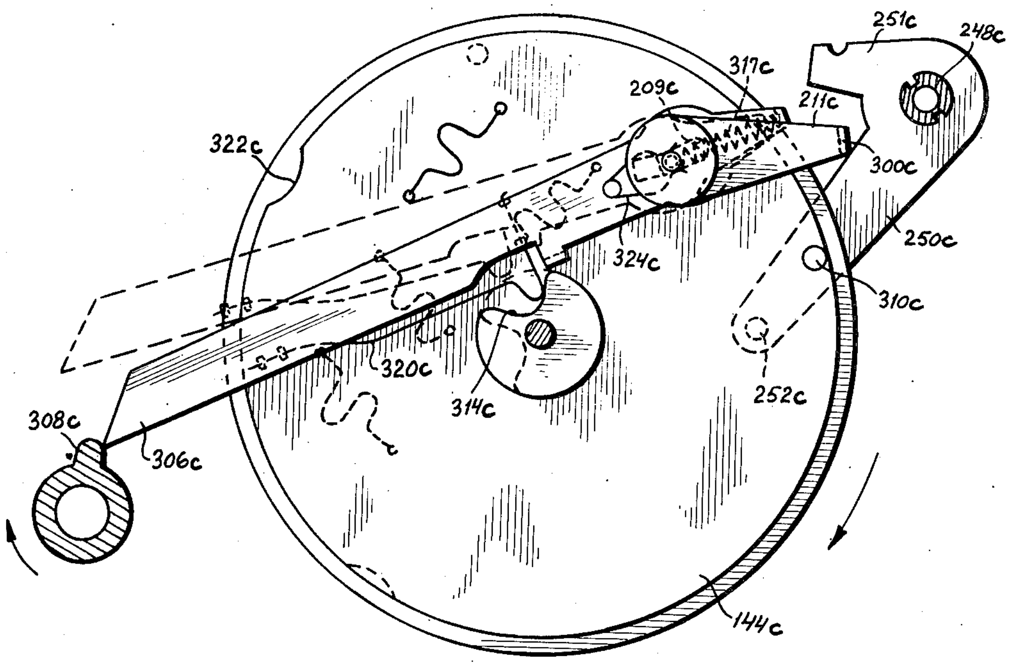
Figure 30A:
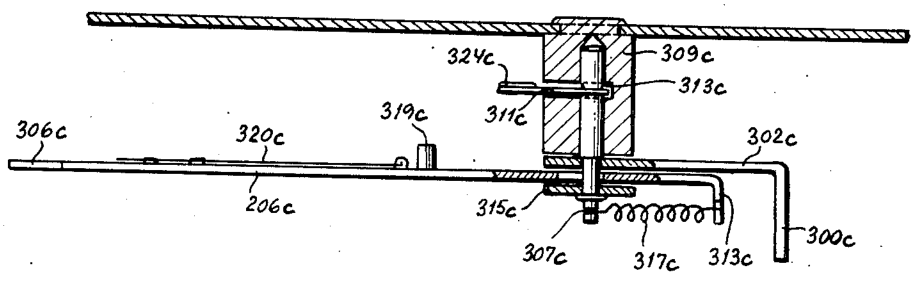
Figures 31, 31A:
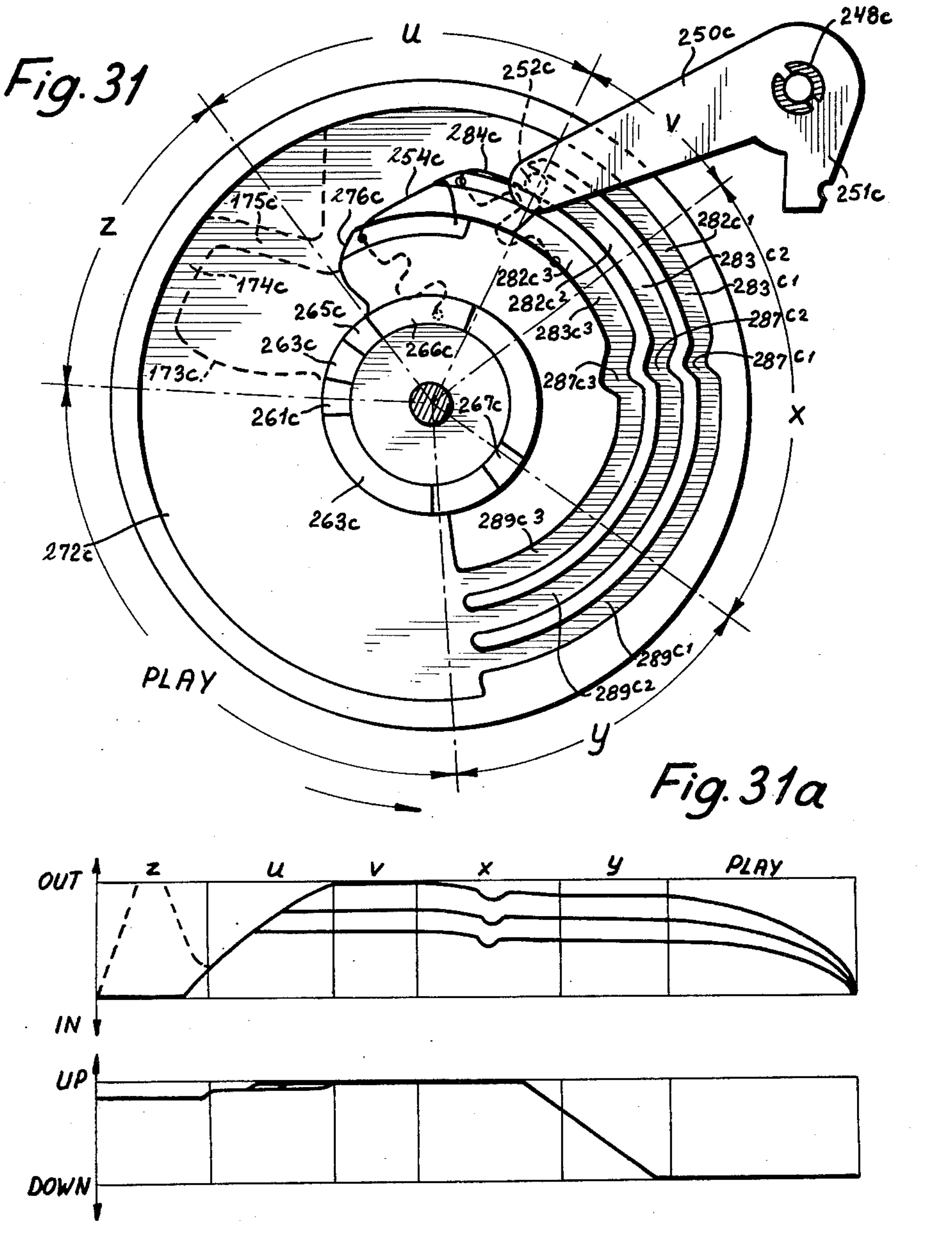
Figures 32, 33:
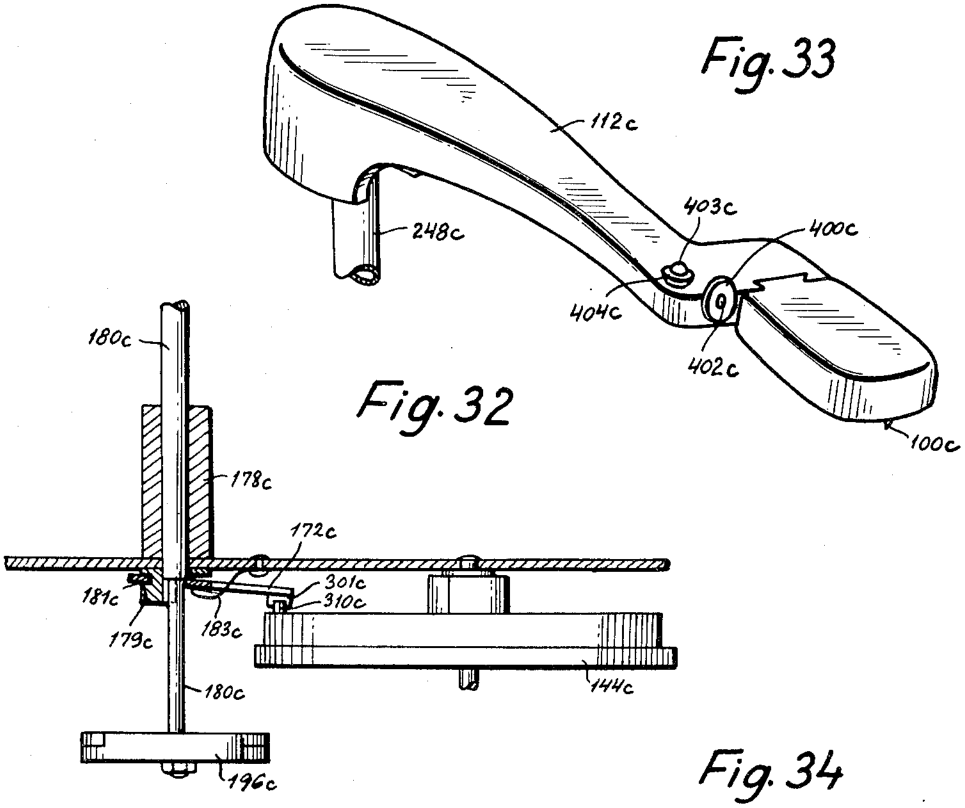
Figure 34:
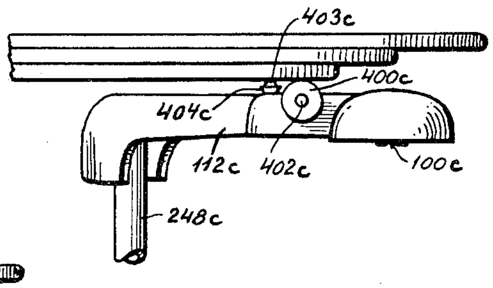
Figure 35:
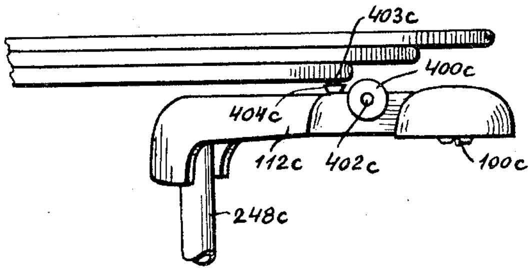
Figure 37:
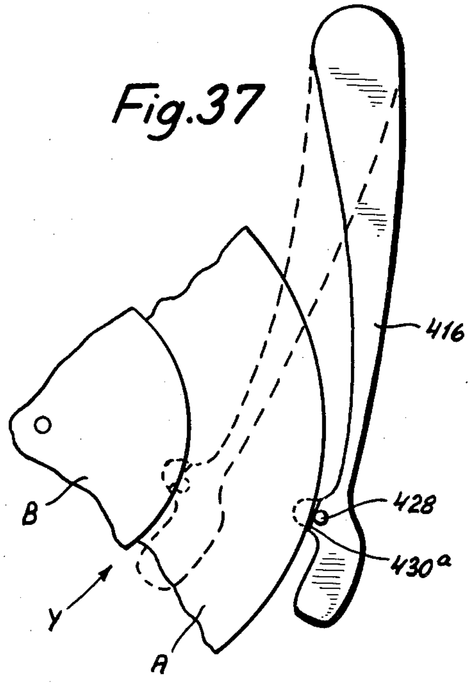
Figure 36:
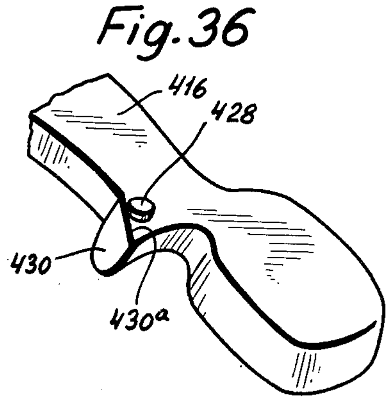
Figures 40, 41:
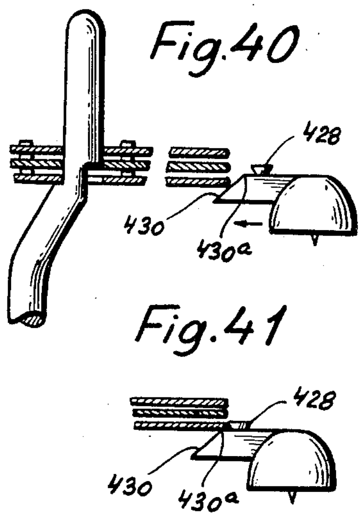
Figures 38, 39:
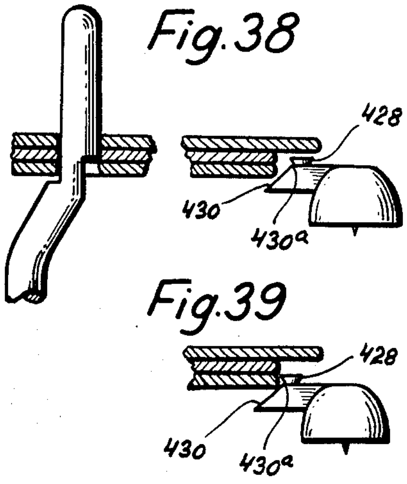
Figure 42:
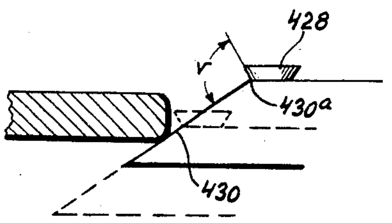
Figure 43:
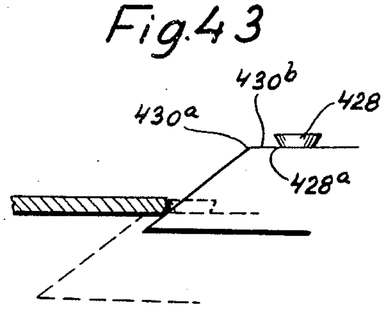
Figure 44:
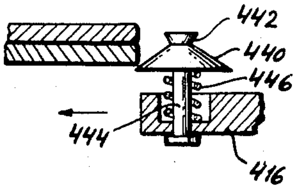
Figure 45:
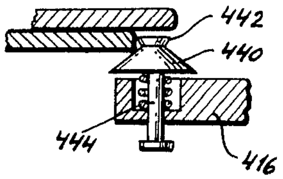
Figure 46:
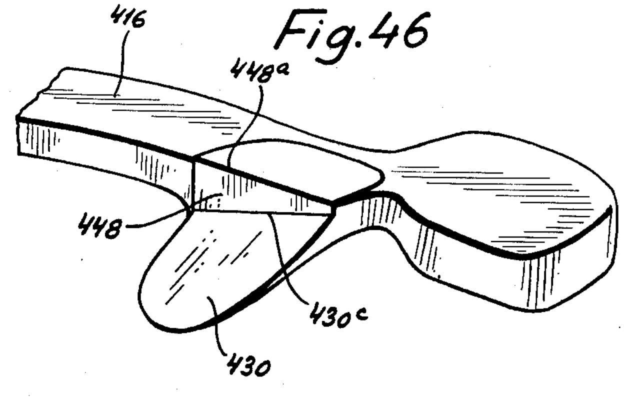
Figure 47:
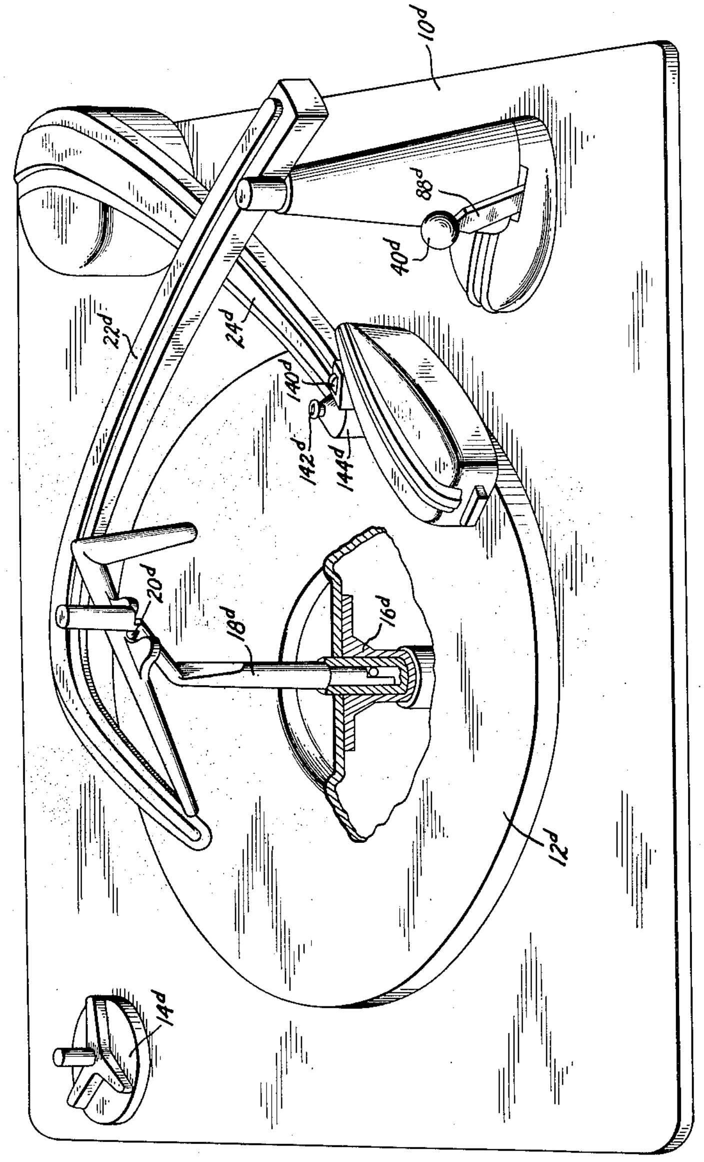
Figure 48:
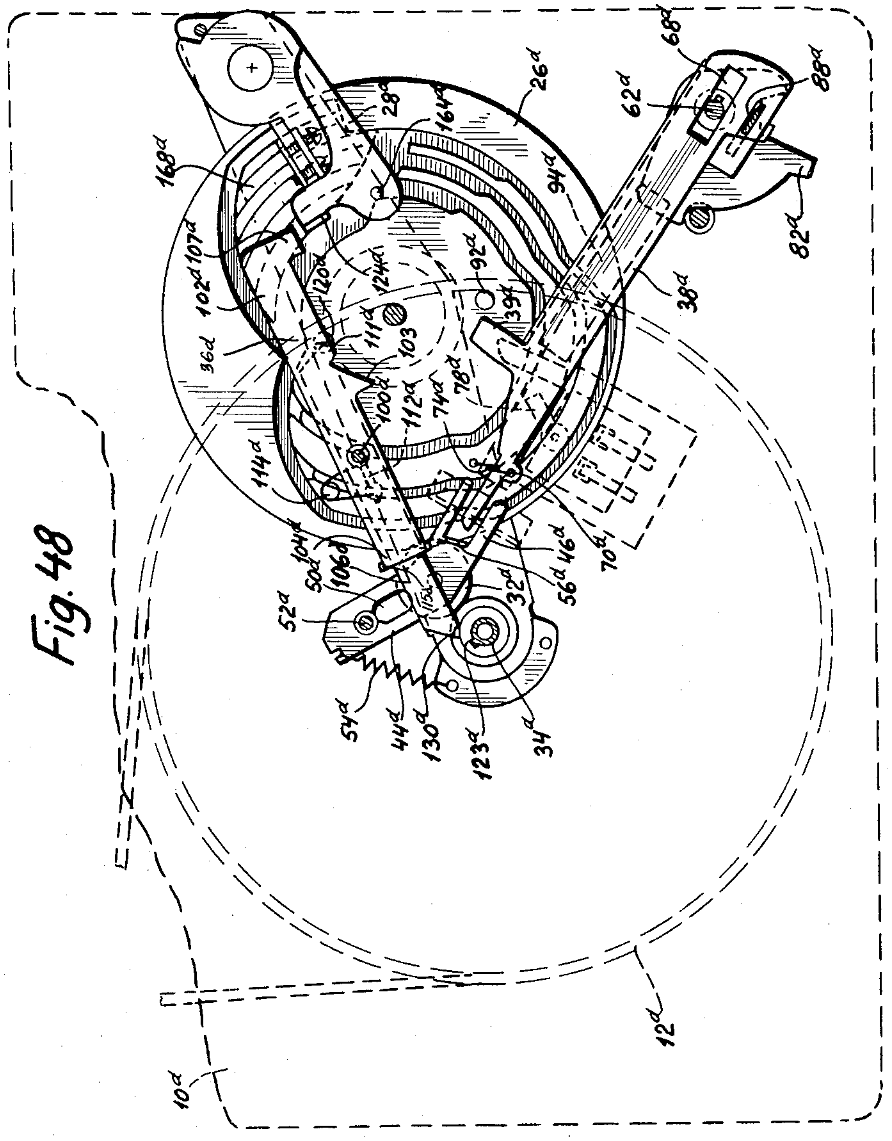
Figure 49:
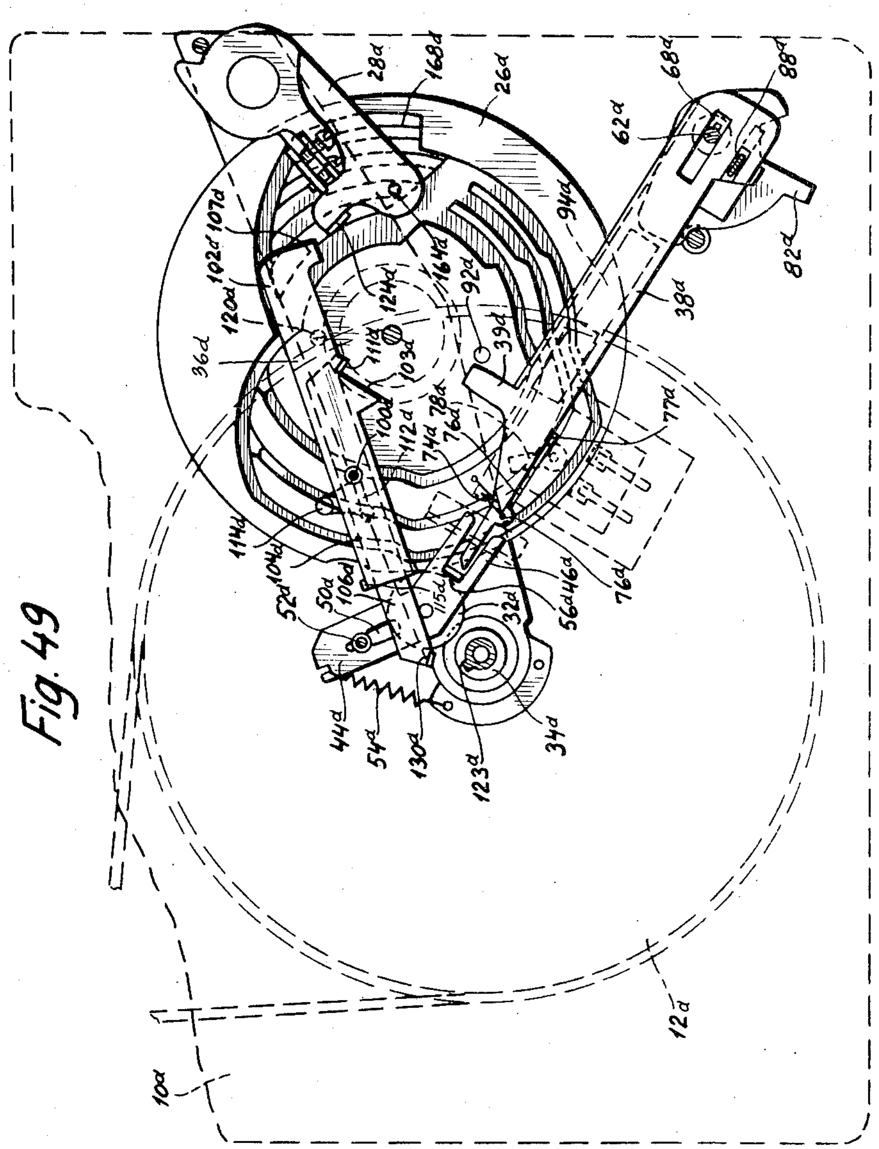
Figure 50:
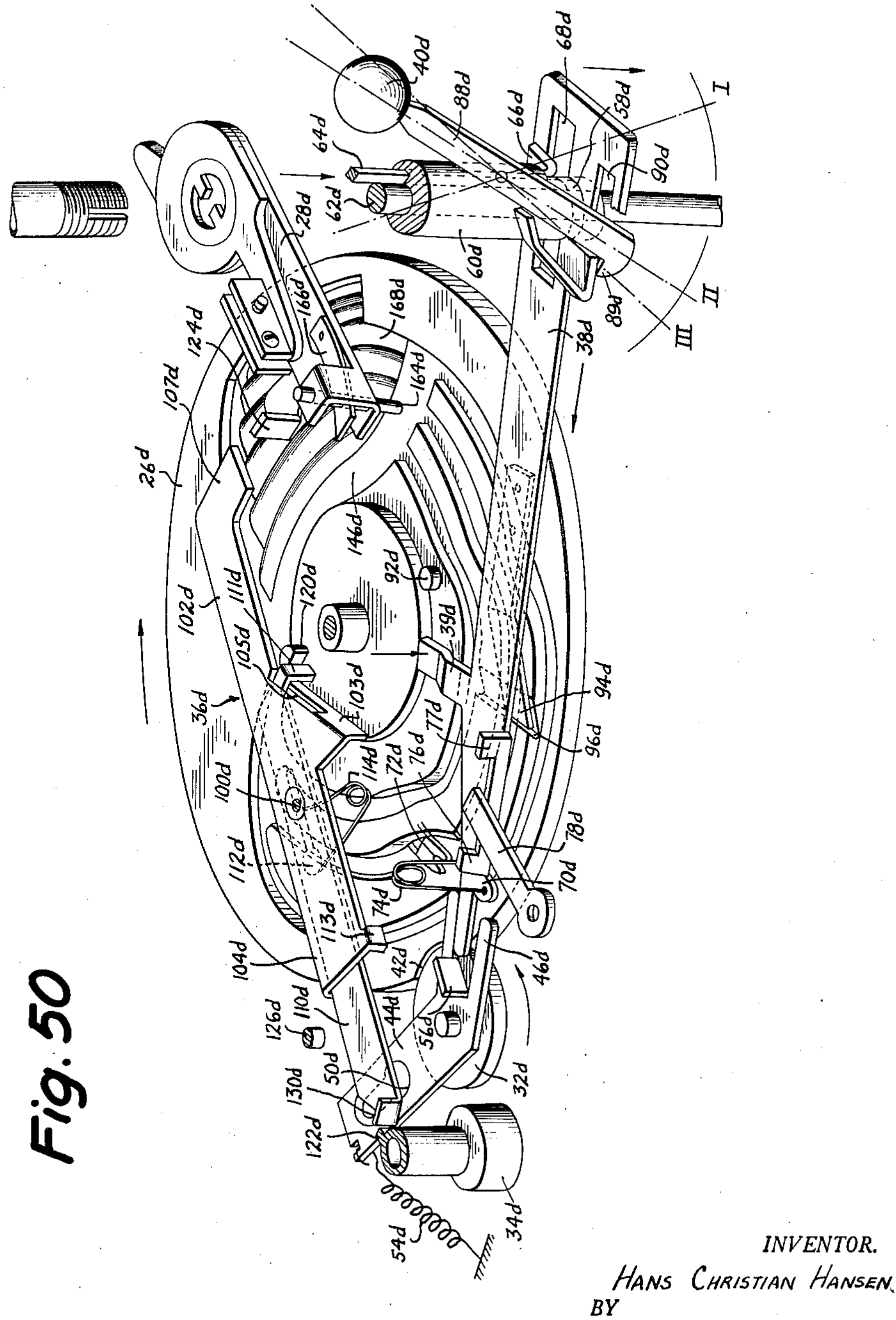
Figure 51:
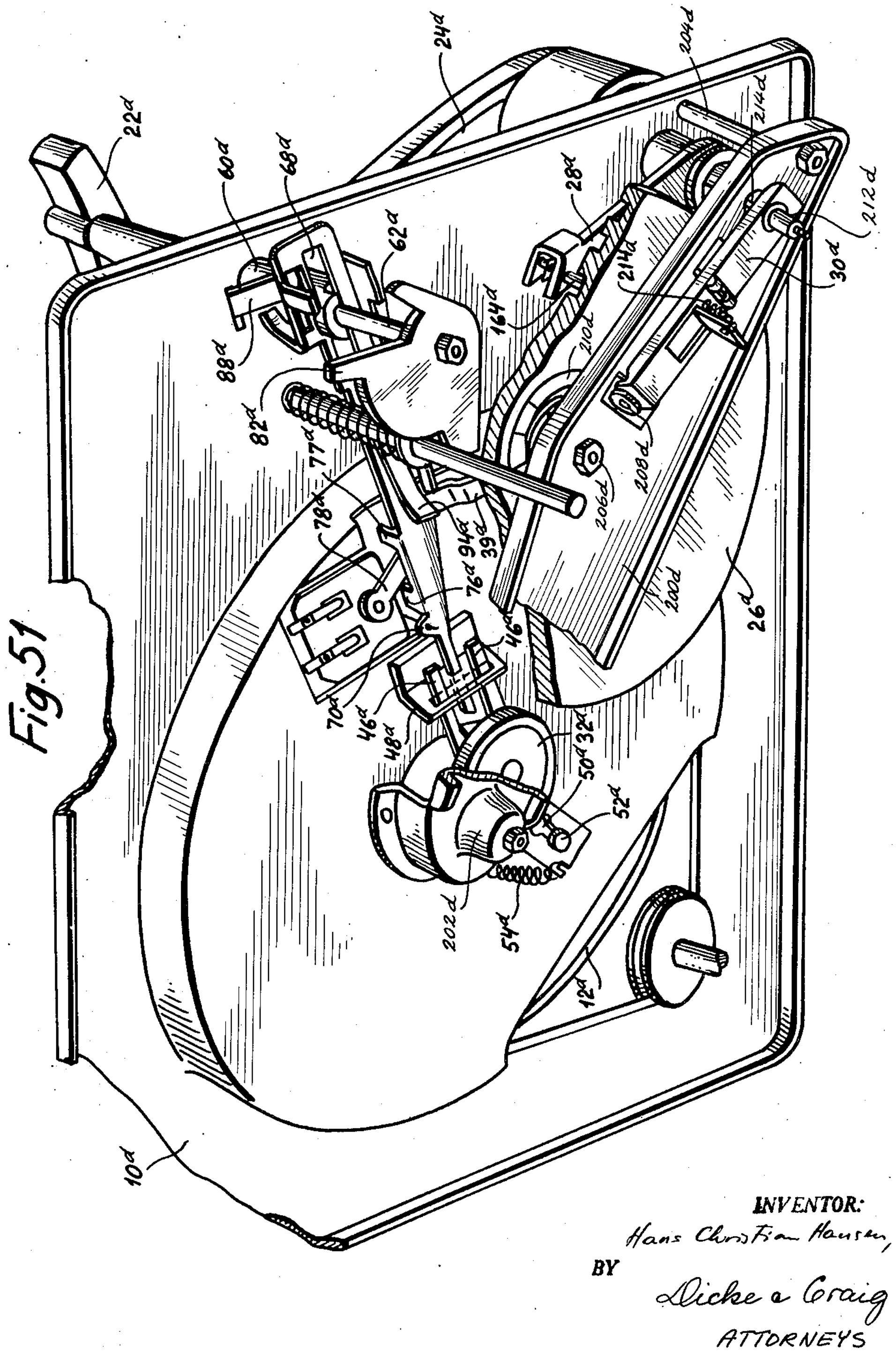
Figure 52:
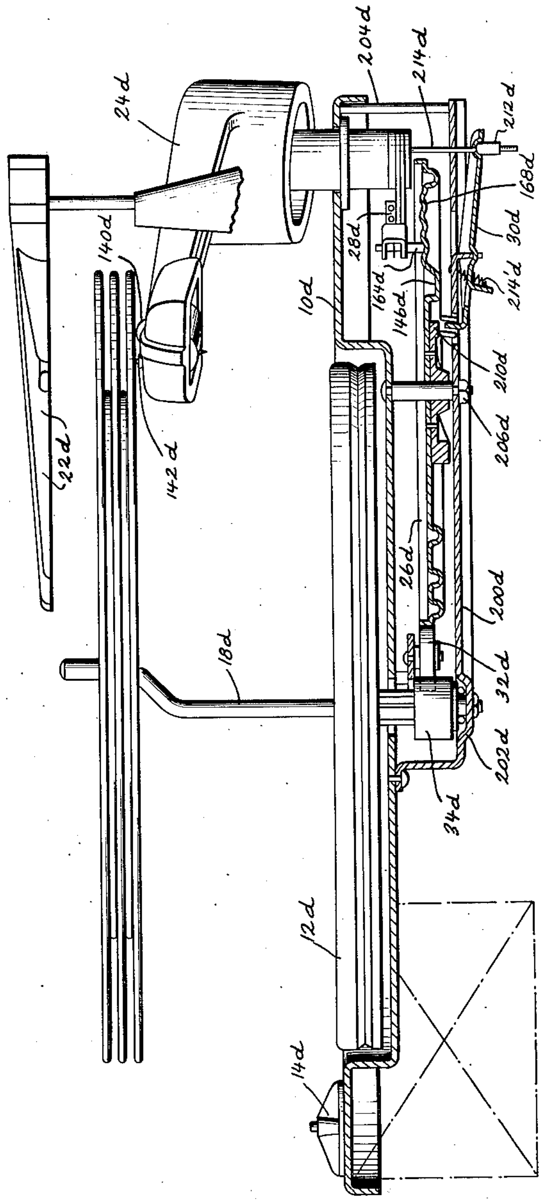
Figure 53:
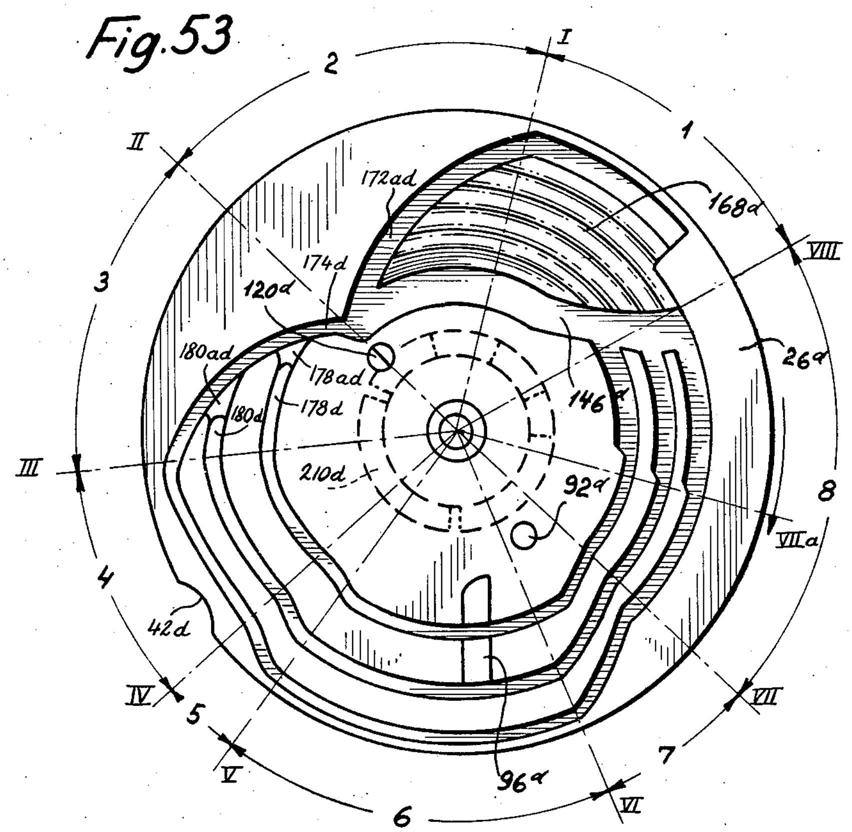
Figure 54:
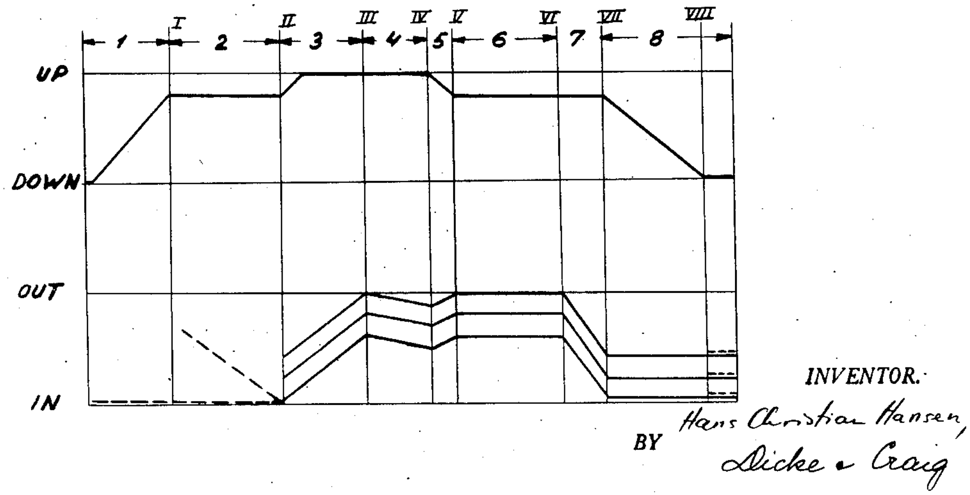
Figure 55:
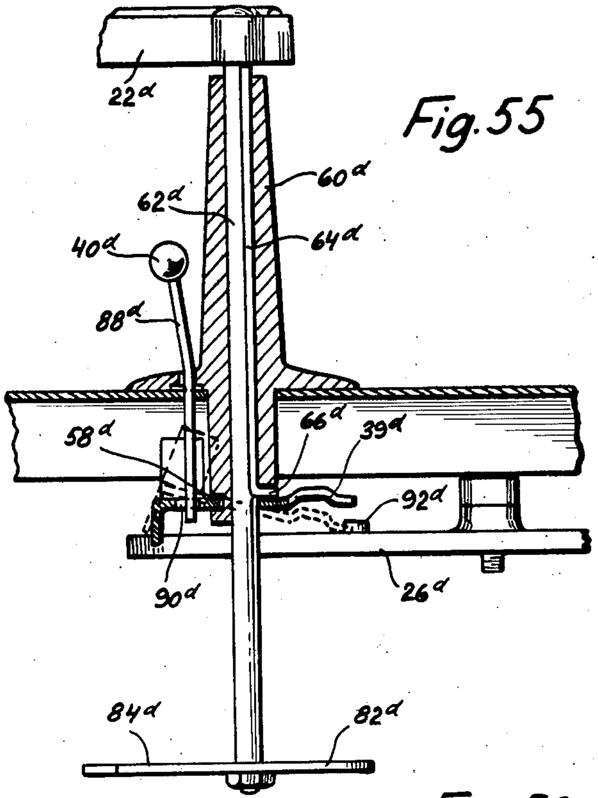
Figure 56:
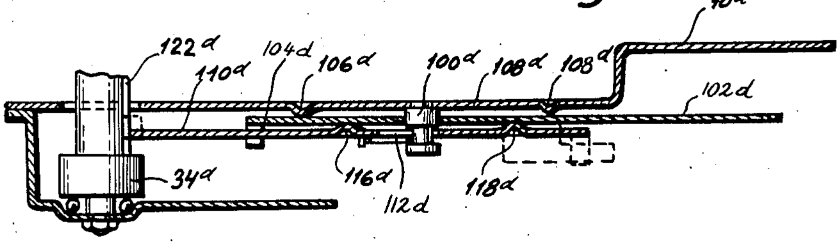
Figure 57:
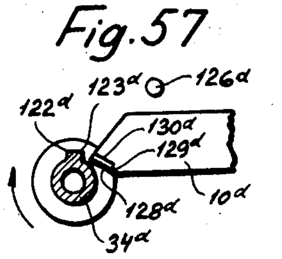

FIGURE 1 is a plan view of an automatic phonograph according to the invention, in one embodiment, FIGURE 2 is a perspective top view, partly in section, of the operating parts of the phonograph shown in FIGURE 1 with the base plate removed, FIGURE 3 is a perspective view of the cam mechanism and its surrounding parts in the embodiment shown in FIGURE 1 as seen from the bottom side of the phonograph, FIGURE 4 is a detail of the start-and-stop mechanism, FIGURE 5 is a perspective view of the cam mechanism and the members controlling the up and down movement of the pick-up of the embodiment shown in FIGURE 1, as seen from the bottom, FIGURE 6 is a perspective view of the trip-starting mechanism of the embodiment shown in FIGURE 1, as seen from the bottom, FIGURE 7 is a vertical section through the mechanism controlling the vertical movement of the pick-up, FIGURE 8 is a plan view of the trip starting mechanism and appertaining part, as seen from the top, FIGURE 9 is a plan view of the pick-up central cam mechanism, as seen from the bottom, FIGURE 9*a* is a diagram showing the pick-up movement cycles, FIGURE 10 is a vertical section through the central spindle, FIGURE 11 is a perspective view of the motor-driving mechanism, FIGURE 11*a* is a detail of the motor driving mechanism, FIGURE 12 is a plan view of another ambodiment of an automatic phonograph according to the invention, FIGURE 13 is a perspective top view of the operating parts of the phonograph with the base plate removed and partly in section, of the embodiment shown in FIGURE 12, FIGURE 14 is a perspective view of the cam mechanism and its surrounding parts of the embodiment shown in FIGURE 12, FIGURE 15 is a detail of the stop-and-start mechanism, FIGURE 16 is a perspective view of the cam mechanism and its surrounding parts of the embodiment shown in FIGURE 12 as seen from the bottom side of the phonograph, FIGURE 17 is a perspective view of the trip-starting mechanism of the embodiment shown in FIGURE 12, FIGURE 18 is a plan view of the trip-starting mechanism and appertaining part as seen from the top of the embodiment shown in FIGURE 12, FIGURE 18*a* is a vertical section through the mechanism shown in FIGURE 18, FIGURE 19 is a plan view of the cam mechanism of the embodiment shown in FIGURE 12 as seen from the bottom, FIGURE 19*a* is a diagram showing the pick-up movement cycles, FIGURE 20 is a detail of the automatic switch-off mechanism of the embodiment shown in FIGURES 12–18 in vertical section, FIGURE 21 is a perspective view of the pick-up arm for the embodiment shown in FIGURES 12–19, FIGURE 22 is an elevational view of the edge portion of a stack of records supported in connection with the pick-up arm shown in FIGURE 21, FIGURE 23 is a plan view of the pick-up arm shown in FIGURE 20, FIGURE 24 is a plan view of a further embodiment of an automatic phonograph according to the invention, FIGURE 25 is a perspective top view of the operating parts of the phonograph shown in FIGURE 24, FIGURE 26 is a perspective view of the cam mechanism and its surrounding parts by the embodiment of FIGURE 24 and FIGURE 25, FIGURE 27 is a detail of the stop-and-start mechanism shown in FIGURE 26, FIGURE 28 is a perspective view of the cam mechanism and its surrounding parts in the embodiment shown in FIGURES 24–27, as seen from the bottom, FIGURE 29 is an exploded perspective view of the trip-starting mechanism of the embodiment shown in FIGURES 24–28, FIGURE 30 is a plan view of the trip-starting mechanism and appertaining parts of the embodiment shown in FIGURES 24–29, FIGURE 30*a* is a vertical section through the mechanism shown in FIGURE 30, FIGURE 31 is a plan view of the cam mechanism of the embodiment shown in FIGURES 24–30, FIGURE 31*a* is a diagram showing the pick-up movement cycle, FIGURE 32 is a detail of the automatic switch-off-mechanism of the embodiment shown in FIGURES 24–31 in vertical section, FIGURE 33 is a perspective view of the pick-up arm in the embodiment shown in FIGURES 24–32, FIGURE 34 is a vertical section through the edge portion of a stack of records in connection with the pick-up arm shown in FIGURE 33 with the parts in one position, FIGURE 35 is a vertical section of the pick-up arm and records in FIGURE 34 with the parts in another position, FIGURE 36 is a perspective view of the record-feeding arrangement, in which, to facilitate the survey, the feeler mechanism has been omitted, FIGURE 37 is a plan view of the record-feeding arrangement with the record-feeding member shown in two positions, FIGURE 38 is an end view of the record-feeding arrangement showing the parts in position before engagement with a large size record, FIGURE 39 is a corresponding end view showing the engagement with a large size record, FIGURE 40 is an end view of the record-feeding arrangement showing the parts in position before engagement with a small size record, FIGURE 41 is a corresponding end view showing the engagement with a small size record, FIGURE 42 is a schematic illustration on a larger scale, illustrating the engagement between the record-feeding member and a large record in two different positions, FIGURE 43 is a corresponding schematic end view showing the engagement with a small size record, FIGURE 44 is a schematic illustration of a modified record-feeding arrangement in one position, FIGURE 45 is a corresponding schematic view showing the parts in another position, FIGURE 46 is a perspective view of a further modified embodiment, FIGURE 47 is a perspective view of a record-changing phonograph according to the invention, as seen from the top side, FIGURE 48 is a plan view of the phonograph mechanism with the parts in the playing position, FIGURE 49 is a plan view of the parts in the stop position, FIGURE 50 is a perspective view of the cam member and the parts cooperating therewith, FIGURE 51 is a perspective view of certain of the parts shown in FIG. 49, seen from the bottom, FIGURE 52 is a vertical section through the phonograph, FIGURE 53 is an embodiment of the cam disc in plan view, FIGURE 54 is a movement diagram for the tone arm, FIGURE 55 is a vertical section through a part of the phonograph including the ballast arm spindle, FIGURE 56 is a partial vertical section through the phonograph showing details of the trip-starter, and FIGURE 57 is a plan view of the end of the trip-starter lever and the releasing nose operating the same.

Figure 58:
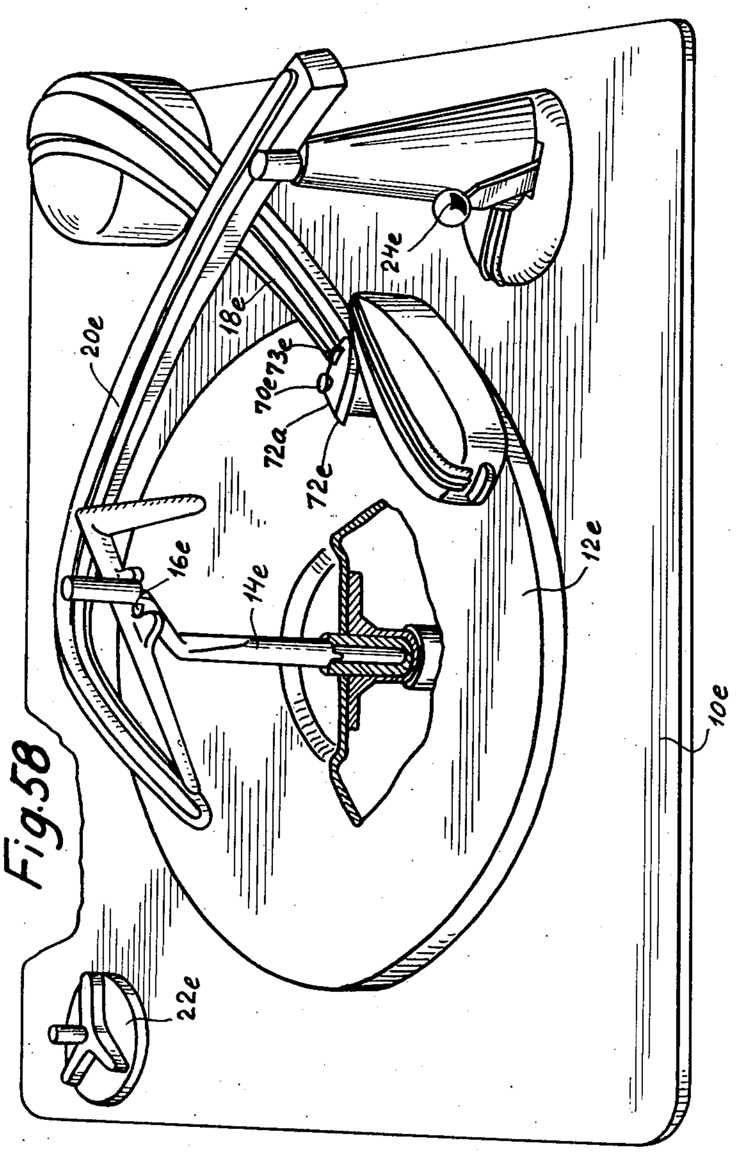
Figure 59:
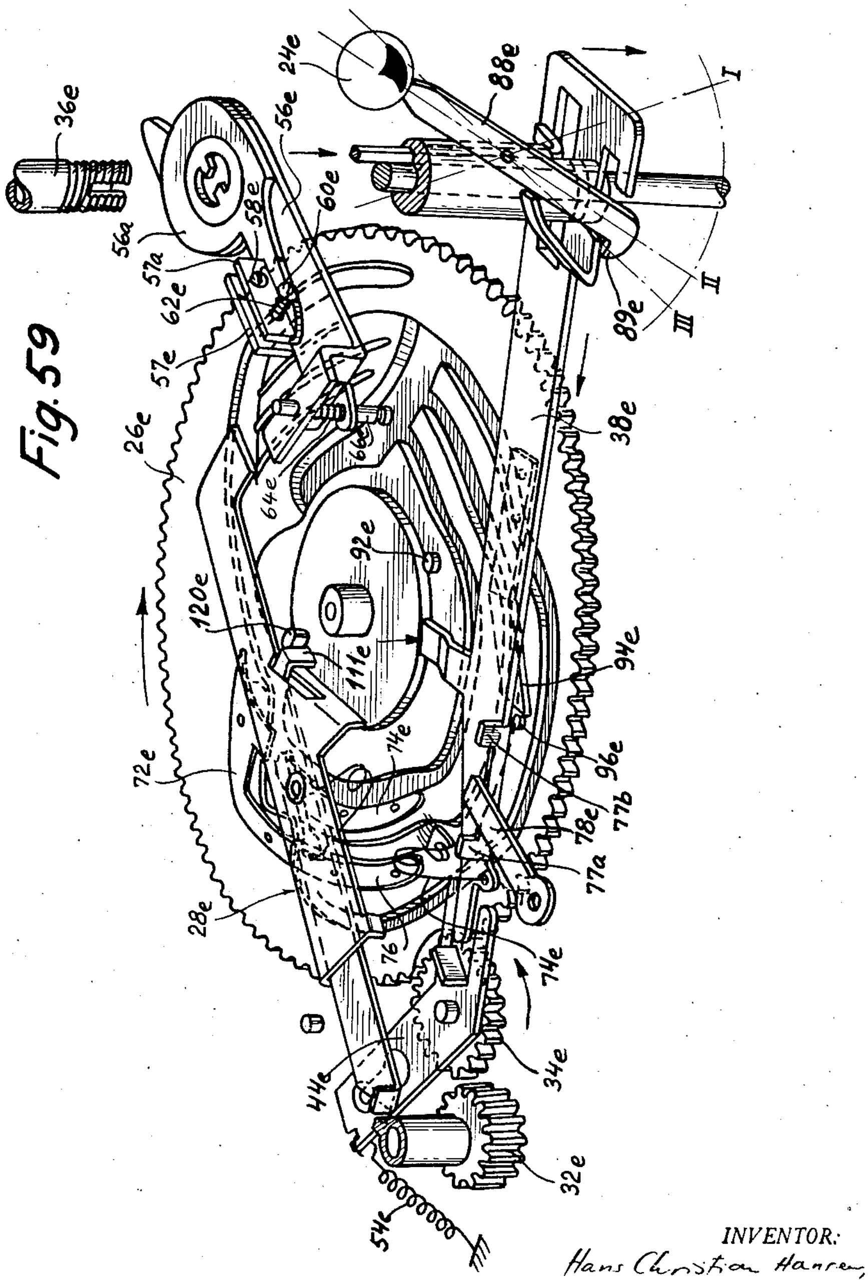
Figure 60:
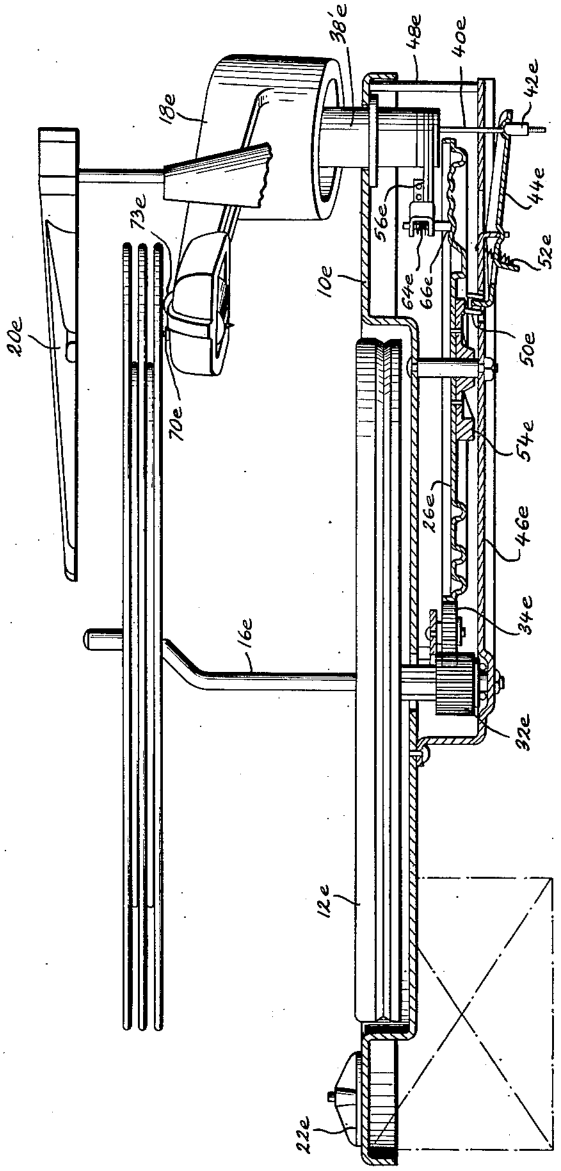
Figure 61:
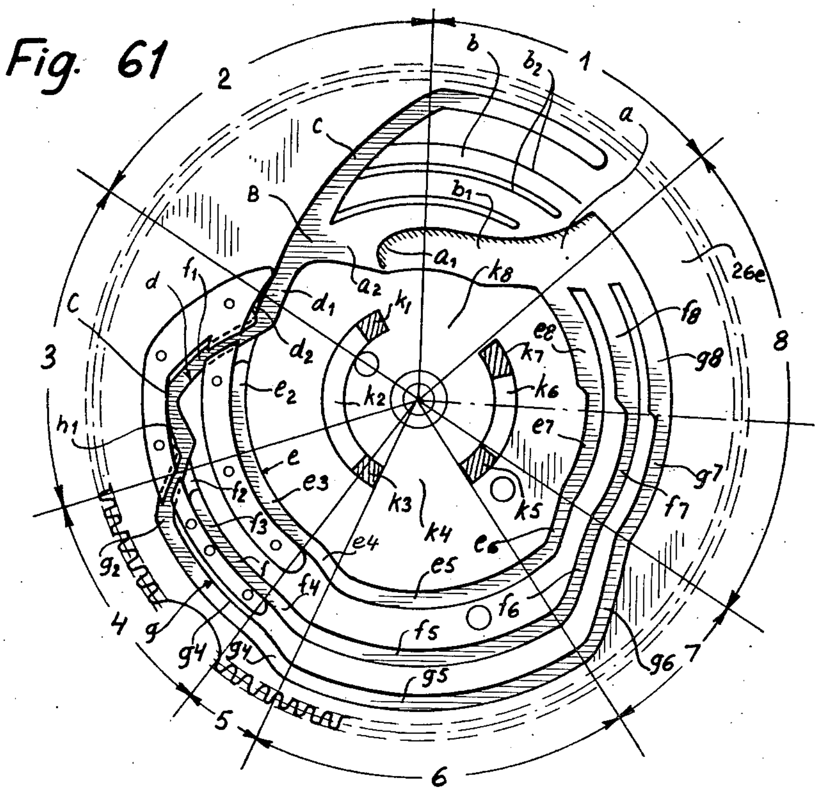
Figure 61A:
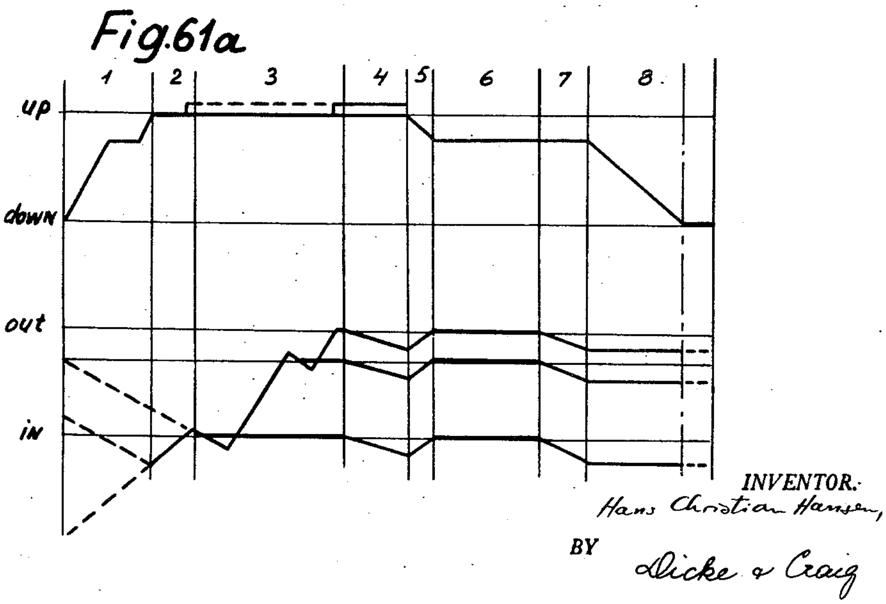
Figures 62, 63:
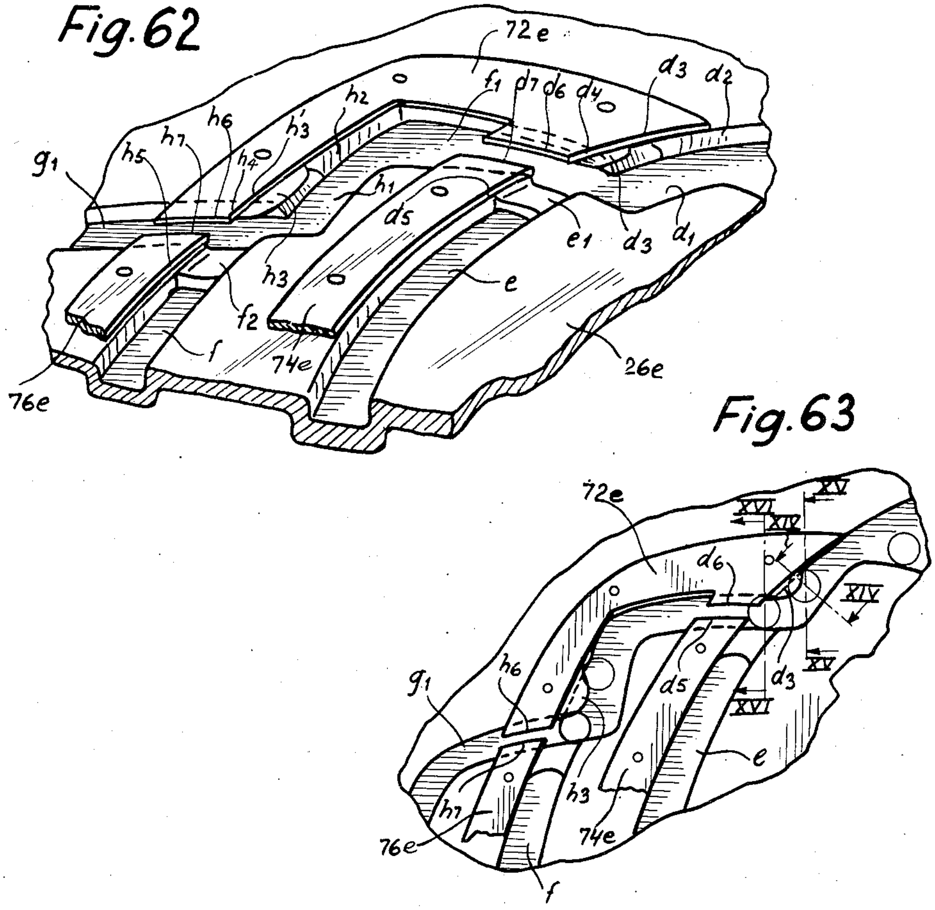
Figure 64:
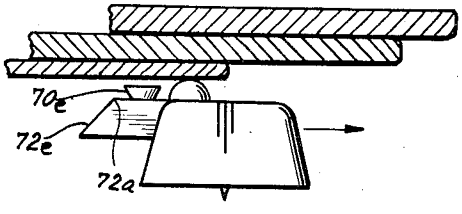
Figure 65:
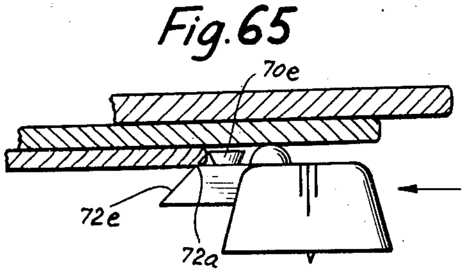
Figures 66, 67, 68, 69, 70, 71:
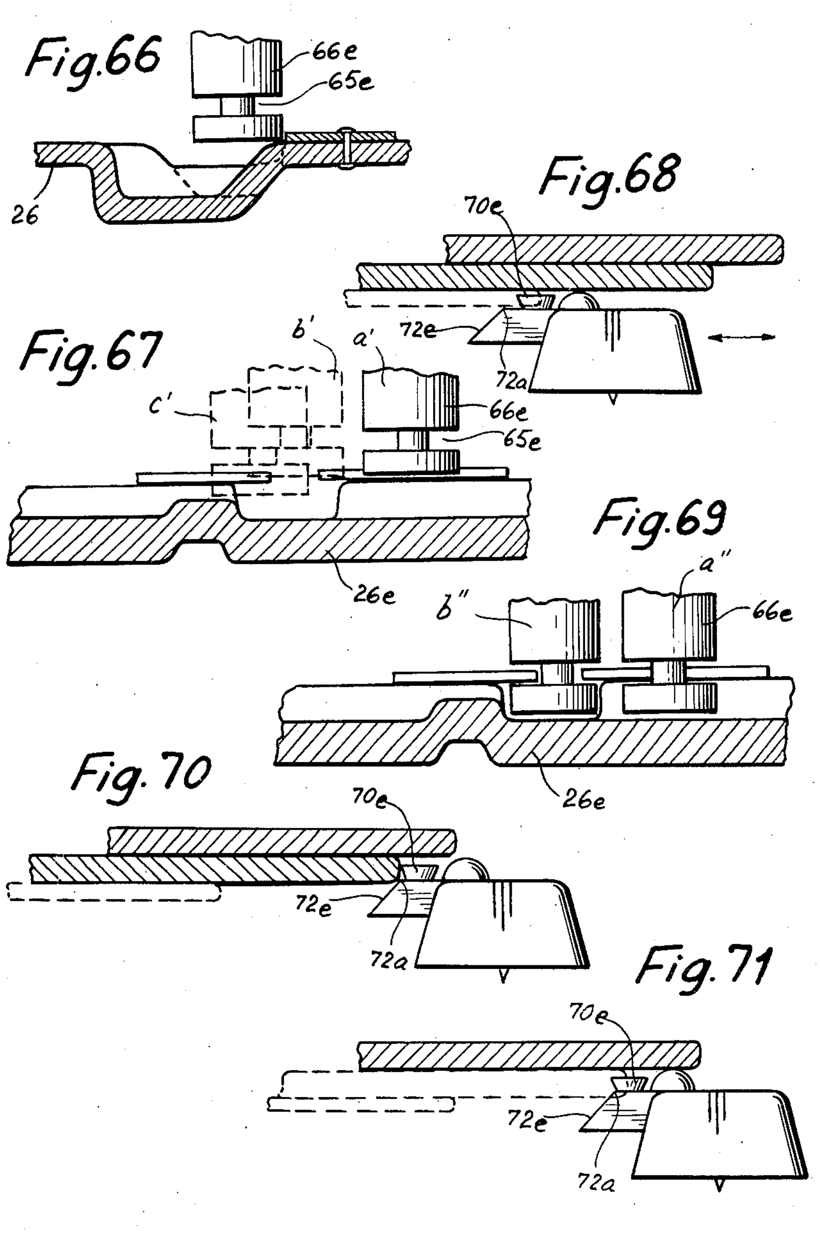
Figure 72:
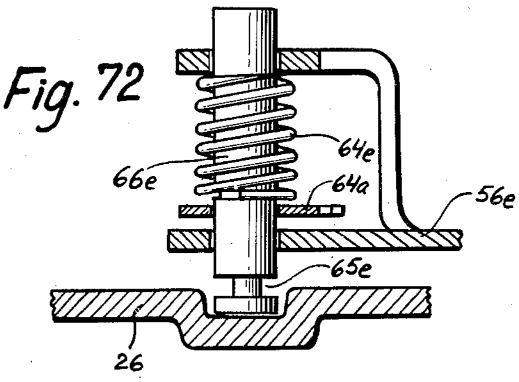
Figure 73:
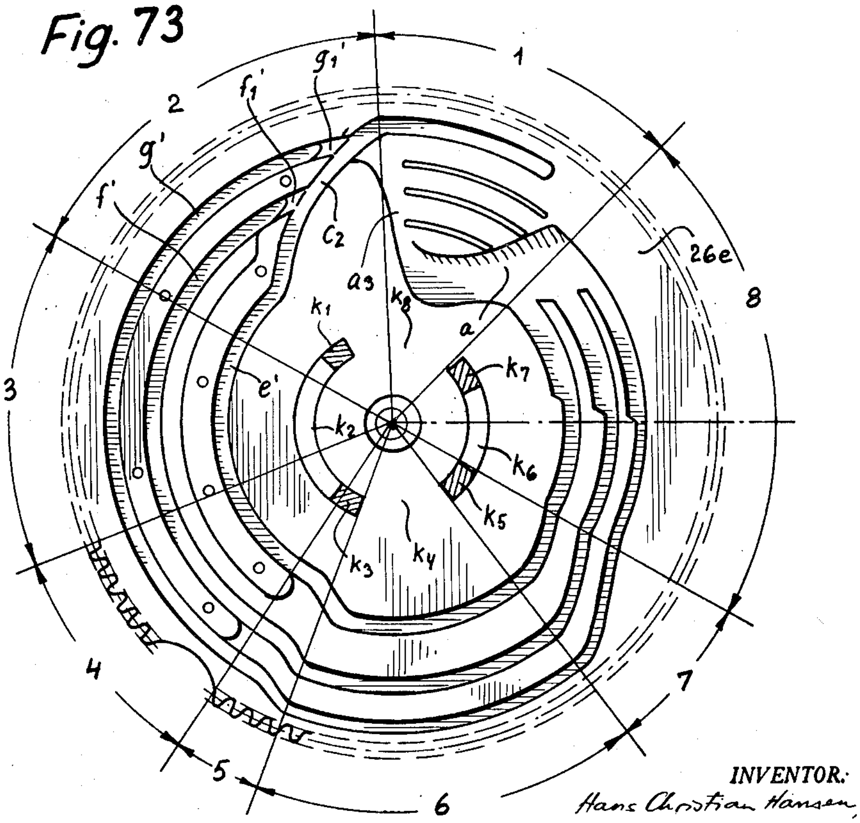
Figure 74:
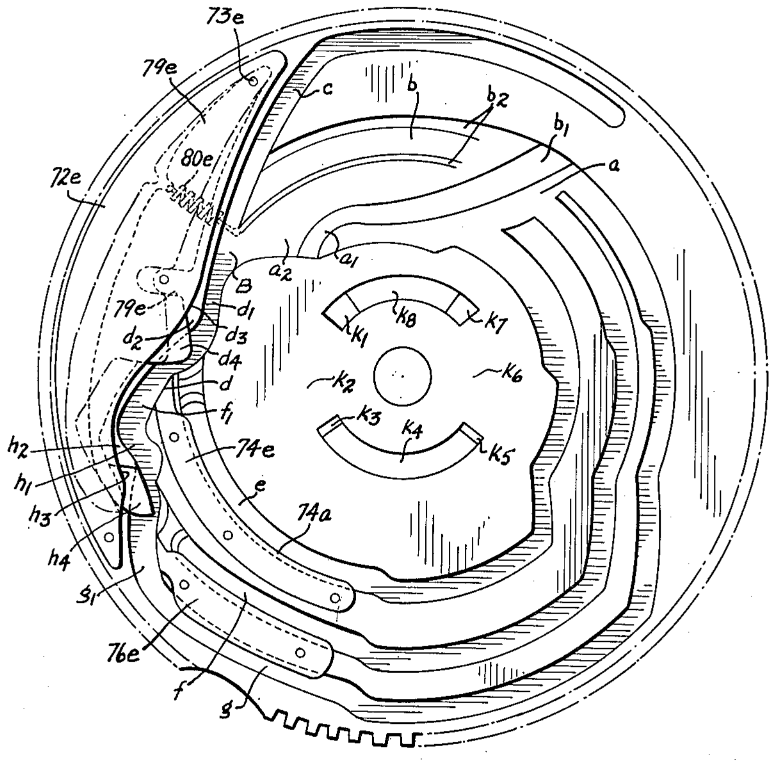
Figure 75:
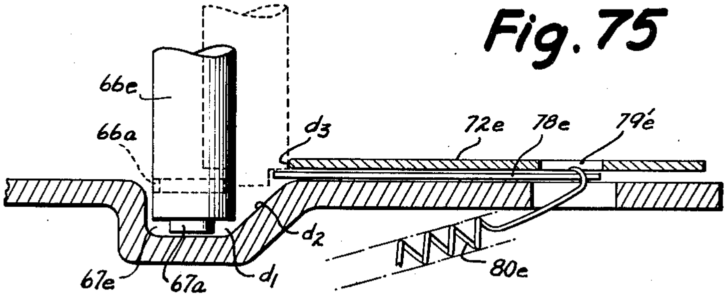
Figures 76, 77, 78:
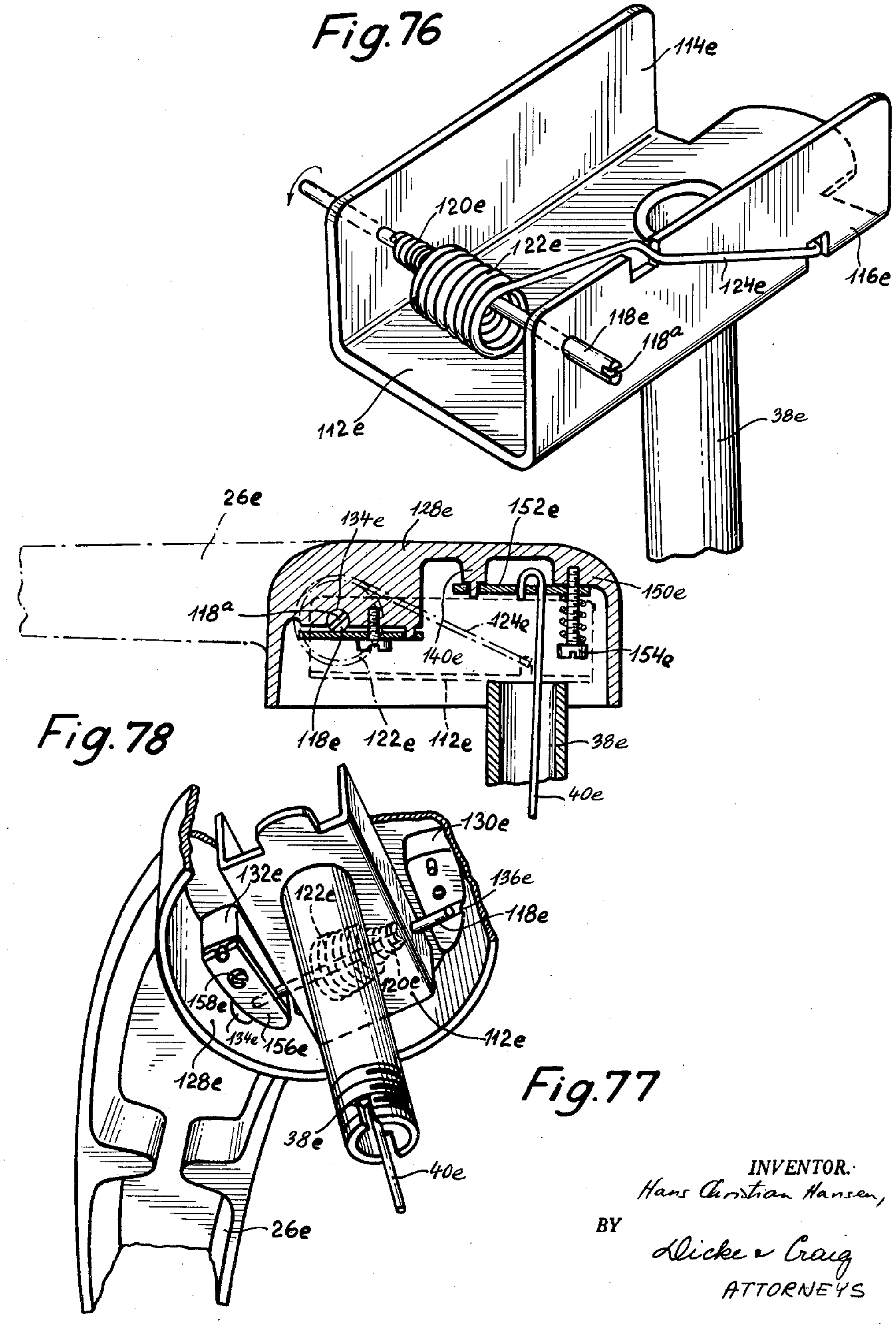
Figure 79A:
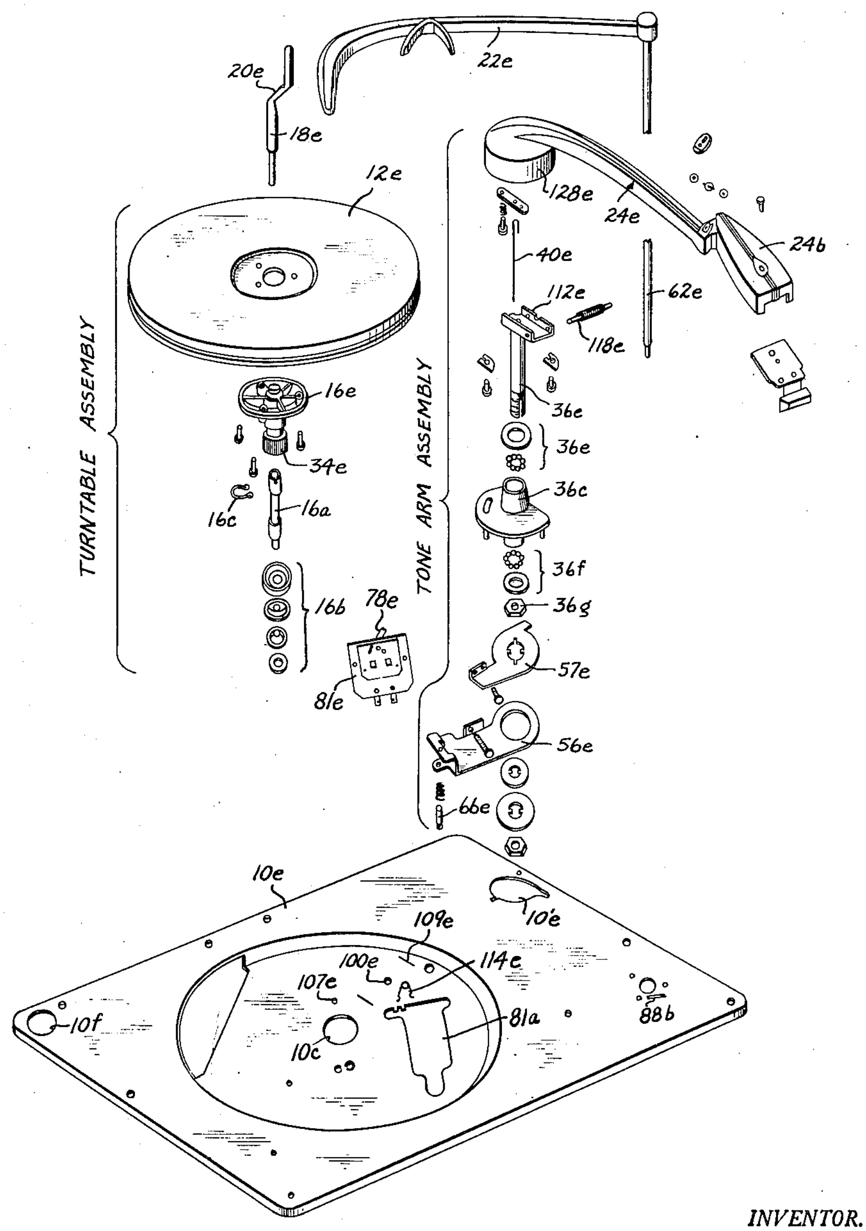
Figure 79B:
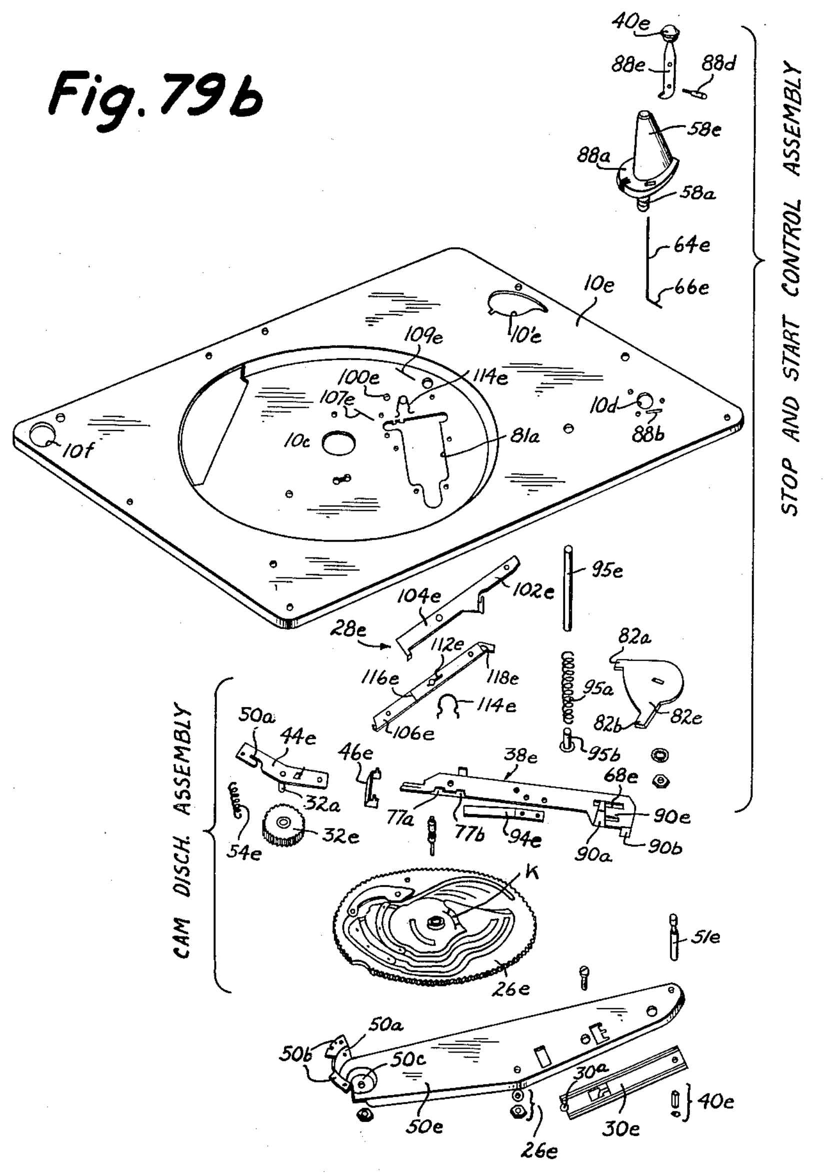
Figure 80:
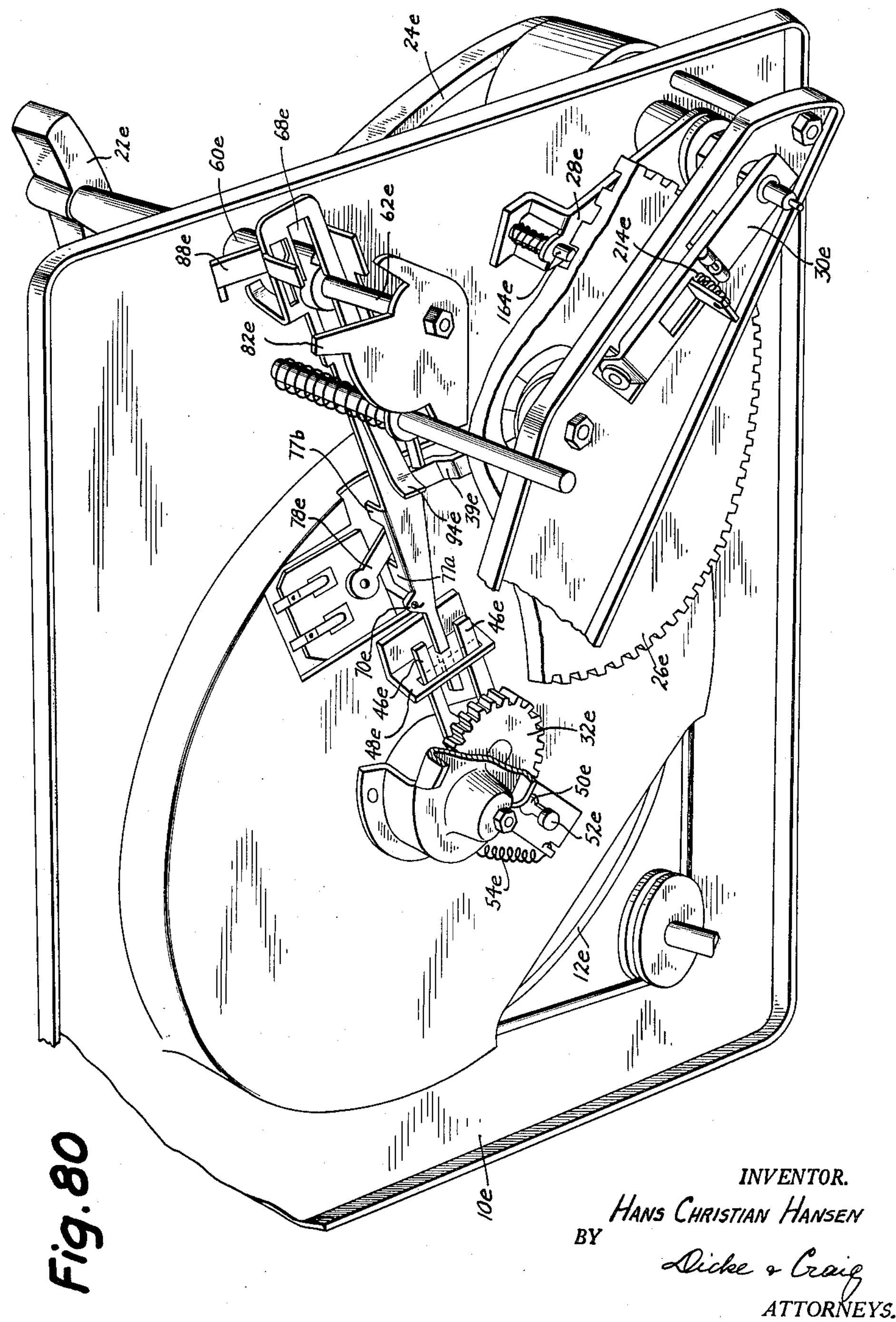
Figure 81:
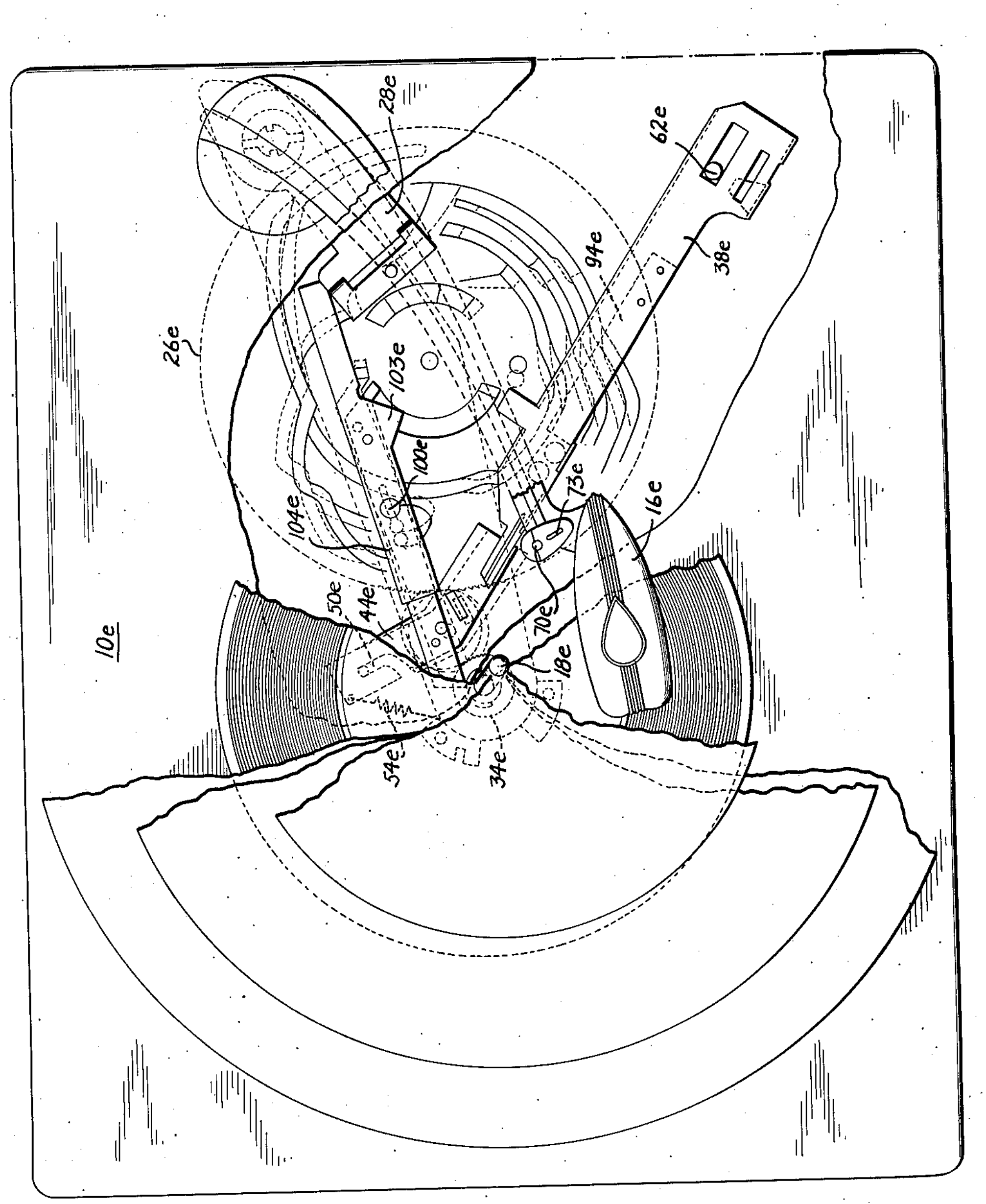
Figure 82:
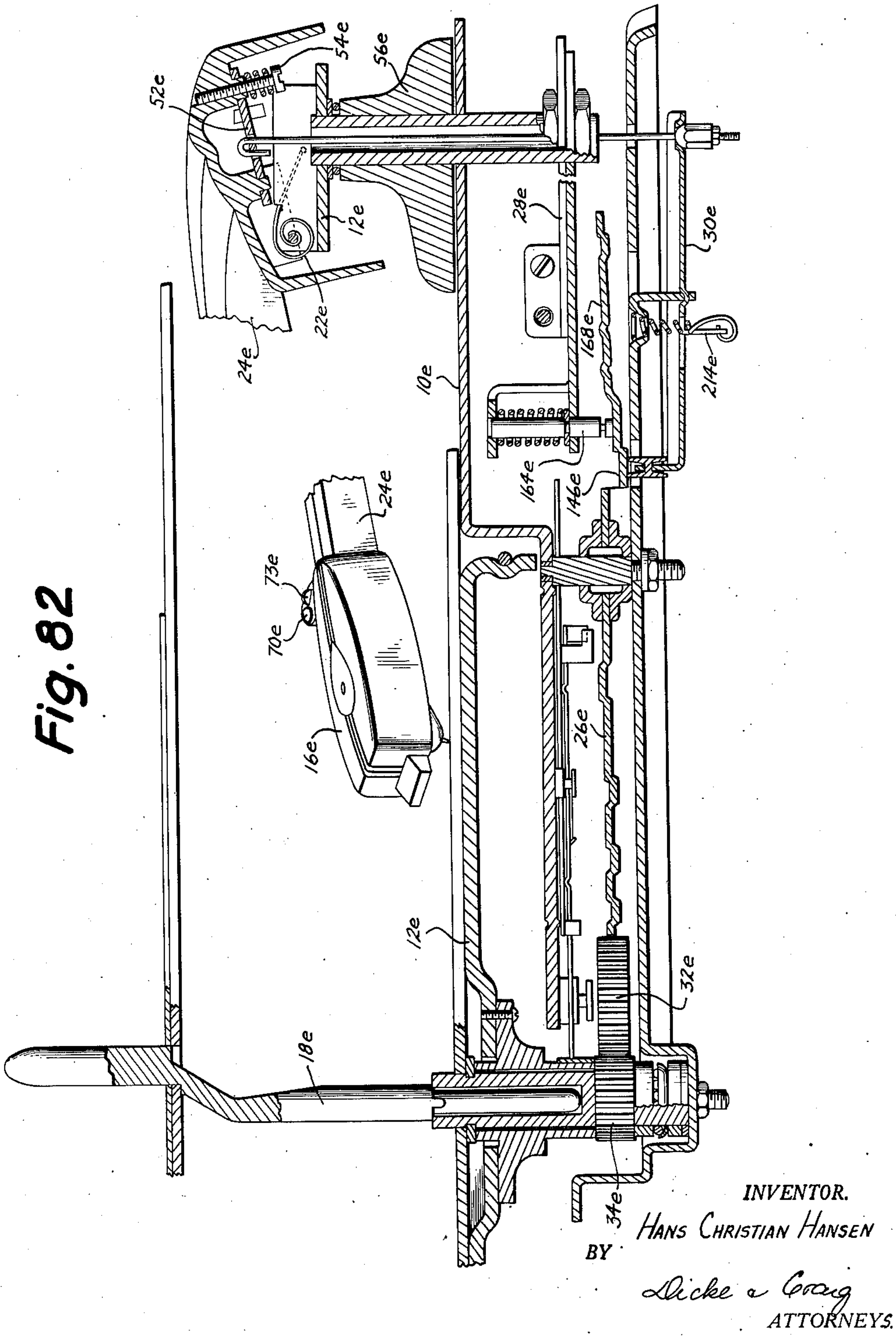
Figure 83:
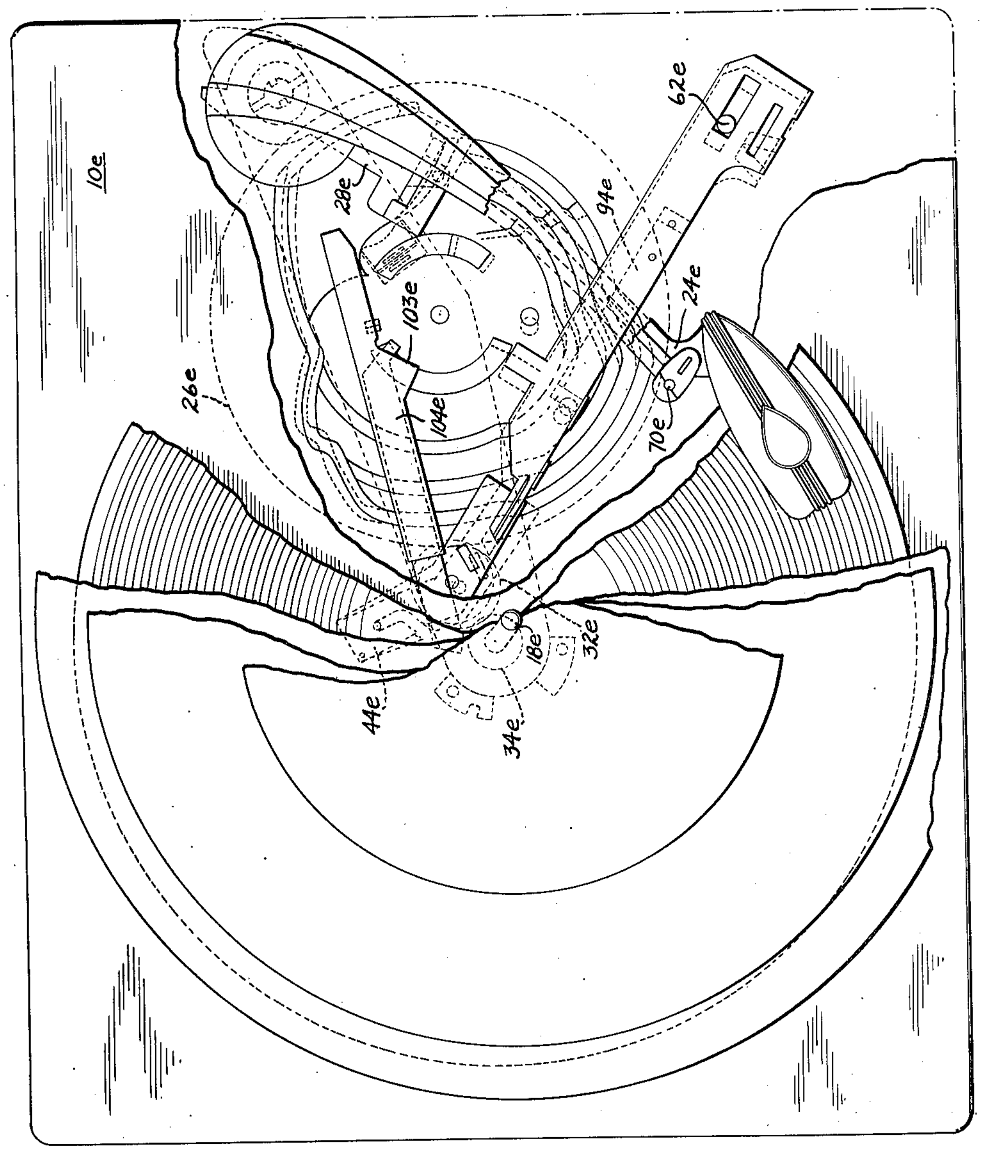
Figure 84:
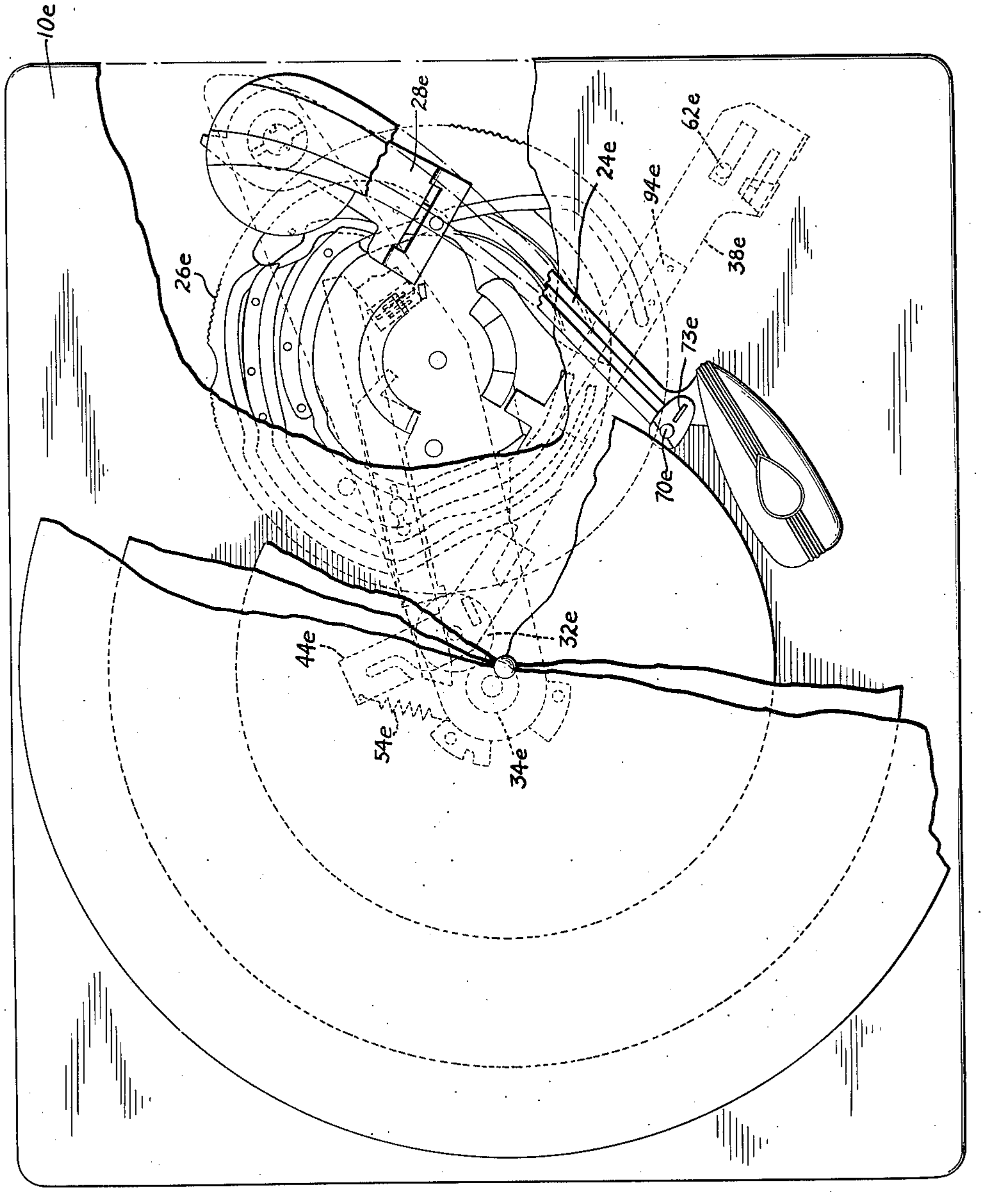
Figure 85:
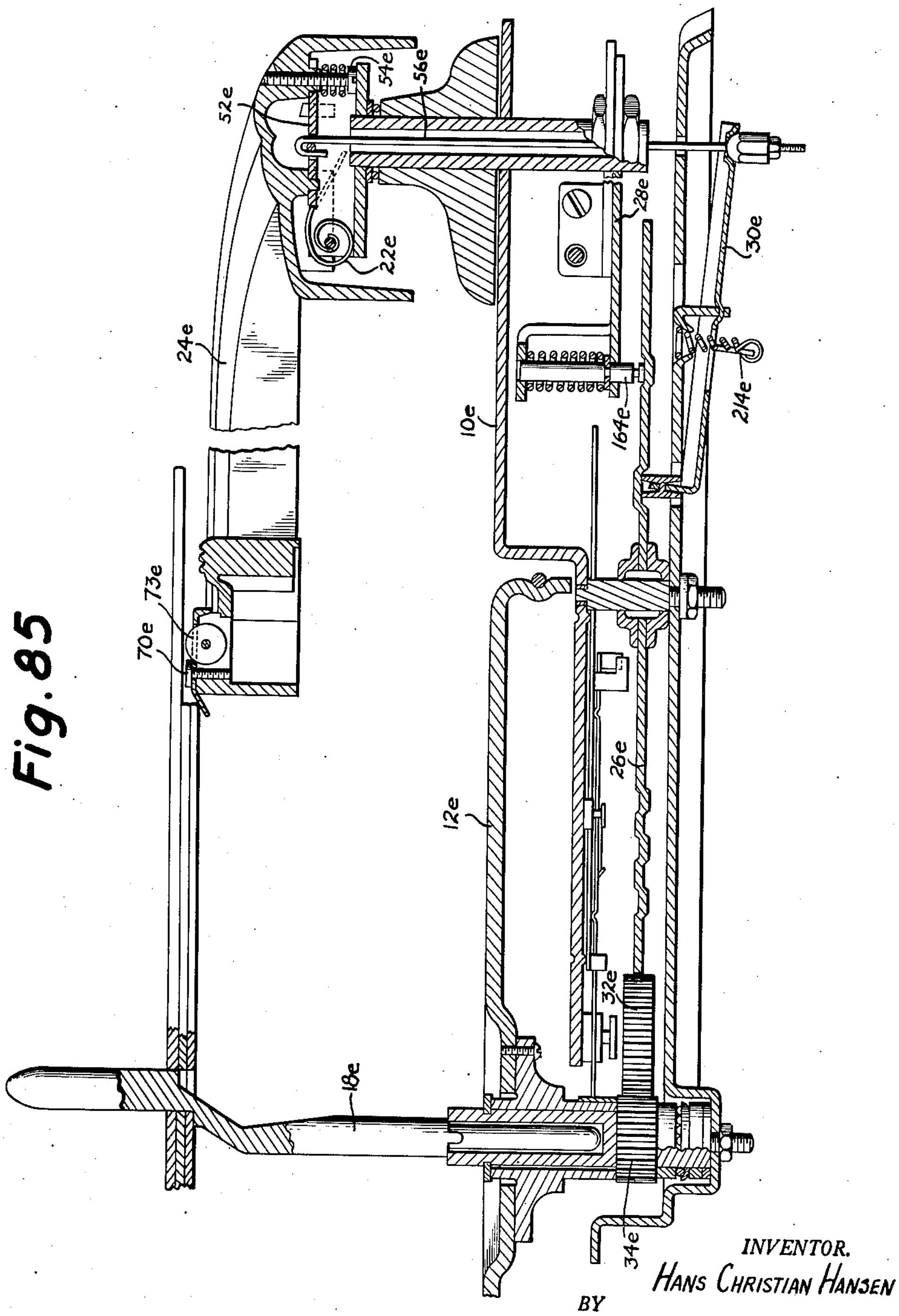
Figure 86:
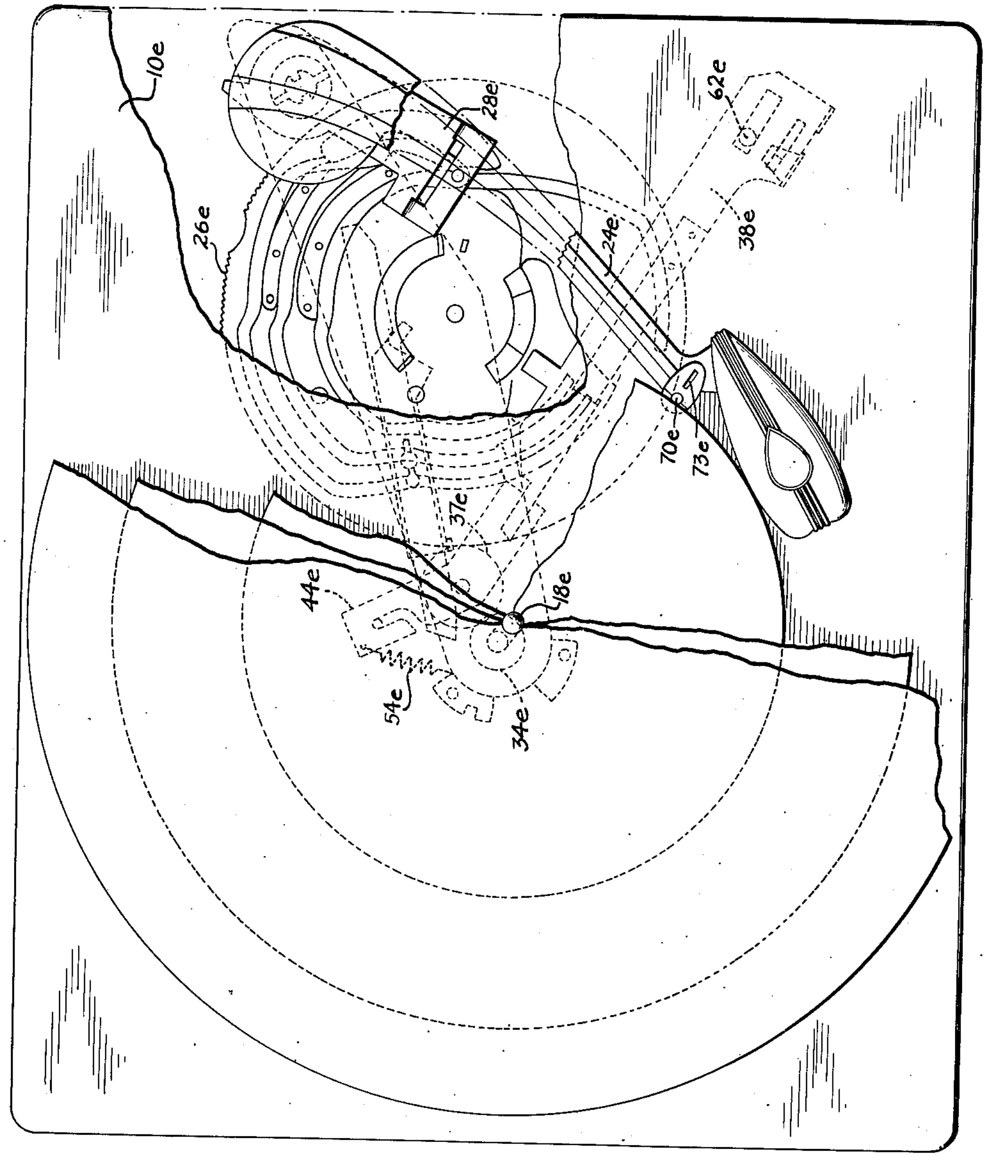
Figure 87:
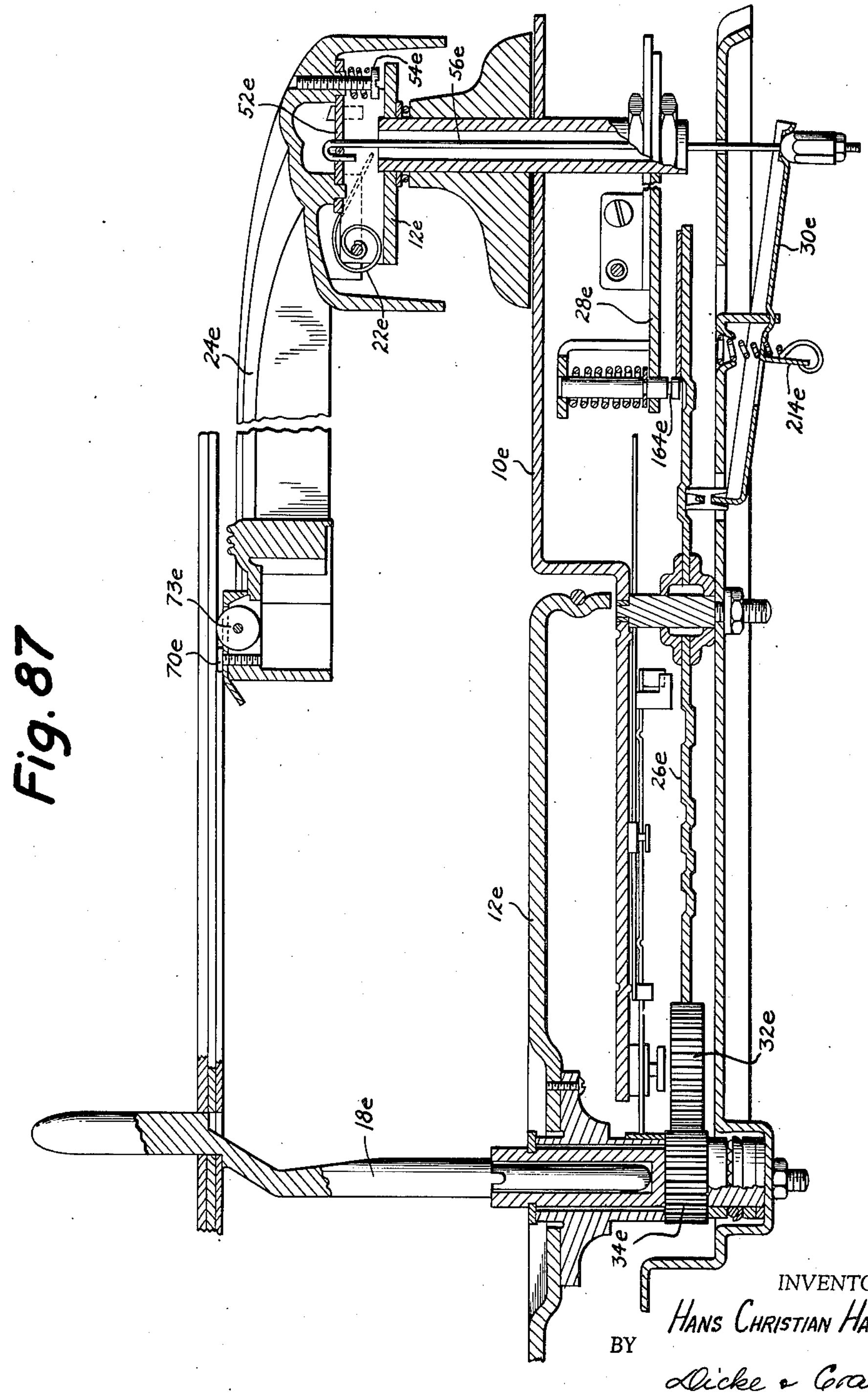
Figure 88:
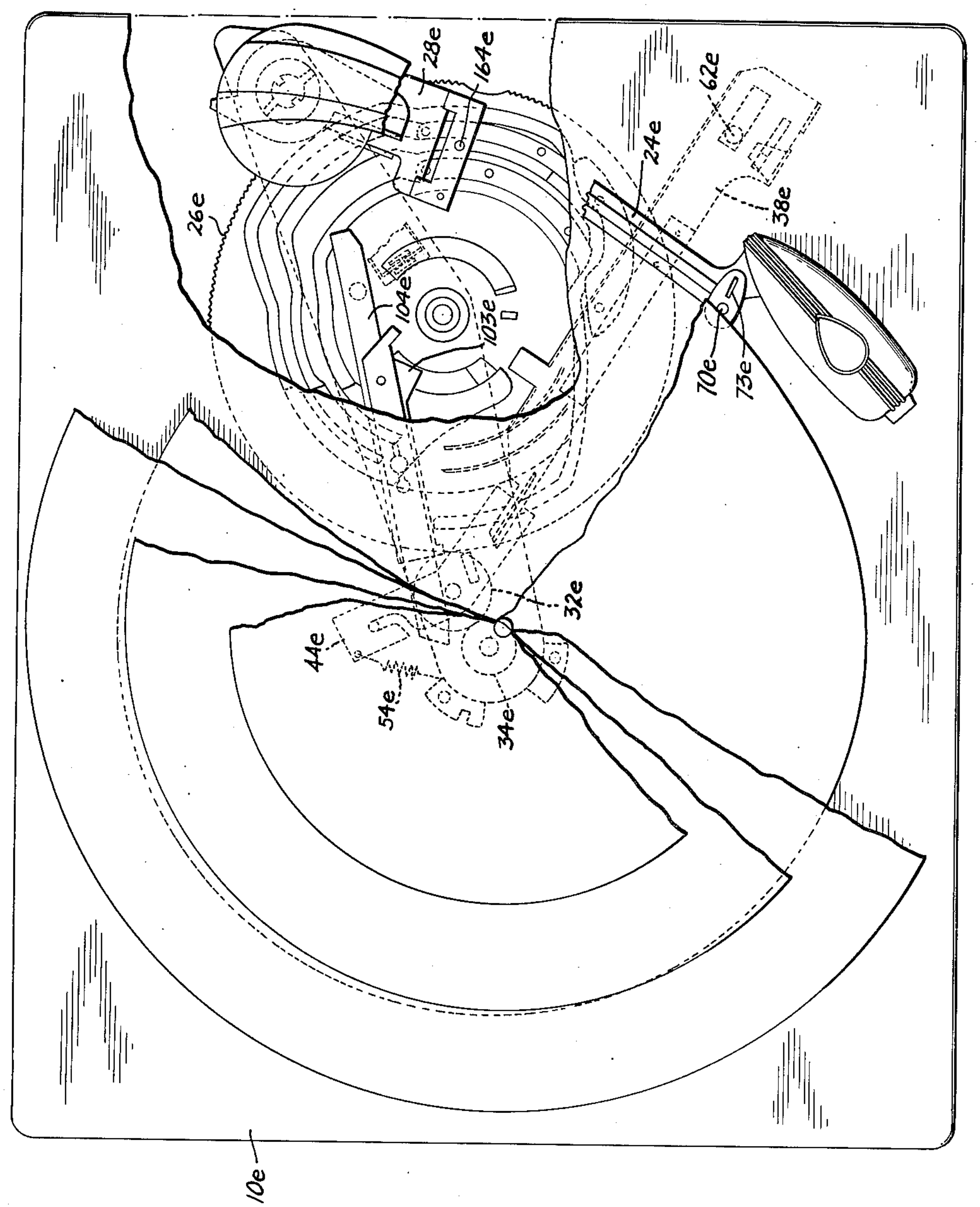
Figure 89:
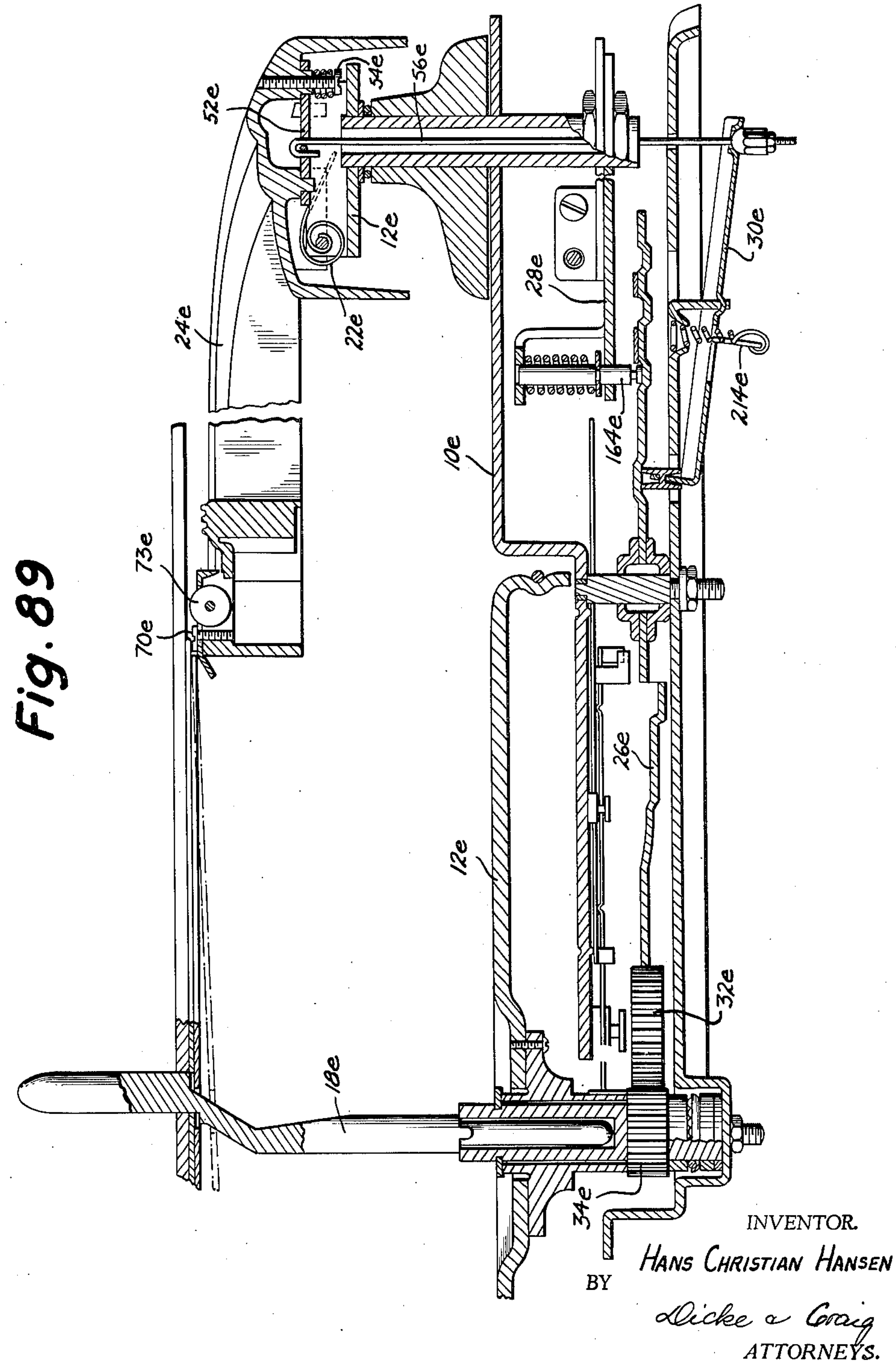
Figure 90:
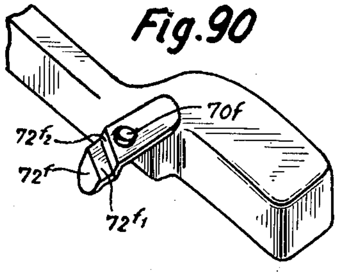
Figure 91:
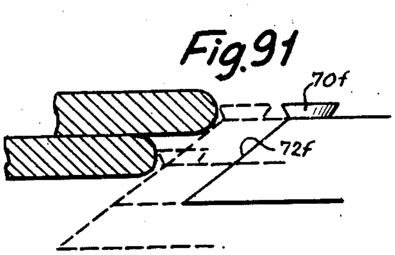
Figure 92:
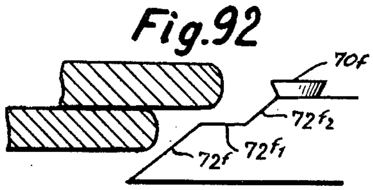
Figure 93:
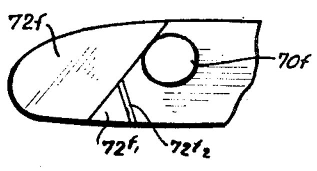
Figure 94:
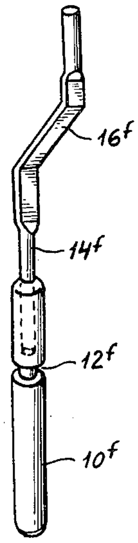
Figure 95:
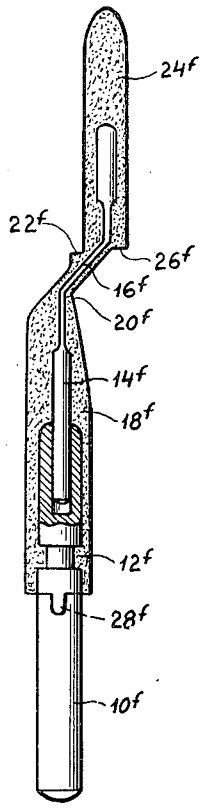
Figure 96:
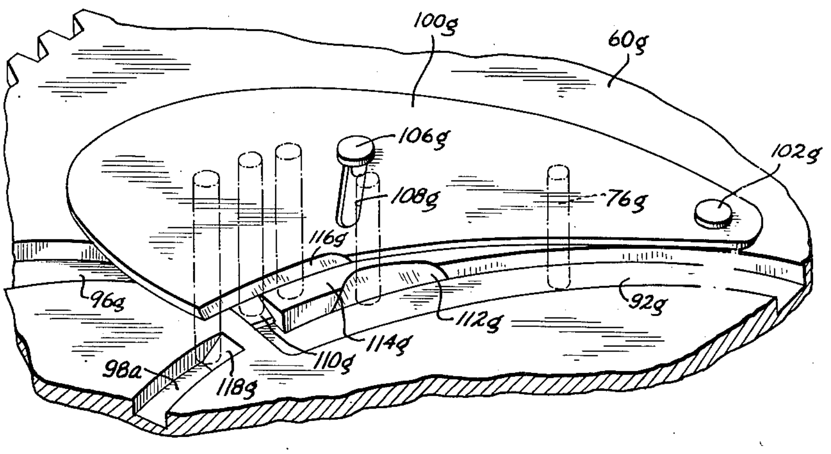
Figure 97:
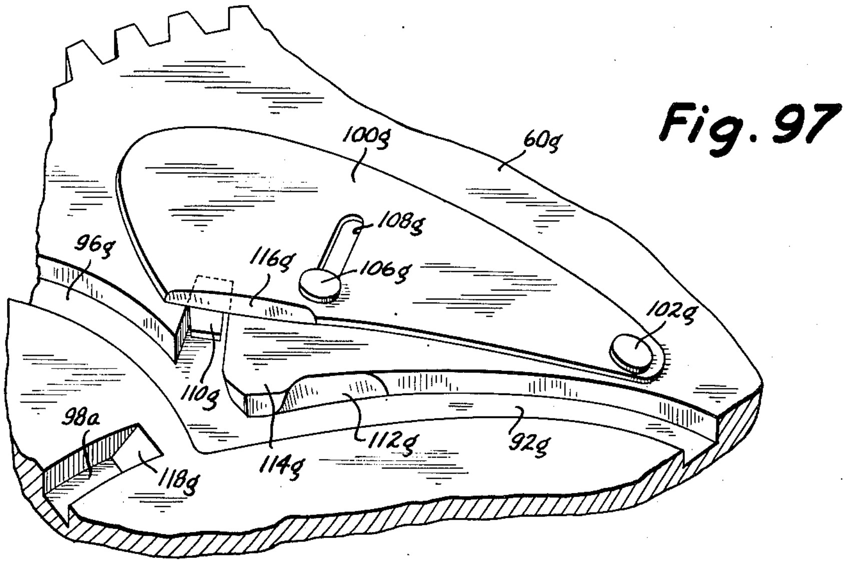
Figure 98:
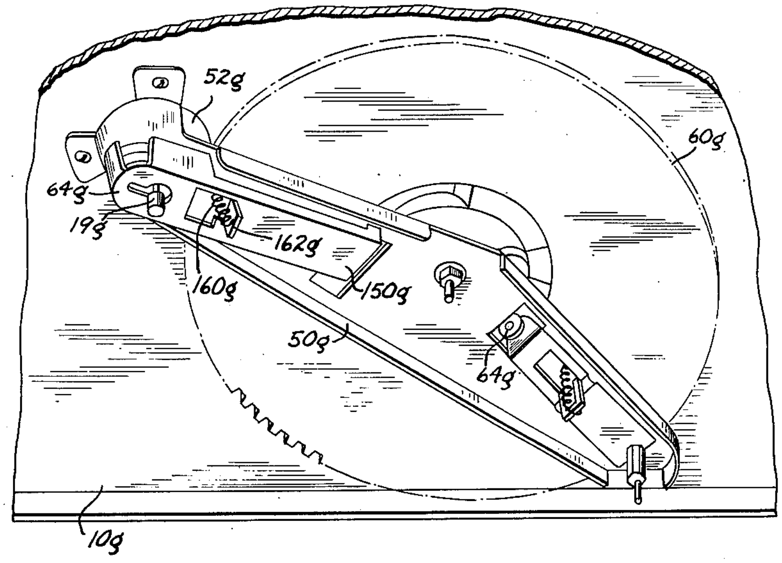
Figure 99:
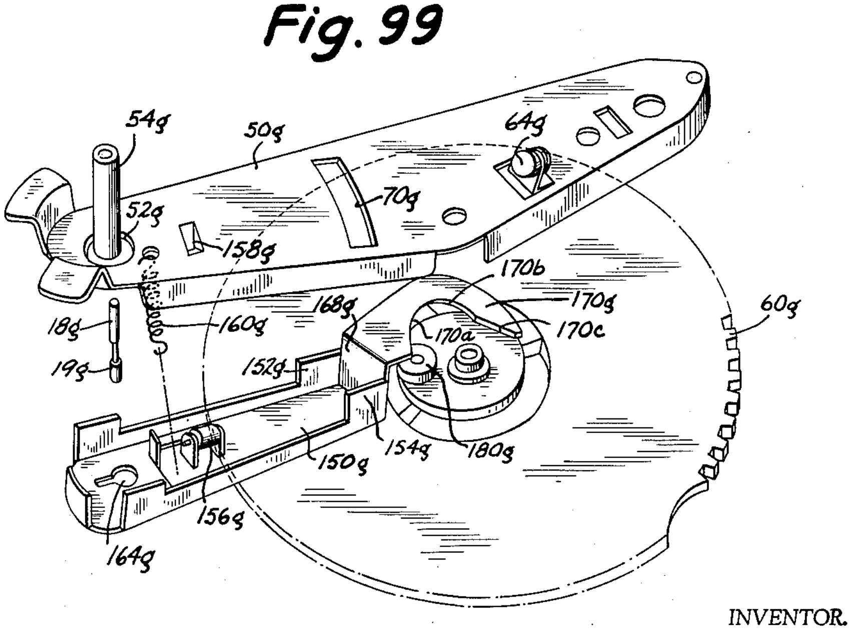
Figure 100:
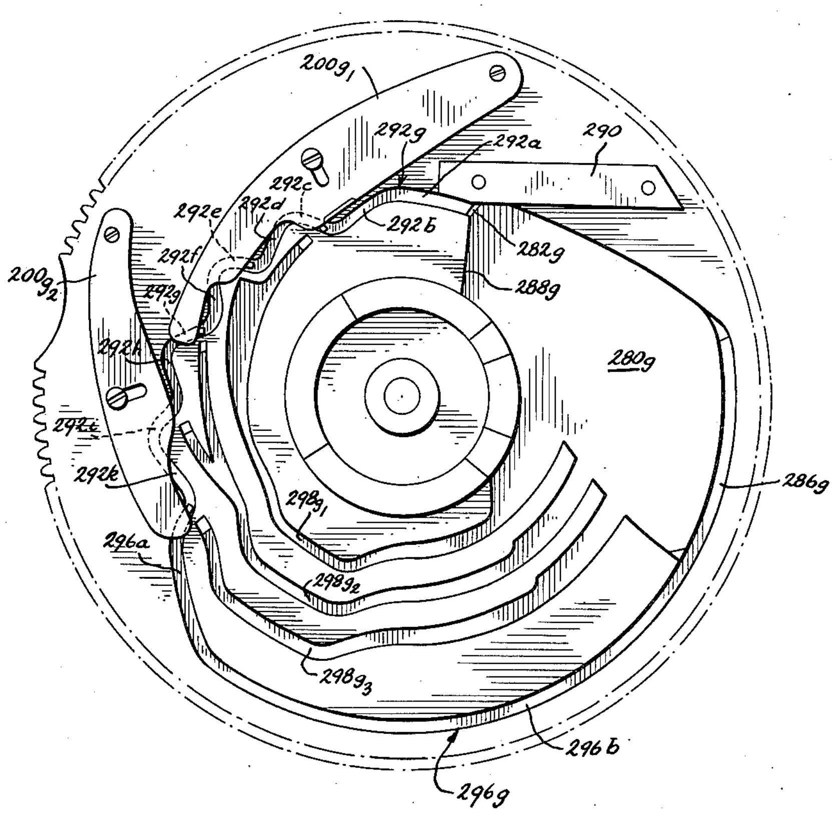
Figures 101, 102:
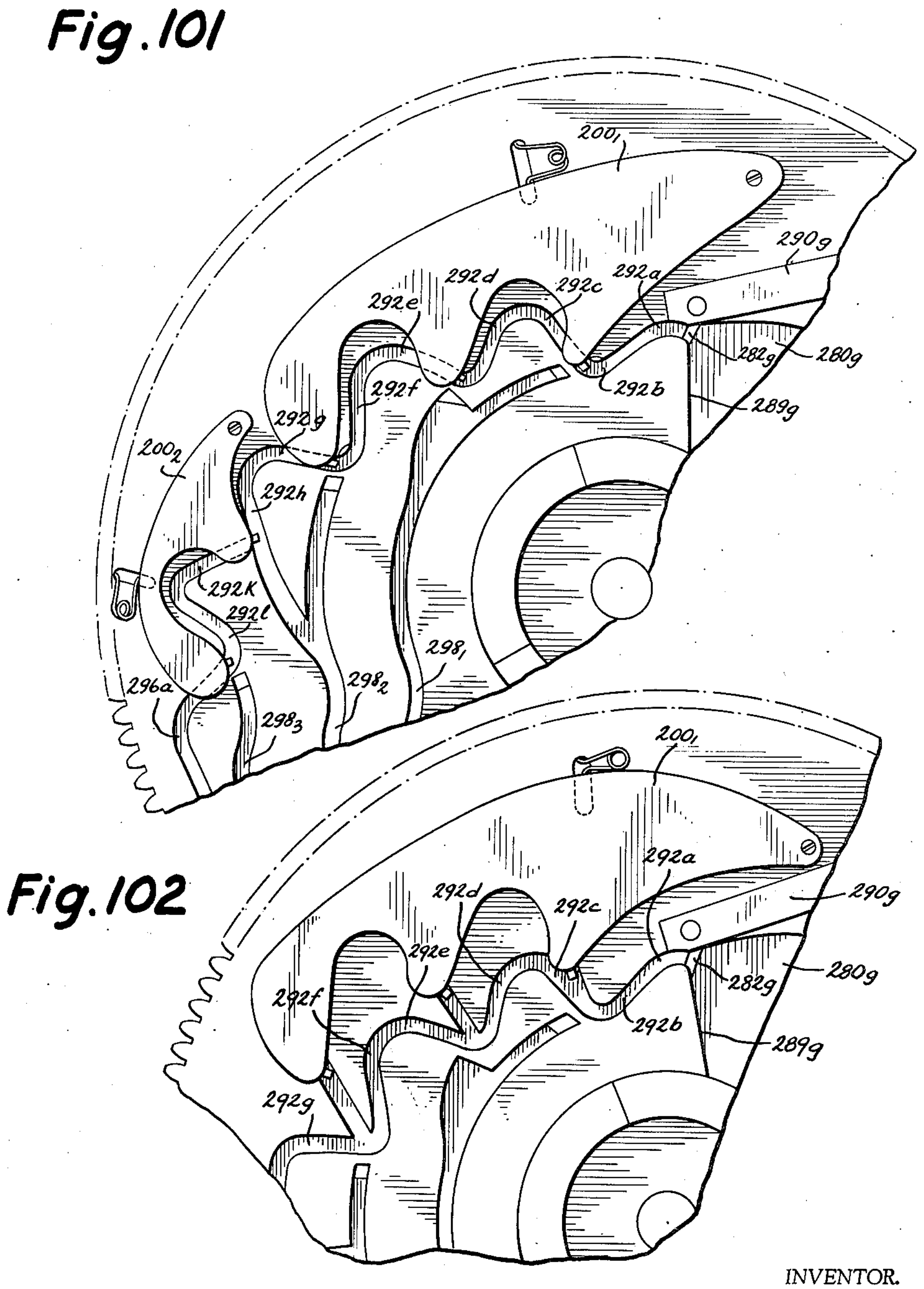
Figures 103, 104:
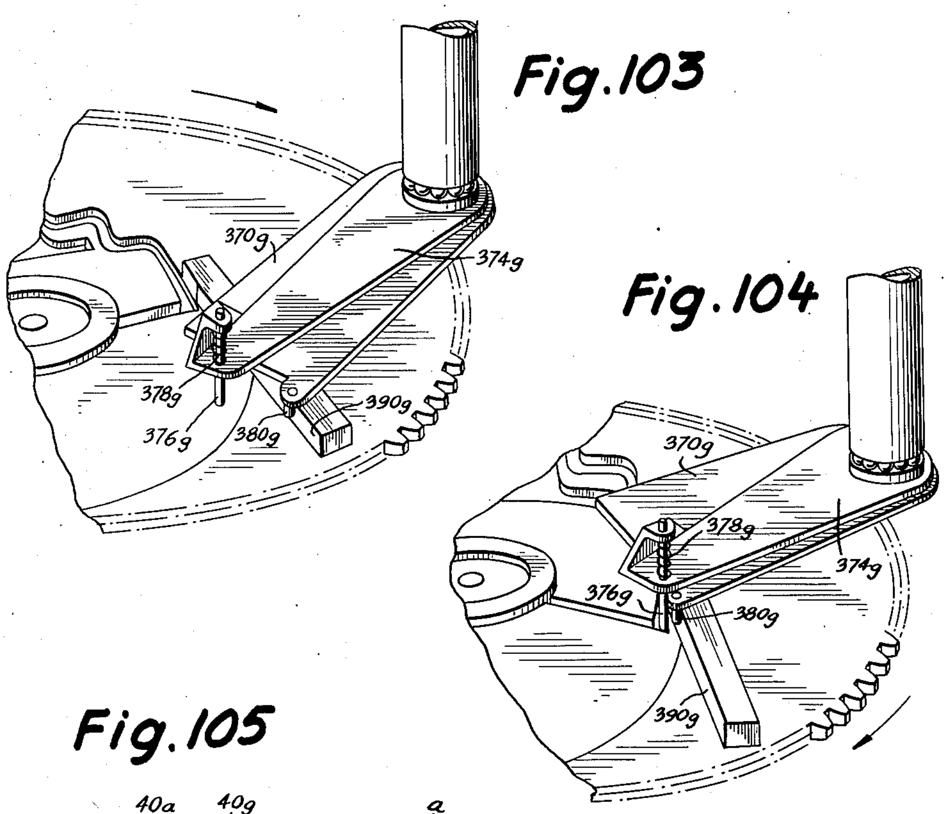
Figure 105:
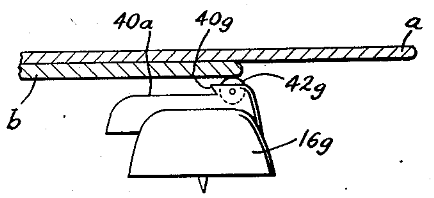
Figure 106:
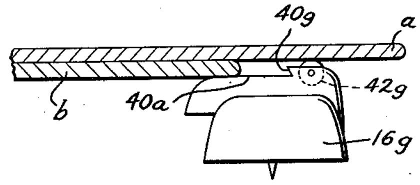
Figure 107:
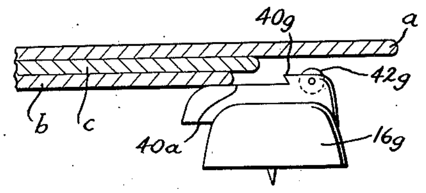

FIGURE 58 is a perspective view of a further modification of a record changing phonograph according to the invention, FIGURE 59 a perspective view of the mechanism of the phonograph seen in FIGURE 58, FIGURE 60 is a section through the phonograph shown in FIGURES 58 and 59, FIGURE 61 is a plan view of the phonograph control cam disc, FIGURE 61*a* is a graphic illustration of the vertical and horizontal movements of the tone arm, FIGURE 62 is a perspective view of a part of the cam disc shown in FIGURE 61, FIGURE 63 is a plan view of the same part of the cam disc as shown in FIGURE 62, FIGURE 64 illustrates the movements of the tone arm over the surface of the stack of records at the point identified by I in FIGURE 62, FIGURE 65 illustrates the same at the point identified by II, FIGURE 66 is a section through the cam follower and the part of the cam disc taken along the line XIV—XIV in FIGURE 63, FIGURE 67 is a corresponding section taken along line XV—XV in FIGURE 63, FIGURE 68 is an illustration similar to that shown in FIGURE 65 in the position of the parts identified by III along the stack of records in which the lowermost record is of intermediate size, FIGURE 69 is a section similar to that shown in FIGURE 66 taken along the line XVI-XVI in FIGURE 63, FIGURE 70 is an illustration similar to that shown in FIGURE 68 in the position IV of the parts in FIGURE 63, FIGURE 71 is a similar illustration in the position V in FIGURE 63, FIGURE 72 is a section on an enlarged scale, through the cam track follower and a part of the cam disc, FIGURE 73 is a plan view of a modified embodiment of the cam disc, FIGURE 74 is a plan view of still a further modified embodiment of the cam disc, FIGURE 75 is a section through a part of the cam disc shown in FIGURE 74, FIGURE 76 is a perspective view of the tone arm bearing with the tone arm removed, FIGURE 77 is a perspective view of the tone arm bearing with the tone arm partly in section, seen from the bottom, FIGURE 78 is a section through the tone arm bearing shown in FIGURES 76 and 77, FIGURES 79*a* and 79*b* are exploded views of the entire parts of the phonograph illustrated, FIGURE 80 is a perspective view of a part of the phonograph partly in section, as seen from the bottom, FIGURE 81 is a plan view of the phonograph with the parts in the playing position, as well as in the initial position after playing of a record as caused by the trip starter mechanism, FIGURE 82 is a vertical section through a part of the phonograph in the playing position of the parts shown in FIGURE 81, FIGURE 83 is a plan view of a phonograph as shown in FIGURE 81 with the parts also shown in the initial position for initiating the series of movements caused by operation of the rejector control, FIGURE 84 is a plan view of the phonograph with the parts in the initial position for testing the size of the small size record, FIGURE 85 is a vertical section through a part of the phonograph with the parts in the position shown in FIGURE 84, FIGURE 86 is a plan view of the phonograph with the parts in a position testing the lowermost record, FIGURE 87 is a vertical section through a part of the phonograph with the parts in the position shown in FIGURE 86, FIGURE 88 is a plan view of the parts of the phonograph after testing of the size of a medium size record at the stage of dropping the same, FIGURE 89 is a vertical section through a part of the phonograph with the parts in the position shown in FIGURE 88, FIGURE 90 is a perspective view of the modification of the record size feeler system with the inclined guiding surface, FIGURE 91 is a schematic end view showing the operation of the record size feeler system shown in FIGURES 42 and 42 to illustrate the comparison with the modification of FIGURE 90, FIGURE 92 is a schematic end view corresponding to that of FIGURE 91 with the modification of FIGURE 90, FIGURE 93 is a plan view on an enlarged scale, of the modification shown in FIGURE 90, FIGURE 94 is a perspective view of the interior core member for a solid center spindle to be used in connection with the record changer, FIGURE 95 is longitudinal section through said spindle, FIGURE 96 is a portion of a cam disc for a record changing phonograph in a further modification with the parts in one position, FIGURE 97 is a corresponding portion with the parts in another position, FIGURE 98 is a perspective view of a further modification of the cam disc including the means for moving the tone arm in the vertical direction and a drop control arrangement, FIGURE 99 is an exploded view of the parts shown in FIGURE 98, FIGURE 100 is a plan view of another modification of the cam disc, FIGURE 101 is a plan view of a part of the cam disc shown in FIGURE 100 on an enlarged scale with the cam track selector means in one position, FIGURE 102 is a plan view as shown in FIGURE 101 in which the cam track selector means is in another position, FIGURE 103 is a perspective view of a part of the cam disc with the cam track follower and the trip starter operating arm in one position, FIGURE 104 is a perspective view similar to that shown in FIGURE 103 with the parts in another position and FIGURES 105–107 are end views of a further modification of the record size feeler arrangement according to the invention.

In the following description the same parts in the different embodiments will be referred to by the same reference numerals, with different index letters *a*, *b*, *c*, and *d* respectively, in the four embodiments of FIGURES 1 to 11*a*, 12–23, 24–35 and 36–46 respectively.

Referring now to the embodiment shown in FIGURES 1 through 11 of the drawings, the invention here illustrated shows an automatic phonograph or record-changing apparatus, which includes a base plate or panel 116*a*. Above the top surface of the base plate extends the top surface of a turntable 110*a*, which is supported for rotation in a manner to be described in more detail hereinafter. Another of the main elements of the phonograph is a pick-up arm 112*a*, arranged for automatic movement in a manner which will also be more fully described hereinafter, and having adjacent its free end a stylus member 100*a*, see FIG. 10, which engages the sound track of a phonograph record and moves in accordance with the oscillation of said sound track in order to produce electrical oscillations which are amplified and reproduced from an amplifier and sound reproducer, not shown. A further main element of the phonograph is a record-stabilizing element 114*a*, adapted to engage the top surface of the uppermost record in a stack of records supported on a central spindle 190*a* and fed one after the other to the playing position on the turntable 110*a*.

These main elements are shown in plan view in FIGURE 1. The turntable may be partly embedded in a recess 98*a* in the base plate 116*a*, as shown in FIG. 10, so that only its surface extends above the surface of the base plate. A sidewardly-extending recess 120*a*, FIGURE 1, between the front edge of the base plate and the turntable allows a finger to be introduced under the record resting on the turntable in order to lift it away therefrom.

*Driving Mechanism*

In the embodiment of the driving mechanism, which is shown in detail in FIGURE 11 and is common to all the embodiments, a groove 124*a*, see FIGS. 2 and 10, is provided in the cylindrical surface of the turntable 110*a*, which is adapted to receive a driving cord 624 FIGURE 11 passing over a pulley 622 on a spindle 618. The spindle 618 also carries a driving wheel or disc 620 adapted to frictionally engage a power driven spindle 610 of an electric motor 619 which is not shown in detail. The driving mechanism to be described in detail hereinafter is especially constructed to enable the turntable to rotate with three or more different predetermined velocities. For this purpose, the motor spindle 610 is provided with three sections 612, 614 and 616 of different diameters, respectively adapted to be engaged by the driving wheel 620 in order to change the velocity.

In spaced relationship and substantially parallel with the spindle 610 and the spindle 618 is arranged a further spindle 634, secured to a base plate 636 and having screw holes or the like 637 for mounting the driving mechanism below the base plate 116*a* by means of spacer pieces, not shown. On the wheel or disc 620 a pair of pins 626 and 628 are arranged extending through the pulley 622, and guided for longitudinal displacement relative thereto by means of holes or bores in said pulley. Thus the wheel 620 and the pulley 622 will rotate together. The spindle 618 is fixed to the free end of an arm 630, and both the wheel 620 and the pulley 622 are allowed to rotate freely on the spindle 618, the pulley 622 further being secured against longitudinal displacement relative to the spindle 618. In contrast to the pulley 622, the wheel 620 is allowed to slide up and down along the spindle 618. The arm 630 is carried by a bushing 632 which is guided on the pin 634 and allowed to pivot thereabout. Beyond the bushing 632 the arm 630 has an extension 638, the remote end of which is provided with a pedestal 640, the top end of which is bifurcated at 642 and 643. The forks thereof are provided with V-formed recesses, of which only the front recess 642 is shown. These recesses form bearings for oppositely directed projections 646 and 648 on a pivotable arm 650, the free end of which is bifurcated at 656 to engage a circular groove on a bushing 654, which is associated with the disc or wheel 620 and arranged therebelow.

The arm 650 is provided with an aperture 658 FIGURE 11*a* having an inwardly-directed extension 660 which is adapted to engage a shoulder, generally referred to as 661 on the bushing 632. The bushing 632 is provided with a top portion of reduced diameter 662, extending upwardly through the aperture 658 and carrying a control knob or the like 664, which rises above the top surface of the general base plate 116*a*, see FIG. 1. Between the arm 650 and the rear end 638 of the arm 630 a spring 666 is provided, urging the arm 650 against the shoulder 661 of the bushing 632. The bushing 632 is rotable with respect to the arm 630. The shoulder 661 is further composed of different sections 668 and 670 respectively, each forming a part of a helical surface. Between the two sections 668 and 670 a notch 676 is arranged. The width of the notch 676 corresponds to the width of the projection 660. At the end of the sections 668 and 670 further notches 674 and 678 are provided, the widths of which also correspond to the width of the projection 660. As previously mentioned, the whole arm 630, 650 is arranged to pivot about the pin 634. The free end of the arm 630 is offset at 631 and extends into an aperture 641 through the base plate 636.

Under normal driving conditions the driving cord 624, which may be of rubber or other elastic material, is tightened so as to engage the driving wheel 620 against one of the sections 612, 614 or 616, thereby to transmit the rotation of the motor spindle 610, viz. of the wheel 620, to the turntable 110*a*. The notches 674, 676 and 678 only extend to a limited depth so as to allow only the projection 660 to be fixed therein. The edges between the notches and the neighbouring sections 668 and 670 respectively are preferably rounded or slightly inclined.

*Mechanical Construction of Phonograph*

Below the general base plate 116*a*, which will be found in parts in most of the FIGURES 1 through 10, are arranged two crossing rails 134*a* and 136*a*, FIGS. 2, 5 and 10. The ends of the rail 134*a* are, by means of screws 138*a*, see FIG. 5, connected to a pedestal 142*a* extending below the base plate 116*a* near one edge thereof. The rail 134*a* extends under the center of the turntable 110*a*, see more specifically FIG. 10. The other end of the rail 134*a* is provided with a hole 146*a*, FIGURE 2 through which a screw, not shown, secures this end of the rail to the base plate spaced therefrom by a distance element, not shown. The rail 136*a* crosses the direction of the rail 134*a* under the center of the turntable 110*a*. In FIGURE 2 the front end of the rail 136*a* is shown in connection with the distance piece 150*a* securing the rail 136*a* under the base plate in spaced relationship theerto. A similar distance piece, not shown, is arranged at the other end of the rail 136*a*. Here a screw hole 148*a* is shown.

The turntable 110*a* is rotatably arranged on a pin 152*a* FIGURES 2 and 10 mounted at the point of intersection between the rails 134*a* and 136*a* and extending therethrough, secured by a nut 154*a* screwed on the lower screw-threaded end portion 155*a* of the pin. The pin 152*a* is provided with a shoulder which engages the interior ring of an axial ball-bearing 159*a* FIGURE 10 having two exterior races 161*a* and 163*a*. The lower race 163*a* rests on a felt ring 165*a* on the top surface of the rail 136*a*. The top race 161*a* engages another felt ring 157*a*, upon which a bushing 156*a* connected with the turntable, rests freely. On the bushing 156*a* are arranged radially extending flanges 160*a* and 162*a*, leaving therebetween a groove 158*a*, the bottom of which is treated in a convenient manner to make the surface thereof rough, thereby frictionally to engage the driving element for the remaining part of the phonograph mechanism, see more specifically FIG. 2. The driving element for the phonograph is a driving roller 164*a* FIGURE 2. This driving roller 164*a* is freely rotatably arranged on an arm 166*a* by means of a pin or the like. The arm 166*a* is provided with an elongated slot 168*a* having a circular extension 169*a* adapted to receive a pin 170*a* secured to the bottom of the base plate 116*a* and extending therebelow. The pin 170*a* is provided with an annular groove 171*a* having the bottom diameter slightly less than the width of the narrow portion of the slot 168*a* in the arm 166*a*, so as to allow this arm to be carried suspended on the pin 170*a*, after having introduced the lower end portion of the pin through the circular extension 169*a*, until the arm is in alignment with the annular groove, and then pulling the arm forward to the position shown in FIGURE 2.

The pick-up arm 112*a*, FIG. 2 and 7, is at its interior end, pivotally arranged in a bushing 246*a* secured to and extending both above and below the base plate 116*a*. In the bushing 246*a* a hollow spindle 248*a* is arranged, the top end of which carries a sidewardly-extending arm 247*a* arranged in a rear cavity 249*a* of the pick-up arm 112*a* and secured thereto by means of a screw 220*a* extending from the side through a screw-threaded hole therein, not shown, and allowing a limited adjustment of the angle between the pick-up arm and the bushing 246*a*. In the interior of the hollow spindle 248*a* is arranged a pin or spindle 260*a*. The top end of this pin 260*a* is, by means of a transverse pin 261*a*, secured to the end of the pick-up arm in the cavity in spaced relationship to the screw 220*a*. Sidewardly-extending from the bottom of the hollow shaft 248*a* is arranged an arm 250*a* carrying at its free end a pin 252*a*. It will be understood that by swinging the arm 250*a*, the hollow shaft 248*a* will rotate, thereby swinging the pick-up arm together with the arm 250*a*. The lower end of the hollow shaft 248*a* is closed by means of a closure member 259*a* having a central bore 203*a* through which the pin 260*a* extends. Between the top end of the closure member 259*a* and a point 267*a* extends a spring 264*a*. The tension of this spring 264*a* tends to push the pin 260*a* upward, thereby tilting the pick-up arm around the screw 220*a*, lowering its free end with the stylus member to engage the record on the turntable. The lower end of the pin 260*a* is screw-threaded at 269*a* and extends through an aperture 271*a* in the rail 134*a*. Below this rail a lever 256*a*, is pivotally arranged about a pin 254*a*. The lever 256*a* is provided with a hole through which the screw-threaded end of the pin 260*a* extends. On this screw-threaded end a nut 262*a* is arranged.

The lever 256*a* is bent downwardly at 257*a* and between this downwardly bent end 257*a* and the rail 134*a* is arranged a spring 255*a*. This spring 255*a* is biased so as to lift the end 257*a* of the lever 256*a*. The bias of the spring 255*a* is larger than that of the spring 264*a*, so that in the rest position, it will overcome the tension of the latter and keep the pick-up arm in its horizontal rest position shown in FIGURE 7. Above the end 257*a* of the lever 256*a* the rail 134*a* is apertured at 2711*a*. Through this aperture extends a roller 258*a* arranged at the lever 256*a*. The roller 258*a* is freely rotatable on a pair of brackets 253*a*, on the top side of the lever 256*a*.

*Record Support*

In the top end of the pin 152*a*, FIGURE 10, is provided a central bore 153*a* having in its bottom a step portion 185*a* and adapted to receive and releasably support the lower end of a central supporting pin 190*a* which is provided with a shoulder 191*a* and which at its lower end has a similar step portion 193*a* as that of the bore. The central supporting pin 190*a* has a substantially vertical cylindrical portion and an also substantially cylindrical portion 189*a* offset relatively thereto. Between these two portions is an inclined portion 195*a*, on the top of which the substantially horizontal shoulder 191*a* is arranged, spaced from a shoulder 197*a* on the bottom of the portion 189*a* at a distance which is slightly more than the thickness of a phonograph record, but at any event less than the double thickness thereof.

*Pick-Up Moving Mechanism*

The arm 166*a*, FIGURE 2, with the driving roller 164*a* is kept in the position thereof engaging the circumference of a rotatably arranged cam disc 144*a* by means of a rod 172*a*, the one end of which is movably connected with the arm 166a, for instance, by means of a head, not shown, on the end of the rod, arranged behind an aperture in the upwardly directed extension 174a on the arm 166a. The rod 172a is connected with a spring 173a, the other end of which is connected with a pin 175a secured to and extending below the base plate 116a. The arrangement and the size of the roller 164a is so adapted that when the rod 172 is pulled in the opposite direction of the arrow A, the driving roller 164a will be clamped between the bottom of the annular recess 158a and the circumference of the cam disc 144a, so as to impart the rotation of the turntable 116a to the cam disc.

On the bottom side of the cam disc 144a different cam tracks are provided, see FIG. 3 and more specifically FIG. 9. These cam tracks are adapted to cooperate with the pin 252a on the arm 250a.

The cam tracks comprise a broad cam track 272a in which movement of the pin 252a is allowed through an angle, which is slightly larger than the angle through which the stylus member of the pick-up is moved from the very beginning of playing of a record to the very end thereof. The following cam tracks will be described in the sequence in which they are followed by the pin 252a during rotation of the cam disc 144a, which takes place in the direction of the arrow B shown in FIGURE 9. The broad cam track 272a narrows into a cam track 274a, which is substantially concentric with the cam disc, and arranged near the periphery thereof (outer position). After this there is a slightly broader portion 276a, whereafter the track is divided into two portions 280a and 282a; the track 280a corresponds to phonograph records of 10″ size, while the track 282a corresponds to records of 12″ size. The entrance of the track 282a is normally closed by a spring member 284a which, in the embodiment shown, simply consists of a wire spring arranged through a hole 286a, and which on the top of the cam disc has one or more bent portions 290a, and at its end at 288a is secured to the top side of the cam disc. The two cam tracks 280a and 282a follow identical curves. The initial portions are concentric with the cam disc. Thereafter follow excentric portions 281a and 283a in the form of inwardly directed spirals. Hereafter follow further inwardly-directed portions 285a and 286a extending into concentric portions 289a and 291a, the end of which extend into the broad track 272a.

Within the cam tracks described herein is further arranged a concentric cam portion, generally designated by reference numeral 287a, and adapted to cooperate with the roller 258a on the lever 256a in order to raise and lower the pick-up arm 112a to engage or disengage it with the surface of the phonograph record to be played. The cam portion 287a comprises a lower portion 263a, on each side of which inclined portions 261a and 268a respectively extend communicating with the raised portion 265a. The inclined and raised portions are so disposed relative to the various portions of the cam tracks 280a and 282a that the roller 258a in its lifted position, corresponds to the raised pick-up arm, when the pin 252a is moved in one of the cam tracks 280a or 282a. For further details see the diagram FIG. 9a showing the relation between pick-up movements in and out or up and down respectively.

*Switching and Control Mechanism*

The element generally designated by reference numeral 114a is, as more specifically illustrated in FIGS. 2 and 10, in the form of a triangular arm having spaced lateral rib portions 182a and 184a, the narrow end of which is connected with a base plate 188a. The end of the rib portions 182 and 184a are connected with a cross rib 186a. Between this cross rib and the edge of the base 188a is provided an aperture 183a. The whole construction is arranged on a vertical spindle 180a, which is arranged for rotation in a vertical bushing 178a secured to and extending upward from the base plate 116a. On the arm base 188a is adjustably secured, by means of a screw or the like, a plate-formed member 194a, which extends beyond the edge of the arm base 188a, and is provided thereat with an aperture 192a. The member 194a is adjusted on the arm base 188a at such a distance from the spindle 180a that the top end 189a of the central supporting pin will extend up through the aperture 192a and engage the left-hand interior edge thereof, when the triangular arm is brought to the operating position to keep the stack of records horizontally set, as will be more fully explained hereinafter.

The spindle 180a extends downward through the base plate and carries at its lower end a disc 196a, which is shown in FIGURE 2 and in more detail in FIGURE 4. One side of this disc 196a is provided with a circular recess 198a extending from the top but leaving at the bottom side of the disc a rib 199a. The bottom of this recess is substantially concentric with the periphery of the disc 196a. Substantially opposite this recess 198a is a further recess 200a which extends from the bottom side of the disc, leaving adjacent the top side of the disc a rib 201a which, however, does not extend to the periphery but is concentric with the disc. At the end of this rib 201a, the recess 200a extends to the top surface of the disc. The recess 200a cooperates with the vertical pin 204a secured to the base plate, and extending therebelow. This pin 204a has, as more clearly shown in FIG. 3, near its top end an annular groove 206a of an extension corresponding to the thickness of the rib 201a. It will be understood that when the spindle 180a with the disc 196a is lifted, the rib 201a will, by passing in to the annular groove 206a, allow a rotation of the spindle 180a and thereby a rotation of the arm 114 as through angle which is determined by the angle of the recess 200a. This angle is so adapted that the angle of the arm will be about 90°. The end 202a of the recess 200a corresponds to a position of the arm in an alignment with the central supporting spindle 189a, so that in this position the spindle 180a will be allowed to be lowered, thereby lowering the arm in to engagement with the stack of records to the position more specifically shown in FIGURE 10. This lowering will take place by means of gravity due to the weight of the arm 114a and the parts associated therewith.

In engagement with the other recess 198a, a nose 209a (FIGURE 3) is arranged on a pivotable arm 208a which is carried by and arranged to pivot about a pin 211a secured to and extending below the base plate 116a. This arm 208a is provided with an upwardly-extending portion 137a having a hole through which the end of the pin 172a extends. Furthermore, the arm 208a is provided with a projection 139a, which cooperates with a bifurcated switch control member 210a of an electric switch 212a secured to the base plate and arranged in an aperture 214a therein. The switch is arranged in the electric circuit of the driving motor to switch the same on and off. The parts are arranged in such a manner that when the arm 114a is swung to position outside the stack of records, the one end of the recess 198a will, by cooperating with the nose 209a, swing the arm 208a, to switch off the motor, while by swinging the arm to its operating position, the other end of the recess 198a will, by cooperating with the nose 209a, swing the arm 208a to switch on the motor.

On the rod 172a is further arranged a nut 215a, FIGURE 3, adjustable on a screw-threaded portion of the rod 172a and adjusted in such a manner that when the switch arm 208a is moved to switch off the motor, the extension 137a of said arm will simultaneously engage the nut and thereby push the rod in the direction of the arrow A in FIGURE 2, so as to disengage the driving wheel 164a from both the bottom of the groove 158a on the turntable spindle and from the cam disc. In the other position, viz. when the motor is switched on, the rod 172a will, by means of the spring 173a, as previously explained, be withdrawn in the opposite direction to engage the driving wheel 164a between these parts. To secure the switch-operating arm 208a in either of its two end positions, a momentum or toggle spring 213a is arranged, for instance, in the form of a small U-shaped spring, the ends of which are secured in holes in both of the parts, viz. the arm and the base plate.

Pins 222*a*, 224*a* and 226*a* further extend below base plate 116*a* (FIGURES 2 and 8), on which a sliding member 228*a* having longitudinal, parallel slot 216*a*, 218*a* and 220*a* is guided. This slide 228*a* is substantially L-shaped and its one end 229*a*, which extends over the top surface of the cam disc 144*a*, it is provided with a pin 230*a* engaging a cam track 232*a* in the top surface of the cam disc, see more specifically FIGURE 8. The long arm of the slide 228*a* extends substantially parallel with the rod 172*a* and below the bushing 178*a*, where the slide is provided with a slot 234*a* for the passage of the spindle 180*a*. At this end the slide 728*a* is provided with a lever 242*a* (FIGURE 3), which is pivotally arranged in vertical plane on a pin extending through brackets in the slide arm. This lever is influenced by a spring not shown so tensioned that it will, in the rest position, keep the lever in horizontal plane parallel with the slide itself. The lever 242 is U-shaped or has at least a longitudinal slot, which receives the lowermost end of the spindle 180*a*, which is here of reduced diameter. The spindle 180*a* further has a shoulder 181*a*, which is arranged in such a manner that when the arm 114*a* with the spindle 180*a* extends below the supporting shoulder 191*a* on the central supporting pin 190*a*, the shoulder 181*a* will engage the lever 242*a* and press it downward into such a position that the free end 239*a* of the lever will be able to engage the extension 137*a* of the switch arm 208*a* when the slide is moved in the direction of the arrow C in FIGURE 3.

The slide further carries a pair of upwardly-extending arms 229*a* and 231*a*. These arms extend through slots, FIGURE 2, in the base plate, and their top ends are on the same level as the supporting shoulder 191*a* on the central guiding pin 190*a*. From the top ends of the arms 229*a* and 231*a* there extends a jib 233*a* (FIGURES 1 and 2), which is directed substantially radially against the central supporting pin 190*a* and is of an extension which, in one end of the exterior positions of the slide 228*a*, will bring it within the periphery of a 10″ record supported on the central pin. The movement of the slide 228*a*, viz. the length of the slots 216*a* and 218*a* and 220*a* is so adapted as also to bring the jib 233*a* totally outside the periphery of a 12″ record supported on the central pin.

The cam track which moves the slide 228*a* is shown in more detail in FIGURE 8. It comprises a substantially circular portion 232*a* concentric with the cam disc, and at such a distance from the center thereof as to bring the jib within the periphery of a 10″ record. Opposite this cam track portion 232*a* is another, substantially circular but relatively short cam track portion 229*a*, corresponding to a position of the jib 233*a* outside the periphery of a 12″ record. Between these two track portions 232*a* and 229*a* are inclined track portions 237*a* and 241*a* respectively, adapted to move the slide between the two positions mentioned above. The relation between these cam track portions and the cam track portions of FIGURE 9 will be explained under the mode of operation.

*Record Feed Mechanism*

The record feed mechanism is constituted by the pick-up arm 112*a* itself. For this purpose, the pick-up arm is provided with an upwardly-extending knob 270*a* having a vertical extension which is so much higher than the thickness of the jib that it will extend above the top surface thereof to a degree substantially corresponding to the thickness of a record, see especially the side view of FIGURE 10. The mechanism controlling the vertical movement of the pick-up arm is further adapted to engage the top surface of the pick-up arm against the bottom surface of the jib in the exterior position of the pick-up arm. To allow passage of the knob 270*a*, the jib is bifurcated having an inwardly-extending recess 235*a*.

*Trip-Starting Mechanism*

Connected with the arm 250*a* controlling the in-and-out movement of the pick-up arm is a short arm 251*a* (FIGURES 3, 8 and 9) which is arranged on the same horizontal level and forms an angle with the arm 250*a*. Between the two arms 250*a* and 251*a* is arranged a downwardly extending flap 300*a* (FIGURES 6 and 8) on a pivotable lever 302*a* set below the base plate 116*a*. This lever 302*a* is pivoted on a pin 304*a* secured to and extending below the base. On the same pin 304*a* is pivoted a further lever 306*a*, which extends to a point adjacent the bushing 156*a* which forms the bushing 156*a* for the turntable. This spindle is provided thereat with a radially-extending nose 308*a*. Discs 303*a* and 305*a* and a spring (not shown) are arranged on the pin 304*a* on each side of the levers 302*a* and 306*a*, which serve the purpose of holding the two levers in alignment and simultaneously provide a friction action between the two levers at their common pivot point. The lever 306*a* is provided with an abutment 310*a* arranged opposite a projecting cam portion 312*a* at one end of the cam notch 314*a* on a cam surface extending from the top side of the cam disc. Further, a spring 320*a* is secured at one end at 321*a* to the lever 306*a* and extends along its lateral edge, which is nearest the cam 312*a*, 314*a*, with a bent portion 316*a* extending into the cam notch 314*a*. The spring is resilient, having a portion 323*a* perpendicular to the main portion 320*a* guided in holes in small brackets extending from the lever 306*a* so as to allow the spring to yield resiliently, when the lever 306*a* is urged in the direction of the cam surface.

In the friction joint, a certain play is provided between the two levers 302*a* and 306*a*. For this purpose, the lever 306*a* is provided with an elongated slot 340*a* through which a central pin projects. To keep the lever 306*a* in its most projecting position with its nose adjacent the projection of the turntable spindle, a spring 342*a* is provided between the two levers 302*a* and 306*a* gripping into a flap in the lever 306*a*, thus allowing it resiliently to be pushed backwards in a longitudinal direction if it should be brought so much into engagement with the rotating nose 308*a* that it cannot immediately escape therefrom.

In the cylindrical surface of the cam disc is provided a circular notch 322*a* of a size corresponding to the driving wheel 164*a*, and of a depth sufficient to bring the driving wheel out of engagement with the bottom of the groove 158*a*, when the wheel, by pull of the spring 173*a* in the rod 172*a*, is brought into engagement with this recess 322*a*.

*Mode of Operation*

The general mode of operation of the apparatus described hereinabove will now be specified.

In the position of rest, the pick-up arm is in a position swung outside the periphery of the turntable. The arm 114*a* is in the top position with the rib 201*a* on the disc 196*a* secured in the annular groove 206*a* of the pin 204*a*. Also the arm 114*a* is swung to its most outward position. The switch control arm 208*a* is in its switch-off position. This also means that the driving wheel 164*a* is out of engagement with both the bottom of the driving recess 158*a* and the cam disc 144*a*, because the flange of the switch control arm has pushed the rod 172*a* in the direction of the arrow A in FIGURE 2. The cam disc 144*a* is in the position where the guiding pin or roller 252*a* of the pick-up control arm is immediately before the cam track 274*a*. The slide 228*a* is in the position nearest the center, which means that its guiding roller 230*a* is in the cam track 232*a*.

With the parts in this position, one or more records to be played are placed on the central guiding spindle. They are thus supported at their center holes by the supporting shoulder 191*a* and at their periphery by the jib 233*a*.

As explained with reference to FIGURE 11, the motor is designed for three different speeds, so that it will be possible to play records designed for 78, 45 or 33⅓ revolutions per minute. It will be understood, however, that when playing a stack of records, they should all be of the same category, since no possibility exists to automatically change the speed of the motor during the playing.

If, for instance, a stack of 45 r.p.m. records are placed on the central spindle, the motor control knob must be adjusted in advance for this speed corresponding to its intermediate position., Corresponding adjustment will be necessary in accordance with the other speeds.

The arm 114*a* is now swung inward to the radial position thereof. This brings the recess 202*a* into alignment with the pin 204*a*, and simultaneously actuates the nose 209*a* of the switch control arm 208*a* to move it to the starting position, thus switching on the motor. The arm 114*a* will by its own weight descend to rest on the top surface of the top record in the stack, thus stabilizing the records in their horizontal position. With the movement of the switch control arm 208*a*, the rod 172*a* is simultaneously released, and, by means of the spring 173*a*, the rod system 172*a*, 166*a* FIGURE 2 is moved to allow the driving roller 164*a* to engage both the bottom of the driving recess 158*a* and the periphery of the cam disc 144*a*.

The cam disc 144*a* thereby starts to rotate. During this rotation, the pick-up control arm is guided with its pins 252*a* into the portion 276*a* (FIGURE 9). The guiding pin 252*a* slides along the spring 284*a*, and if the pick-up arm does not meet any resistance it will be swung inward to the track 280*a*, which corresponds to records of the small, or 10", size. If, however, the lowermost record is a 12" record, the knob 270*a* on the top of the pick-up arm will engage the periphery thereof. The resistance thus met will be transferred through the pick-up movement control arm, thereby bending the spring 284*a* away from the entrance to the track 282*a*. This means that the size of the record will determine which of the two tracks will be further followed by the guiding pin 252*a*. The two tracks hereafter follow identical curves. The first part thereof is substantially concentric with the cam disc, and the angle which is thereby subtended upon the rotation of the cam disc during this part of the movement corresponds to the angle of the slide control track 241*a* (FIGURE 8), so that the slide is moved away from the center during the initial movement of the pick-up control pin in either of the two tracks 280*a* and 282*a*. This means that the jib 233*a* during this part of the movement will be moved outside the periphery of the record. When this movement of the jib is completed, the pick-up control pin 252*a* enters the slightly inwardly directed track portion, either 281*a* or 283*a* of one or the other of the two cam tracks, giving a slight inward movement of the pick-up, with the result that the pick-up gives the lowermost record, the periphery of which is engaged by its knob 270*a*, a slight sideward movement to push it away from the supporting shoulder 191*a*, to allow it to slide down the pin 190*a* to the turntable. During this movement the slide control pin 230*a* moves in the circular track 229*a*. Immediately following these movements, the slide control pin 230*a* moves into the cam track 237*a* to draw the jib 233*a* again into its position under the stack of records in order to support the remaining records at their edge. Simultaneously, the pick-up control pin 252*a* is continuing its movement in a short cylindrical track portion, either 285*a* or 286*a*, in which the pick-up is not moved in the brief time it takes for the record to slide down.

When this movement is completed, the pick-up pin continues in one or the other of the two inwardly-directed track portions 289*a* or 291*a*, which brings the pick-up inward to a position above the initial groove of the record fed down. During this movement, the inclined curved portion 268*a* also functions while in engagement with the roller 258*a* to lower the pick-up into contact with the record. During this last movement, the pick-up control pin has arrived at the wide cam track 272*a* in which it is able to move freely so as to allow the pick-up to follow the sound track of the record. The cam disc 144*a* is stopped when the driving roller 164*a*, by the pull of the spring 173*a* on the rod 172*a*, is brought into engagement with the recess 322*a* in the periphery of the cam disc, and thereby disengaged from the bottom of the groove 158*a*.

With this position of the parts, the record is played. During the playing, the arm 250*a* abuts against the portion 300*a* of the lever 302*a*, thereby pivoting the lever system 302*a*, 306*a* in order to bring the nose of the lever 306*a* into engagement with the rotating nose 308*a*. As long as the movement only corresponds to the pitch of a normal groove, the rotating nose 308*a* will not be able to grip the lever nose 306*a*. When, however, the pick-up stylus member is in the end groove of the record, which has a larger pitch, the arm 250*a* will be swung through a larger angle and the nose 306*a* will be engaged and gripped by the nose 308*a* and pushed backward, once during each rotation of the turntable. The abutment 310*a* will engage thereby the curve abutment 312*a*, imparting to the cam disc 144*a* an initial angular movement which will bring the driving roller 164*a* out of the recess 322*a* to again engage the bottom of the groove 158*a*. The movement takes place in the direction of the arrow shown in FIGURE 8. The spring 320*a* is tightened during this movement of the lever 306*a*, and when the rotating nose 308*a* releases the lever nose 306*a*, the spring action moves the lever nose away from the path of the rotating nose. Simultaneously, the bent portion 316*a* of the spring is engaged by the cam member and swings the lever system away from the center, so as definitely to prevent the lever 306*a* from again being brought into contact with the rotating nose. With the rotation of the cam disc thus started, the pick-up control pin 252*a* will first pass along the inclined portion 271*a* of the wide track 272*a*, which will swing the pick-up arm outward, bringing the pin 252*a* again into the track portion 274*a*, whereafter the movements described are repeated when a new record is fed down to the turntable.

When the last record of the stack has been played, the arm 114*a* slides down so far that the shoulder 181*a* (FIGURE 3) on the spindle 180*a* will press the lever 242a downwardly with its end at the level of the upwardly-extending portion 137*a* on the switch control arm 208*a*. When the slide 228*a* moves to the position in which the jib would normally support the edge of the stack of records, the lever end 239*a* will engage the portion 137*a* on the switch control arm 208*a* and move it to the switched-off position, in which also as previously described the end portion 137*a* will push the rod 172*a* in direction of the arrow A in FIGURE 2 to disengage the driving roller 164*a*.

*Manual Change Control*

It may be convenient to allow a manual changing of a record. For this purpose there is arranged on the top surface of the base plate a push button 330*a* (FIGURES 1 and 6), which extends below the base and is connected with a string or cord 332*a* guided through a hole in a bracket. The other end of the cord 332*a* is connected with a resilient member, such as a spring 334*a*, the one end of which is secured at 335*a* below the base plate and the free end of which is arranged to engage a downwardly extending portion 337*a* on the lever 306*a*. To prevent damage in case of wrong operation, for instance pressure of the push-button during rotation of the cam disc, the spring 334*a* is made weaker than the spring 320*a*.

In order to manual change the records, the push button 330*a* is pushed, which causes the spring 334*a* to engage with its end the downwardly-extending portion 337*a* of the lever 306*a*, thus imparting to it the same movement as when it is engaged by the rotating nose 308*a* in an automatic change.

Referring now to the embodiments of FIGURES 12–23, the phonograph here shown therein includes, as in the case of FIGURES 1–11, a base plate or panel 116*b*, the pick-up arm 112*b*, the element 114*b* and the turntable 110*b*. The driving mechanism is not shown in detail with respect to this embodiment, reference here being had to FIGURE 11.

Also with respect to its mechanical construction, this embodiment is identical with the embodiment of FIGURES 1–11, and therefore the corresponding parts, which will be mentioned in more detail in the mode of operation, are referred to by the same reference numerals as in the embodiment of FIGURES 1–11, but with index *b*. In the following, therefore, only the differing features will be described in more detail.

*Switching and Control Mechanism*

The arm 166*b* (FIGURE 13) with the driving roller 164*b* is kept in its position engaging the circumference of the cam disc 144 by means of a slidably arranged lever 172*b*. This lever 172*b* is guided below the panel plate 116*b* by means of a slot 177*b*, the one side of which at 179*b*, FIG. 20, engages a recess 181*b* laterally arranged in a bushing 179*b* below the bushing 178*b*. In normal operating position, the lever 172*b* is kept in substantially parallel alignment with the base plate by means of a spring 183*b* secured by rivets or the like to the bottom of the base plate and gripping below the edge of the lever 172*b*.

The connection between this lever 172*b* and the arm 166*b* is in form of a slot-and-pin connection with a pin 185*b* (FIGURE 13) on the arm 166*b* gripping into a slot 187*b* (FIGURE 14) on the lever 172*b*.

As in the case of the embodiment of FIGURES 1–11, the disc 196*b* is adapted to operate the switch arm 208*b*. However, in the embodiment of FIGURES 12–23, the switch arm 208*b* is arranged directly to engage the lever 172*b*, viz. by means of a pin 191*b* (FIGURE 13) engaging into a slot 193*b*. As in the case of the embodiment of FIGURES 1–11, the switch arm 208*b* is also adapted to move the electric switch means for switching on and off the motor.

Adjacent the end where it is connected with the arm 166*b*, the lever 172*b* is provided with a sidewardly projecting portion 299*b*, which at 301*b* (FIGURE 20) is bent downwardly to form a projection. The top surface of the cam disc 144*b* is provided with an upwardly-extending projection 301*b*. This projection and the projection 301*b* are so dimensioned and relatively arranged that, as long as the parts are in rest position with the arm 172*a* parallel with the base plate, the projection 310*b* will pass below the projection 301*b*.

As shown in FIGURES 14 and 20, the shoulder 181*b* of the spindle 180*b* is adapted to engage the edge of the slot 177*b* opposite the edge which is supported in the notch 179*b*. The lever 172*b* will thus, as most clearly illustrated in FIGURE 20, be tilted in its longitudinal direction so as to bring the downwardly-extending projection 301*b* into the path of the projection 310*b* on the cam disc.

*Record Support and Record Feed Mechanism*

In the embodiment of FIGURES 1–11, the cooperation between the upwardly-extending knob 270*a* on the pick-up and the lowermost record of the stack of records supported in the spindle 190*a* is ensured by the supporting jib 233*a* abutting against an edge portion of the lowermost record of the stack and simultaneously forming a support for the top surface of the pick-up, so that this knob 270*a* is allowed to engage only the edge of the lowermost record. However, in the embodiment of FIGURES 12–23 and as more clearly illustrated in FIGURES 21–23, the function of the supporting jib 233*a* is taken over by a member mounted on the pick-up itself.

Here the pick-up carries a pivotable arm 350*b* adjacent its free end by means of a small pin or the like 352*b*. This arm extends substantially radially from the pick-up on the same horizontal plane as its top surface. To give the arm the necessary strength, a radially extending rib 354*b* is arranged along the bottom side of the arm. A small spring 359*b*, FIGS. 21 and 23, having one or two turns and abutting with its ends against the rib 354*b* and the pick-up arm respectively, secures the arm 350*b*, when in its rest position, to extend substantially radially directed against the central spindle 190*b*. On top of the arm 350*b* is arranged a roller 356*b* which is allowed to rotate freely on a small pin 358*b* also secured to the top of the arm 350*b*. The center of this roller is slightly offset from the pin 352*b* in such a manner that a pressure exerted against the roller in a direction substantially perpendicular to the pick-up will swing the arm 350*b* from its position perpendicular to the pick-up arm to a position parallel therewith, with the rib 354*b* abutting against the near edge of the pick-up. It will be understood that when this pressure is relieved, the spring 359*b* will return the arm 350*b* to its position perpendicular to the pick-up arm.

As will be understood from the following explanation of the operation of this embodiment, the arm 350*b* entirely takes over the function of the jib 233*a* in the embodiment of FIGURES 1–11.

*Trip-Starting Mechanism*

According to FIGURES 12–23, this part of the embodiment is shown in plan view in FIGURE 17, in a way similar to FIGURE 18. Between the two arms 250*b* and 251*b* connected with the vertical pick-up spindle 248*b* is arranged a pivotable lever 302*b*, a portion of which at its end at 300*b* is bent upwardly to be engaged by either of the two arms 250*b* and 251*b*. The other end of the lever 302*b* is provided with a disc-shaped portion 305*b* secured to a spindle 307*b* which is rotatably supported to hang in a bushing 309*b* secured to the bottom of the base plate 116*b*. The bushing is provided with a recess 311*b* which extends into the bushing to communicate with the central bore thereof in which the spindle is allowed to rotate. In order to suspend the spindle 307*b* in the bushing 309*b*, the spindle is provided at 313*b* with an annular groove adapted to be engaged by one end of a spring 342*b*, the one branch of which surrounds the bushing while its other branch is arranged within the recess 311*b* to engage the annular groove 313*b*. It will thus be understood that the spindle 307*b* is freely suspended in the bushing, thus allowing the lever 302*b* to pivot about the axis of the spindle with very little friction. Below the disc-shaped portion 305*b* a further disc 315*b* is secured on the spindle 307*b*, which is spaced from the disc 305*b* at a distance slightly greater than the thickness of the lever 306*b*. This corresponds to FIGURE 8, with the difference that the friction link shown in FIGURE 8, between the levers 302*a* and 306*a* is, in FIGURES 17 and 18–18*a*, substituted by the arrangement most clearly shown in FIGURE 18*a*. The friction between the levers 302*b* and 306*b* is obtained thereby by means of the weight of the lever 306*b*, due to the fact that it is freely pivotable about the spindle with a small vertical play in the gap between the discs 305*b* and 315*b*. The lever 306*b* is provided with a longitudinal slot 309*b*. Furthermore, the lever is provided with an extending portion 211*b*, FIG. 17, the end of which has a downwardly bent extension at 313*b*. Between the end of this extension 313*b* and the spindle 307*b* is arranged a relatively weak spring 317*b* which, in the normal position of the parts, will keep the tip of the lever 306*b* adjacent the path of the rotating nose 308*b*.

The function of the spring 317b thus is the same as that of the spring 342a in the embodiment of FIGURE 8. When mounting the parts to secure a uniform friction between the levers 302b and 306b, the disc 315b is preferably clamped onto the spindle 309b with the lever 306b in position together with an intermediate layer of a thin plate which, after the mounting of the disc 315b, is removed to allow the necessary vertical play between the two levers.

It will be understood that it is possible with this construction to secure a very low friction not only between the spindle 307b and the bushing 309b, but also between the two levers. The latter friction will be the smallest. Such construction of the trip-starting mechanism has the advantage of being extremely practical, by allowing trip-starting to be effected by the cooperation between the rotating nose 308b and the tip of the lever 306b, even under circumstances, viz., from the end of the groove in the record to be played, in which other embodiments of a trip-starting mechanism will fail.

*Pick-Up Moving Mechanism*

The mechanism to effect the vertical movement of the pick-up stylus is the same as that described with reference to FIGURES 5 and 7, and will therefore not be repeated herein.

The mechanism to control the horizontal movement of the pick-up is based on the same principle as that described with reference to FIGURE 9, but differs therefrom in that it is provided with three parallel cam tracks which follows the widened portion 276b.

The portions of the three different cam tracks correspond to the different portions of the two cam tracks in FIGURE 9, and are in FIGURE 19 referred to by corresponding reference numerals, but with the index 1, 2 and 3.

A spring 284b corresponding to the spring 284a in FIGURE 9 is located to close the entrance of the two outer cam tracks.

The pivotable record support 350b extending from the pick-up arm is of such dimension as to also support a 7″ record at its edge.

It will be understood from FIGURE 19, with reference to the explanation given in connection with FIGURE 9, that if the pick-up moves inwardly without meeting any resistance, the spring 284b will guide the pin 252b on the lever 250b into the inner cam track 282b³. However, if the pick-up arm is abutting against the edge of a 10″ record, the spring 284b will yield and guide the pin 252b into the intermediate cam track 282b². If the pick-up arm is engaging the edge of a 12″ record, the spring 284b will yield and allow the pin 252b to be guided into the outer cam track 282b¹.

*Mode of the Operation*

In the position of rest, the various parts are in the same position as that described with reference to FIGURES 1–11. Also, the driving wheel 164b is out of engagement with the bottom of the driving recess 158b and the cam disc 144b, because the lever 172b is pushed in its lifted position in the direction of the arrow A shown in FIGURE 13. Starting of the mechanism is effected, as explained, by swinging the arm 114b inwardly into its radial position, thereby actuating the nose 209b on the switch control arm 208b to move it to the starting position, and simultaneously withdrawing the lever 172b to bring the driving wheel 164b into driving engagement with the turntable spindle and the cam disc.

During the initial movement of the cam disc, the pick-up control arm 250b is guided by its guiding pin 252b into the cam portion 274b (FIGURE 19). Hereafter, the guiding pin 282b slides along the spring 284b until the knob 356b on the pick-up arm engages the periphery of a record. If the lowermost record is a 12″ record, the spring 284b will yield before the pin 252b has passed the entrance of the outer cam track to allow it to be guided therein. If the lowermost record is a 10″ record, the guiding pin 282b on the pick-up control arm will follow the spring 284b substantially to the point marked X in FIGURE 19; then the spring 284b will yield and allow the pin 252b to be guided into the intermediate cam track. If the lowermost record is a 7″ record, the projection 356b on the pick-up arm will not meet any resistance, and will thus slide along the whole length of the spring 284b to be guided into the inner cam track.

As described above, after the pick-up control pin is guided into that cam track which corresponds to the size of the lowermost record, it will then be guided into the appropriate cam track portion 282b¹, 282b² or 282b³, as explained with reference to FIGURE 19, whereby the pick-up arm is given a slightly inward movement bringing its projection 356b into engagement with the edge of the lowermost record, thereby pushing it sideways to release it from the projecting shoulder 191b of the central guiding pin along which it slides down onto the turntable.

When the projection 356b of the pick-up arm engages the edge of the lowermost record, the inwardly-extending arm 350b is swung into the position most clearly shown in FIGURE 23, due to the fact that its pivot point is slightly offset from the projection engaging the record edge. Thus the arm 350b is moved to the position where it will not hamper the sliding down movement of the lowermost record, which will be facilitated by a slightly sloping surface at 325b of this arm 350b.

Thereafter the pick-up arm 112b is moved inwardly to the playing position and lowered upon the record to engage its initial sound track.

During the playing period the remaining records in the magazine are kept in the horizontal position only by means of the arm 114b. The effect of the pivotable arm 350b on the pick-up only serves to support the lowermost record during its feeding and testing for size.

During the playing, the arm 251b (FIGURE 17) connected with the pick-up arm will give the lever 302b a slight anti-clockwise movement in accordance with the pitch of the sound track, thereby also giving the lever 306b a similar slight movement. As in the case of FIGURE 8, the rotating nose 308b will push the lever 306b back during each rotation. This movement is not transmitted to the lever 302b, due to the fact that the lever 306b is freely rotatable with only the friction of its own weight on the spindle 307b in the gap between the two discs 305b and 315b. When the pick-up stylus member is moved into the end track of the record, an increased movement of the two levers 302b and 306b will bring the nose of the lever 306b into engagement with the rotating nose 308b, thereby swinging the lever 306b to start the cam disc in the same manner as described with reference to FIGURE 8. If the engagement between the rotating nose 308b and the nose of the lever 306b should be too tight, the spring 317b will yield and allow the lever 302b to be pushed slightly back with the spindle 307b sliding in the slot 309b, thereby disengaging the lever nose from the rotating projection 308b.

When the last record has been played, the vertical spindle 180b of the horizontal arm 114b slides downwardly, thereby bringing its shoulder 187b into engagement with the lever 172b to tilt it as shown in FIGURE 20. The projection 310b on the top of the cam disc 144b, which is arranged so as to engage the downwardly directed projection 301b on the lever 172b will, during the further rotation of the cam disk in the direction of arrow A, FIG. 13, thereby actuate the switch arm 208b and disengage the driving wheel 164b from the turntable spindle and the cam disc.

Also in the embodiment of FIGURES 13–23, manual switch control may be applied in a similar manner as that described with reference to FIGURE 6.

A third embodiment of the automatic phonograph will now be explained with reference to FIGURES 24–35.

The common features of this third embodiment and of those previously described will not be repeated herein. Identical parts are referred to by similar reference numerals, but with an index *c*.

*Pick-Up Control Mechanism*

The cam disc, which is illustrated in plan view in FIGURE 31, is provided with a broad cam track 272*c* in which the pick-up control pin 252*c* moves during the playing operation. The appertaining cam surface controlling the vertical pick-up arm movement is in the form of a recess 261*c* corresponding to the lowered pick-up arm, as shown in FIGURE 31*a* in which are illustrated the appertaining horizontal and vertical movements of the pick-up arm. Hereafter follow the different cam portions in sequence; a vertical control arm portion 263*c* corresponding to elevation of the pick-up arm; an outward-guiding portion 276*c* for moving the pick-up arm to its outer position with the pick-up in its raised position. The guiding surface 276*c* comprises two spring members 284*c* and 254*c* secured to the cam disc in a manner similar to the spring member 284*a* in FIGURE 9, and arranged to close the entrance of two cam tracks 282*c*³ and 282*c*² having initial portions corresponding to a slight outward movement of the pick-up. A further outer cam track has its entrance open, communicating with the track portion 282*c*¹.

Each of the three cam tracks has a further portion 283*c*¹, 283*c*² or 283*c*³ corresponding to a slight inward movement of the pick-up arm, succeeded by a quicker inward movement and finally cam track portions 287*c*¹, 287*c*² and 287*c*³ which correspond to an outward movement and thereafter a slight inward movement. Between the raised cam surface portion 266*c* and the portion 261*c* is a sloping portion 267*c* corresponding to lowering the pick-up.

On the pick-up arm, as is most clearly illustrated in FIGURES 33, 34 and 35, is arranged a small wheel 400*c* which is allowed to rotate freely on a supporting pin 402*c*. This wheel is preferably arranged on an offset portion of the pick-up arm 112*c*. The wheel 400*c* extends upward beyond the top surface of a small knob 404*c*. It will be understood that the wheel may also be arranged extending up through a slot in the pick-up arm or in any other convenient manner. The knob 404*c* and the rotating wheel 400*c* are arranged in spaced relationship, as is most clearly shown in FIGURES 34 and 35, with the knob 404*c* nearer the center of the turntable than the wheel 400*c*. The top of the knob 404*c* is provided with a small frictional member 403*c*, for instance a rubber knob or the like. The wheel 400*c* is preferably very easily rotatable, for instance by being borne in a convenient low frictional bearing of any suitable type.

*Mode of Operation*

When the parts are in the rest position, the pick-up control pin 252*c* lies in the end of the cam portion 272*c* near the portion 276*c* corresponding to the inner position of the pick-up which is raised with the lever wheel engaging the cam surface 263*c*. When the mechanism is started, the cam disc rotates in the direction of the arrow shown in FIGURE 30. The pick-up is thereby simultaneously swung outwardly and raised slightly to engage with the rotating wheel 400*c* the bottom surface of the lowermost record in the magazine (cam portion 266*c*). The horizontal movements are thereafter as follows: the pick-up control pin 252*c* follows the cam portion 276*c* and the springs 254*c* and 284*c*. If the lowermost record is a 12″ record, the wheel 400*c* rotates with very little friction on the bottom side of the record, with the result that the pin 252*c* is guided along the two springs into the entrance of the outer cam track 282*c*¹. If the lowermost record is a 10″ record, the wheel 400*c* escapes from its engagement with the bottom surface of the record when it passes the edge thereof. This brings the small friction knob 403*c* into engagement with the bottom of the record surface, just as the pin 252*c* has started to slide along the spring 284*c*. The tension of this spring is so adapted to the friction between the knob 403*c* and the record surface that this friction will overcome the spring tension, thus bending the spring to open the entrance of the intermediate cam track 282*c*².

In a similar manner, releasing of the wheel 400*c* from the bottom surface of a 7″ record will cause the spring 254*c* to yield, thus opening the entrance of the inner cam track 282*c*³.

It will be understood that, in the manner described herein, the guiding pin 252*c* will automatically be guided into the correct one of the three cam tracks corresponding to the three different sizes of records to be played. Thus guided into the correct cam track, the pick-up will be moved slightly outwardly (track portion 282*c*¹, 282*c*² or 282*c*³), and then inwardly to engage the knob 404*c* against the edge of the lowermost record pushing it away from the supporting shoulder of the central guiding spindle; thereafter another slight outward movement is imparted to the pick-up arm 112*c*, whereafter it will be moved inwardly and down to engage the top surface of the record fed to the turntable in the manner described above.

The remaining part of the operation of this embodiment corresponds to that described with reference to FIGURES 12 through 23.

It will be understood that the invention, which has now been described specifically with reference to three different embodiments, is not limited to the specific constructions shown and described with reference to the drawings.

A specific modification of the record-feeding mechanism is shown in FIGURES 36–43, and further modifications thereof are shown in FIGURES 44–46.

In general terms this modification, which may be applicable to any of the foregoing described species, provides an improved security for bringing the record-feeding knob into engagement with the lowermost record only, and imparting to that record a sideward edge push, so that the record will be fed downwardly, irrespective of its size. According to the above modifications, the record-feeding mechanism is further so designed that it will operate satisfactorily even with warped records, which have previously caused considerable trouble. The feeding mechanism also operates with any type of profile at the edge of the records.

In general terms, the feeding mechanism provides for an inclined guiding surface extending below the edge push member in the downward and inward direction. The feeding member or knob and said guiding surface are resiliently arranged in such a manner that the top of the inclined guiding surface, when the feeding member is out of engagement with the edge of a record, lies above the horizontal plane through the lower surface of the lowermost record in the stack on the platform of the center spindle of the phonograph. Thus the feeding member, by its engagement with the edge of the record, will slide downwardly to the correct position of engagement.

It is thus possible to decrease the height of the feeding knob so that it is capable of engaging practically any thickness of record. Further advantages will appear from the following specification of these embodiments.

On the feeding member, which preferably is a tone arm 416, there is provided a feeding knob 428 below which is an inclined surface 430 extending downwardly and so arranged as also to abut against the center spindle of the record.

The top edge 430*a* of the inclined surface 430 is so adapted to the spring which keeps the tone arm in its raised position that, when the feeding arrangement is out of engagement with the edge of a record, the top of the inclined surface will assume a position in a horizontal plane somewhat higher than the bottom plane of the lower-most record of the stack supported on the spindle, while the lower end of the inclined surface 430 will extend below said plane.

Furthermore, the top edge 430*a* is arranged at such an angle with the tone arm 416 that said edge 430*a*, in the position of engagement between the knob 428 and the edge of a large-size record, such as for instance a 12" record, will assume a position in which it is substantially tangential with respect to said large-size record, such as is indicated in FIGURE 37, where the large-size record is marked A.

Also, as shown in FIGURE 37 in dotted lines, when the arm 416 is swung inward into engagement between the knob 428 and a small-size record such as a 7" record, the edge line will assume a position in which it forms a small angle with the tangent at the point of engagement with the record B.

The advantages of this arrangement will be more fully understood from the following explanation with references to FIGURES 38–43.

The knob 428 is in the form of an inverted cone, and the guiding surface 430 is so adapted that its top edge 430*a* is substantially tangential to the lower circular periphery of the knob 428. A vertical section through the feeding arrangement perpendicular to the edge 430*a* will, therefore, as shown in FIGURES 38, 39 and 42, show a profile with an acute angle *v* (FIGURE 42).

Due to the position of the edge 430*a* above the lower surface plane of the lowermost record, the feeding arrangement will approach the edge of the lowermost record in a manner shown in FIGURE 38 or in full lines in FIGURE 42. Thus, the inclined surface 430 will abut the lowermost record at the lower edge of its periphery, and by this engagement, the record-feeding arrangement will be moved in a downward direction against the action of the spring which raises the tone arm, so as to assume the position of engagement shown in FIGURE 39 or in dotted lines in FIGURE 42, in which a thick, large-size record is wedged into the angle *v* so as to secure a safe action.

It will be understood that the inclined surface 430 will thus determine that horizontal plane in which the feeding knob 428 is to perform its pushing action, or, in other words, the inclined surface 430 serves to bring the knob 428 always in to the correct position relative to the edge of the next record to be pushed down. Therefore, it does not matter whether the edge portion of the record is warped or has a profile more or less round or wedge-shaped, because the largest-size records will always at their edge be wedged into the angle *v*.

Small-size records such as 7" records are, in practice, always considerably thinner than larger-size records such as 10" or 12" records. The operation for small-size, thin records is illustrated in FIGURES 40, 41 and 43, which are end views or the feeding arrangement seen in direction of the arrow Y in FIGURE 37.

Because the edge line 430*a* in this position of the feeding arrangement forms an angle with the tangent to the record at the point of engagement with the knob 428, the front point 428*a* of the feeding knob 428 lies in this case behind the front point of the edge 430*a*, so that the thin record cannot be engaged by the knob 428 until the feeding mechanism has been moved down so far that a horizontal surface 430*b*, see FIG. 43, is at the same plane as the plane of the underside of the lowermost record.

In practice, the height of the knob 428 can be kept slightly lower than the thickness of the thinnest record to be handled.

As an example of an adequate dimension of the knob 428, the height thereof may be .6 mm., while the conicity may be so adapted that its conical surface forms an angle of approximately 55° with a plane perpendicular to the axis of the knob. This also ensures a safe engagement with a small, thin record lying directly beneath a larger-size record. In this event, the spring which raises the tone arm when the latter is moved outward to engagement with the underside of the lowermost record, will bring the top of the knob as close to the underside of the next record as possible. Due to the fact that the feeding knob is very low and is in the form of an inverted cone, a safe engagement is assured under all instances, even if the nevt lowermost record should prevent the edge 430*a* from being raised to such a position that the feeler surface 430 can perform its action as described.

It will be understood that different modifications are possible within the basic idea of this feeding system.

A modification is shown schematically in FIGURES 44 and 45. In this modified embodiment, the arm 416 which carries the feeding arrangement is only shown schematically. The resiliency of the guiding surface is provided thereat within the feeding member itself, which is in the form of a conical part 440 forming the inclined guiding surface, and an inverted cone 442 forming the feeding knob. The parts are arranged on a longitudinal, displaceable pin 444, which is adapted to be pushed downwardly against the action of a spring 446 to a position shown in FIGURE 45.

A further modification of the arrangement is shown in FIGURE 46. In this embodiment the inclined surface 430 terminates in an inclined edge 430*c*, which by means of an inclined pushing surface 448 terminates in a horizontal edge 448*a*. The angle position of the edges 430*c* and 448*a*, together with the surface 448, will be so adapted relative to the tangents of the phonograph records at the point of engagement, that a large-size record will be engaged near the upper lefthand end corner of the surface 448, while a small-size thin record will be engaged near the lower righthand end corner of said surface.

It will be understood that, although the two step-feeler systems as previously described are not shown, in order to facilitate the survey of FIGURES 36–46, it is entirely possible to include them in any convenient manner.

One important feature of my invention is that the pick-up is controlled to travel from the end of a record-playing position to the beginning of a record-playing position via a path in which it engages the edge of the next record to be played, and that by this engagement the remaining travel path is selectively determined in accordance with the size of the record to be played.

Another important feature of my invention is that the pick-up arm, during its travel, simultaneously engages the lowermost record in the stack to release it to ge fed to the playing position.

A further important feature of my invention is that the arm, which extends radially above the top of the stack of records in order to keep them in horizontal position, is also provided with means for switching the motor on and off.

This has in practice been found very convenient. It has always been a problem with record changers to stabilize the records in the horizontal position. The problem can also be solved by a lateral support, for instance with the jib 233*a* in the embodiment of FIGURES 1–11, in which case the arm is of less importance. However, I found that the top supporting arm is efficient without the addition of such lateral support. The use of such top supporting arm means that the person putting records on the phonograph will, in any event, also have to put the supporting arm in its correct position, and I have therefore found it convenient to combine the movement of this arm with the switching on of the motor, which necessitates only one motion to start the phonograph.

As a result of the simplification attained by the present invention, it will be appreciated that the number of levers and movable parts in the phonograph has been considerably decreased. In fact, my new phonograph is able to play records of various sizes mixed together. It has always been a problem in such phonographs to adjust the pick-up travel path to accord with the size of the records and to feed down the new record, because in most cases the feeding mechanism also has to be adjusted to accord with the size of records.

In my construction I thus attained a simplification by selecting the travel path of the pick-up, and by further using the pick-up itself as the record-feeding control member, and therefore, I am able to avoid a considerable number of moving parts.

It will be understood, however, that various modifications can be made within the scope of my invention. Thus for instance in the embodiment of FIGURES 1–11, the jib 233*a* may be avoided. It has, however, been found convenient to use this jib in this embodiment in order to assure the pick-up arm in the correct horizontal level during its engagement with the edge of the lowermost record, to release it to be fed down to the turntable. However, in the embodiment of FIGURES 12–23, the pivotable arm arranged on the pick-up itself serves the same purpose, and in this case the jib has been omitted. In the embodiment specifically shown in FIGURES 33–35, lateral support for the records during the engagement of the pick-up arm with the edge of the lowermost record has been totally avoided by means of frictionally testing the size of the lowermost record by the knob 403*c* during the travel of the pick-up on its way out. The pick-up will, in the case of a small record, thus be prevented from travelling further than just beyond the edge thereof, so that it will always engage, on its following inward travel, the edge of a record which has been tested for size.

As mentioned in connection with this embodiment, the position of rest of the cam disc 144*c* corresponds to the pick-up in its raised position, but near the center, viz. with the cam track follower 252*c* in the broad cam track 272*c*. This means that when the last record has been played, the pick-up arm will be in this position and must, in order to allow the records to be removed from the turntable, be pushed manually outside the stack of records. When placing a new stack of records on the central spindle, the pick-up must be initially brought by hand to its central position in order to allow it initially to test the lowermost record.

If such manual movement of the pick-up arm is undesirable, the cam disc may, as shown in dotted lines in FIGURE 31, be provided with a further cam track portion comprising an outwardly leading pick-up directing portion 173*c* which will be move the pick-up outside the periphery where the pick-up cam follower will be in a cam track portion 174*c*, which then coreresponds to the position of rest after playing of the last record, as in the case of the two other embodiments. This means that the cam surface, which controls the vertical movement of the pick-up arm, must have a portion 261*c* to raise the pick-up arm and a portion 263*c* corresponding to the raise pick-up in the outer position thereof. When in this case the phonograph is started, the pick-up is first slightly lowered (cam portion 263*c*) and simultaneously moved inward (cam track 175*c*); then the pick-up is again raised (cam portion 265*c*), whereafter the cycle of movements will be along the cam portion 276*c* as previously described.

A specific modification of the record-feeding mechanism is shown in FIGURES 36—43, and further modifications thereof are shown in FIGURES 44–46.

In general terms this modification, which may be applicable to any of the foregoing described species, provides an improved safety for bringing the record-feeding knob into engagement with the lowermost record only, and imparting to that record a sideward push, so that the record is fed down, irrespective of its size. According to the above modifications, the record-feeding mechanism is further so designed that it will operate satisfactorily even with warped records, which have previously caused considerable trouble. The feeding mechanism also operates with any type of profile at the edge of the records.

In general terms, the feeding mechanism provides for an inclined guiding surface extending below the edge push member in a downward and inward direction. The feeding member or knob and said guiding surface are resiliently arranged in such a manner that the top of the inclined guiding surface, when the feeding member is out of engagement with the edge of a record, lies above the horizontal plane through the lower surface of the lowermost record in the stack on the platform of the centre spindle of the phonograph. Thus the feeding member, by its engagement with the edge of the record, will slide downward to the correct position of engagement.

It is thus possible to decrease the height of the feeding knob so that is capable of engaging practically any thickness of record. Further advantages will appear from the following description of these embodiments.

On the feeding member, which is preferably a tone arm 416, a feeding knob 428 is provided below which is arranged an inclined surface 430 extending downwardly so as also to abut against the center spindle of the record.

The top edge 430*a* of the inclined surface 430 is so adapted to the spring which keeps the tone arm in its raised position that, when the feeding arrangement is out of engagement with the edge of a record, the top of the inclined surface will assume a position in a horizontal plane somewhat higher than the bottom plane of the lowermost record of the stack supported on the spindle, while the lower end of the inclined surface 430 will extend below said plane.

Furthermore, the top edge 430*a* is arranged at such an angle with the tone arm 416 that said edge 430*a*, in the position of engagement between the knob 428 and the edge of a large-size record, such as for example a 12″ record, will assume a position in which it is substantially tangential with respect to said large-size record, such as is indicated in FIGURE 37, where the large-size record is marked A.

Also, as shown in FIGURE 37 in dotted lines, when the arm 416 is swung inwardly into engagement between the knob 428 and a small-size record such as a 7″ record, the edge line will assume a position in which it forms a small angle with the tangent at the point of engagement with the record B.

The advantages of this arrangement will be more fully understood from the following explanation with reference to FIGURES 38–43.

The knob 428 is in form of an inverted cone, and the guiding surface 430 is so adapted that its top edge 430*a* is substantially tangential to the lower circular periphery of the nob 428. A vertical section through the feeding arrangement perpendicular to the edge 430*a* will, therefore, as shown in FIGURES 38, 39 and 42, show a profile with an acute angle *v*.

Due to the position of the edge 430*a* above the lower surface plane of the lowermost record, the feeding arrangement will approach the edge of the lowermost record in a manner shown in FIGURE 38 or in full lines in FIGURE 42. Thus, the inclined surface 430 will abut the lowermost record at the lower edge of its periphery, and by this engagement, the record-feeding arrangement will be moved in a downward direction against the action of the spring which raises the tone arm, so as to assume the position of engagement shown in FIGURE 39 or in dotted lines in FIGURE 42, in which a thick, large-size record is wedged into the angle *v* so as to thereby secure a safe action.

It will be understood that the inclined surface 430 will thus determine that horizontal plane on which the feeding knob 428 is to perform its pushing action or, in other words, the inclined surface serves to bring the knob always in to its correct position relative to the edge of the next record to be pushed down. Therefore, it does not matter whether the edge portion of the record is warped or has a profile more or less round or wedge-shaped, because the largest-size records will always be wedged at their edge into the angle v.

Small-size records such as 7" records are, in practice, always considerably thinner than larger-size records such as 10" or 12" records. The operation for small-size thin records is illustrated in FIGURES 40, 41 and 43, which are end views of the feeding arrangement as seen in direction of the arrow Y in FIGURE 37.

Because the edge line 430*a* in this position of the feeding arrangement forms an angle with the tangent to the record at the point of engagement between the knob 428, the front point 428*a* of the feeding knob 428 is thereby disposed behind the front point of the edge 430*a*, so that the thin record cannot be engaged by the knob 428 until the feeding mechanism has been moved down so far that a horizontal surface 430*b*, see FIGURE 43, is on the same plane as the plane of the underside of the lowermost record.

In practice, the height of the knob 428 can be kept slightly lower than the thickness of the thinnest record to be handled.

As an example of an adequate dimension of the knob 428, the height thereof may be .6 mm., while the conicity may be so adapted that its conical surface forms an angle of approximately 55° with a plane perpendicular to the axis of the knob. This also ensures a safe engagement with a small, thin record lying directly beneath a larger-size record. In this event, the spring which raises the tone arm when the latter is moved outward into engagement with the underside of the lowermost record, will bring the top of the knob as close to the underside of the next record as possible. Due to the fact that the feeding knob is very low and is in the form of an inverted cone, a safe engagement is secured in all instances, even if the next lowermost record should prevent the edge 430*a* from being raised to such a position that the feeler surface 430 can perform its action as described.

It will be understood that different modifications are possible within the basic idea of this feeding system.

A modification is shown schematically in FIGURES 44 and 45. The arm 416 which carries the feeding arrangement is only shown schematically. The resiliency of the guiding surface is provided thereat in the feeding member itself, which is in the form of a conical part 440 forming the inclined guiding surface, and an inverted cone 442 forming the feeding knob. The parts are arranged on a longitudinal, displaceable pin 444, which is adapted to be pushed downwardly against the action of a spring 446 into a position shown in FIGURE 45.

A further modification of the arrangement is shown in FIGURE 46. Here the inclined surface 430 terminates in an inclined edge 430*c*, which by means of an inclined pushing surface 448 terminates in a horizontal edge 448*a*. The angular position of the edges 430*c* and 448*a*, together with the surface 448 will be so adapted relative to the tangents of the phonograph records at the point of engagement that a large-size record will be engaged near the upper lefthand end corner of the surface 448 while a small-size thin record will be engaged near the lower righthand end corner of said surface.

It will be understood that, although the two step feeler systems as previously described are not shown, in order to facilitate the survey of FIGURES 36–46, it is entirely possible to include them in any convenient manner.

Some modifications of the trip starter control, manual control and tone-arm control will be described hereinafter with reference to FIGURES 47–57. It will be understood that these modificants can be used in connection with any of the embodiments shown and described hereinabove.

In general the phonograph comprises a chassis plate 10*d* on which a rotable turntable 12*d* is arranged to be driven from an electric motor (not shown) which preferably by means of a manually adjustable knob 14*d* can be adjusted to a plurality of different speeds.

The turntable 12*d* is rotatable on a stationary bushing 16*d* having a hole for receiving the centre spindle 18*d*, which is provided with a platform 20*d* for supporting the phonograph records in a magazine in spaced relationship above the turntable. The centre spindle is so designed that the records can be suplied sequentially one after another to the playing position by imparting a sidewardly directed displacement to the lowermost record. In order to stablize the records supported on the platform 20*d*, a pivotable ballast arm 22*d* is provided to be swung on a vertical spindle which is also displaceable in an up and downward direction. The ballast arm 22*d* is designed to rest against the top side of the uppermost record in the stack so as to retain the stack of records in the horizontal position.

Furthermore, the phonograph is provided with a tone arm 24*d* which preferably also serves as that member designed for imparting a sidewardly-directed push to the lowermost record in the magazine in such a manner as is more specifically disclosed hereinabove. The invention is, however, not limited in this respect, since any other convenient mechanism for imparting a sidewardly directed push to the lowermost record may be used within the scope of the invention.

The main parts of the phonograph below the chassis plate comprises a cam disc 26*d* adapted to control the horizontal movements of the tone arm by means of a lever 28*d*, and adapted to control the vertical movements of the tone arm by means of a pivotable arm 30*d*, see FIG. 51. The cam disc is driven from a driving roller 32*d* (FIGURE 52), which in its turn is driven from a continuously rotating spindle 34*d*, preferably the main spindle of the turntable. Below the chassis plate there is further arranged a trip-starter lever 36*d* and a control lever 38*d* (FIGURES 48–50). The control lever 38*d* is connected with a manually operable control member 40*d*, see FIGS. 47, 50 and 55.

Such parts of the phonograph which especially are the subject matter of this invention are the control of the tone arm comprising the lever 38*d* and the cam disc 26*d*, and to a certain degree also the spindle 18*d* with its platform 20*d*. A more detailed description of the cam disc and the tone-arm control mechanism is given in the co-pending Danish Patent applications Nos. 686/54 and 687/54 and 690/54, to which only a brief reference is made, since the following description will only comprise such features of the control mechanism that are necessary in order to understand the operation of this invention.

A cam track follower 164*d* is arranged on the lever 28*d*, which is formed as a pin pressed down in the direction of the cam disc by means of a spring 166*d* (FIGURE 50), and which has its lower end adapted to be guided in the various cam tracks of the cam disc, as disclosed hereinafter. To rotate the cam disc by means of the driven roller 32*d*, an initial movement is imparted to the cam disc 26*d* by means of an abutment 124*d* and the lever 26*d*, the exterior end 130*d* of which is engaged by a rotating nose 123*d* on the turntable spindle 34*d*, such as is more fully described hereinafter.

The cam disc can also be caused to rotate under manual control, so that the operating member 40*d* causes a displacement of the control lever 38*d*, whereby a resilient pawl member or the like connected therewith abuts against an abutment 96*d* on the cam disc and thereby imparts to the latter a corresponding initial movement as imparted by the trip-starting lever 36*d*. This arrangement is described in more detail in the following. For the present invention, it is important to note that the abutment 92*d* on the cam dsc, which is adapted to switch off the driving mechanism for the phonograph and open the switch for the phonograph motor when the abutment 39*d* (FIGURE 48 and 49) on the control lever 38*d* is brought into the path of the abutment, is so located that opening and decoupling takes place when the cam disc is rotated a relatively small angle only from that position in which it is kept with the driving roller 32*d* in the recess 42*d*.

Seen from another angle, the phonograph is adapted to decouple the driving gear for the cam disc in two positions, namely as usually in the playing position in which a free movement of the tone arm is allowed by a free movement of the cam track follower 164*d* in a recess 146*d* in the cam disc, and in a nearby position corresponding into a small angular rotation only of the cam disc to which the latter can be rotated, either automatically after playing of the last record or under manual control, by reason of the fact that a nose 89*d* (FIGURE 50) on the lower end of a pivotable arm 88*d* carrying the control knob tilts the control lever 38*d* to the position shown in FIG. 50, in which the stop control abutment 92*d* on the cam disc operates in the same manner as in the case of a stoppage after playing the last record by displacing the rod 60*d* downwardly under the influence of the weight of the ballast arm 22*d*.

This enables, as shown in FIG. 52, provided with a further recess 168*d* in the cam disc as a neighboring recess to the playing recess 146*d* therein, that the tone arm, in its stop position after playing the last record or after playing of any record by interruption of the playing thereof, can be swung freely out and in in a similar manner as when the cam track follower 164*d* is movable in the recess 146*d*, i.e. in a similar manner as in the playing position.

This is in contradiction to previously known control devices in which it has been considered preferable to swing the tone arm entirely to its exterior position outside the periphery of the largest record to be played in case of such second stop position, so that the tone arm in this position is left raised and in an exterior position is capable of being guided inwardly and lowered on the next record into the initial sound track thereof by means of the cam disc tracks.

The horizontal control of the tone arm is enabled by means of a plurality of cam tracks as follows:

From the playing track 146*d* there is, besides the recess, branched off an outlet track for the passage of the cam track follower in case of normal changing, i.e. when the cam disc is started by means of the trip-starting lever 36*d*. This track continues in a track 174*d* causing an outward movement of the tone arm until such a position when a light friction member 140*d* (FIGURE 47) on the tone arm passes beyond the edge of the next record to be played, so that a high friction member 142*d* engages said record. By this engagement, the further guiding of the cam track follower in the track 174*d* is opposed, and the cam track follower is guided into one of a plurality of branched-off cam tracks 178*d* or 180*d* in the case of a record of medium or smallest size. The inlet of either of these branched-off tracks is connected with the track 174*d* by means of inclined surfaces 178*ad* and 180*ad* respectively having their inclination adapted to the tension of the spring 166*d* and the resistance caused by the friction member 142*d against the continuous outwardly directed movement of the tone arm, in such a manner that said resistance is capable of overcoming the tension of the spring, and thereby allows the cam track follower 164***d* to pass into one or the other of said two tracks 178*d* or 180*d*, the bottom of which are slightly above the level of the bottom of the track 174*d*. The three tracks are substantially following a similar path, and are provided with the following sections:

Between the positions III and IV (FIGURE 53) the tone arm, which in the position III has arrived at such a position that the high friction member 142*d* has passed slightly outside the periphery of the record, is moved slightly inward, more specifically so much that the knob is capable of engaging the edge of the record, the size of which has been tested and thereby imparts a sidewardly directed push thereto, sufficient to release it from the platform or recess 20. This release takes place near the position IV, whereafter the tone arm between the positions IV and V is moved slightly outward in order to prevent that the edge of the record dropping does not strike the tone arm.

Between the positions V and VI the tone arm will remain in the same angular position. This rotation of the cam disc is relatively long in order to secure that the record, which has been pushed sideward, is able to fall down on the turntable which under these circumstances may require some time, especially if the records are very plain-surfaced, so that the lowermost record can be "sucked" below the next-lowermost one.

Between the position VI and VII the tone arm is guided in an inward direction to such an angular position of the stylus member as corresponds to the initial position for playing the record supplied to the turntable, and between the positions VII and VIII the tone arm remains in this angular position. It is appreciated that between the angular positions VII*a* and VIII the cam tracks are broader in such a manner that a cam track follower can move inwardly in these track positions. This enables the possibility for the stylus member to find its way down into the initial groove of the phonograph record. The length of the broader track sections between the positions VII*a* and VIII is so adapted that they correspond substantially to an entire revolution of the turntable.

Between the centre of the turntable and the centre of the tone arm spindle there is provided a bridge 200*d* (FIGURES 51 and 42) having that end extending below the centre of the turntable formed with a recess 202*d* to receive a bearing for the turntable. The other end of the bridge is secured on a distance piece 204*d*. The bridge further supports the cam disc which is rotably arranged on a pin secured by a unit 206*d*, which can be see below the bridge 200*d* in FIG. 51.

Below the bridge 200*d*, there is arranged a pivotable two-armed lever 30*d* having at one end a small roller or the like 208*d* abutting against a cam section 210*d* controlling the vertical movement of the tone arm, and adapted to cooperate at the other end with an adjustable unit 212*d* on the lower end of a pull rod 214*d** controlling the vertical movement of the tone arm.

The cam 210*d* is provided with a plurality of sections which in FIGURE 53 are referred to by the same numerals as the cam sections controlling the horizontal movement of the tone arm.

The sections of the vertical control cam 210*d* controls the vertical movement in a manner as appears from the control diagrams, in FIGURE 54 which also shows the horizontal movement of the tone arm.

As soon as the cam disc is started from its normal resting position in which the driving roller 32*d* serves to keep it, the vertical control cam causes the tone arm to be raised, such as shown in the left hand side of the diagram. The tone arm is raised to a position approximately 5 mm. below the underside of the lowermost record in the magazine, in which position the tone arm is retained, until the cam disc arrives at the position II.

If in the meantime the rotation of the cam disc is stopped by the cooperation of the abutment 92*d*, and the abutment 39*d* on the control arm, the tone arm will remain in its raised position.

In this position, the cam track follower 164*d* remains in the corresponding position and has either remained somewhere in the playing recess 146*d* or by overcoming the tension of the spring 166*d*, the cam track follower has passed beyond the inclined surface 170*d* into the neighbouring recess 168*d*, the bottom of which preferably is provided with grooves all of which are branched into an inlet track, all grooves preferably being concentric with the groove 146*d* so that, if the cam track follower has found its position in one of said grooves in one angular position of the tone arm, it will retain this angular position until the cam disc has rotated so far that the cam track follower is guided into the inlet groove 172*ad*.

If the parts have assumed this stop position after playing the last record from the magazine, the phonograph has to be loaded again with a new stack of records, and the further operations prior to playing the first record are as follows:

The centre spindle 18*d* is removed and the records already played are removed. The ballast arm 22*d* is raised and moved outside. The cam track follower is still free to move in a recess 168*d* so that the tone arm under manual control can be moved in and out. Simultaneously, the tone arm is still in its raised position, see section 2 of the diagram, FIG. 53. Hereafter, the tone arm is swung into a position inside the periphery of the lowermost record to be placed in the magazine. In this position, the tone arm is retained thereby that the cam track follower cooperates with one of the grooves in the recess 168*d*. The stack of records is thereafter loaded on the platform 20*d* of the spindle 18*d*, one or more, simultaneously with the lowermost record having its edge resting on the raised tone arm.

Thereafter the ballast arm 22*d* is swung in, until the abutment 82*d* abuts against the abutment on the control arm 38*d* and displaces the latter longitudinally to switch on the mechanism. The cam disc is started thereby by releasing the driving roller 62*d*, which under influence of a spring 54*d* (FIGURE 51) is brought into its driving position between the turntable spindle 64*d* and the periphery of the cam disc, while simultaneously the control arm 78*d* of the phonograph motor is moved to close the switch. By swinging the ballast arm inward and bringing it down to rest on the top side of the stack of records, the latter are secured in the horizontal position so that the space between the tone arm and the underside of the lowermost record will remain the above mentioned approximate 5 mm.

By the further rotation of the cam disc, the cam track follower 164*d* is guided through that one of the grooves of the recess 168*d* in which it was left during the loading of the magazine into the inlet groove 172*ad*, whereafter the cam track follower and thereby the tone arm is guided inward to a position inside the periphery of a record of the smallest size to be played. When reaching this position, the tone arm is, as shown in section 3 of the diagram, raised to engage the light friction roller 140*d* of the record size-testing member against the underside of the lowermost record with a certain bias caused by a spring. The tone arm will remain in this position except that after passage of the friction member 142*d* beyond the edge of the record, the tone arm will be raised slighlty more so as to allow the inclined surface adapted to find the drop control level for the record, the size of which has been tested, to slide along the edge of the phonograph record during the drop control operation which takes place in section 4.

The tone arm is slightly lowered thereafter during the passage in section 5, and remains in the lowered position until the tone arm after position VII has reached that angular position corresponding to the initial playing position for the new record. After this position, the tone arm is lowered in position VII whereafter, as already mentioned hereinabove, there is allowed a certain play for the cam track follower during an entire revolution of the turntable so as to safeguard that the stylus member has an opportunity to find the initial groove of the phonograph record, but is still prevented from passing beyond the edge thereof.

If the cam disc has been stopped during playing of a plurality of records so that the magazine is still loaded, the cam track follower 164*d* will be in an arbitrary position. If the phonograph is restarted in this position by displacing the control arm 38*d* by operating the knob 40*d* so as to impart an initial movement to the cam disc by means of the pawl spring 94*d* (FIGURE 50), the tone arm will, as described hereinabove, also be in its raised position approximately 5 mm. below the underside of the lowermost record in the magazine, and the cam track follower may either be positioned in the recess 146*d* or somewhere in the recess 168*d* depending on when the playing has been interrupted. In such position it is most simple to start the phonograph by using the knob 40*d*, pushing the same to the position shown in FIGURE 50 whereby the lower end of the lever will abut the right-hand end of the recess 90*d* (FIGURE 55) and pull the control rod 38*d* back to the starting position. Thereafter the further movements will be as already described.

A further part of the phonograph which is the subject matter of the present invention is the trip-starter comprising the trip-starter lever 36*d*. This lever comprises two mutually-connected levers which are designed as follows:

Below the chassis plate 10*d*, one of these levers, the end of which remote from the centre of the turntable is designated by 102*d* (FIGURES 48, 49, 50 and 56) and the other end of which is designated by 104*d*, is arranged to pivot about a pin 100*d*. The chassis plate 10*d* is provided with a pair of beads or projections 106*d* and 108*d*, forming an abutment surface for the topside of the lever 102*d*, 104*d*. These abutments are arranged in a certain spaced relationship, preferably at an equal distance from either side of the pin 100*d*.

The lower trip-starter lever is designated by 110*d*, and is pivotally arranged on a pin 100*d* by means of a keyhole-like recess 112*d*, the narrow portion of which fits on a recess in the pin 100*d*. Between the pin and the lever 110*d* there is interposed a spring 114*d* (FIGURES 48 and 49), serving to keep the free end of the lever 110*d* in its projecting position, but allowing the lever 110*d* to be pushing back relatively to the lever 102*d*, 104*d*.

The portion 102*d* of the lever 102*d*, 104*d* is provided with a downwardly-directed flap 103*d* (FIGURE 50), which forms an angle with the longitudinal axis of the lever, and in which a slot 105*d* is provided for the passage of a projection also having a downwardly directed flap 111*d* on the rear end of the lever 110*d*.

The two levers 102*d*, 104*d* and 110*d* respectively are only connected between the projections 106*d* and 108*d*, and the connection is obtained by providing a pair of projections or beads 116*d*, 118*d* on the lever 110*d*, said projections being closer to the pin 110*d* than the projections 106*d* and 108*d*. It will be understood that the friction between the parts is thereby so adapted that there is less friction between the two levers than between the lever 102*d*, 104*d* and the chassis plate 10*d*.

Seen from another angle, this means that if the lever 110*d* is operated to pivot, it will be able to swing freely about the pin without transmitting its movement to the lever 102*d*, 104*d*, while in contradiction a pivoting of this lever 102*d*, 104*d* is not possible without transmitting the movement to the lever 110*d*.

On the cam disc 26*d* there is provided an abutment 120*d* which, in the rest position of the cam disc during the playing of a record, is located behind the flap 111*d* on the lever 110*d*, so that a longitudinal displacement of this lever caused by cooperation between its front end 130*d* and a nose 122*d* on the rotating spindle 34*d* in its turn will cause the flap 111*d* to abut against the abutment 120*d* in order to give the cam disc an initial movement so as to start its driving mechanism to effectuate the guiding of the sequence of movements necessary for the changing.

The entire trip-starter lever is swung by engaging an abutment surface 124*d* on the tone arm lever 28*d* against an abutment 107*d* on the rear end of the lever 102*d*.

The engagement between the abutment surface 124*d* and the abutment 107*d* is caused at a relatively late stage during playing of a record, thereby that the abutment 120*d* on the cam disc causes to move the entire trip-starter lever to engage an abutment 126*d* during the rotation of the cam disc.

It will be understood that when an initial movement in the manner described hereinabove is imparted to the cam disc, the abutment or knob 120*d* will, after nearly an entire revolution of the cam disc, cooperate with the inclined surface 103*d* so as to cause a rotation of the lever 102*d*, 104*d*, and thereby an outwardly-directed movement of the lever 110*d*. By means of this rotation of the entire trip-starter lever, the mutual angle between the lever portions 102*d*, 104*d* and 110*d* respectively is also adjusted since the lever 110*d* abuts against the abutment 126*d* which, for example, is in the form of a rubber-covered pin secured on the underside of the chassis plate. This pin 126*d* is so located relative to the other parts that the lever 110*d* is rotated so much counterclockwise relative to the lever 104*d* that it will abut against the flap 113*d* on the end of the lever 104*d* in its final position. Opposite this flap 113*d* there is arranged another flap 115*d* to assure that the lever 110*d* can make a limited rotation only relative to the lever 102*d*, 104*d* in order to prevent a relative displacement of the parts more than necessary for their function in case of any excessive forces applied thereto.

The front end of the lever 110*d* near the spindle 34*d* is provided with an inclined surface 128*d* and a flap 130*d* (FIGURE 57) perpendicularly to the plane of the levers, said flap serving the purpose of providing a suitably large surface between the front end of the lever and the rotating nose 122*d* when these parts are engaged. This enables a.o. that the use of steel or any other hard material is not necessary for the nose, as such material will given rise otherwise to a noise every time the nose rejects the lever. The construction enables use of a more silent material, for example nylon, which would not be possible if the flap 130*d* was not used in order to provide for a suitably large engagement area.

The arrangement operates in that way that the parts initially assume such a position in which the tip of the lever 110*d* is most remote from the rotating nose 122*d*, as well as the abutment 107*d* is most remote from the abutment surface 124*d* corresponding to such a position of the lever 110*d*, see FIG. 49, that the front edge thereof is near to or engaged the flap 113*d*. In this position, the tone arm can be removed substantially across the entire sound track portion of the record before the abutment 124*d* engages the abutment 107*d*. When this abutment initiates during the playing or substanitally when the stylus member passes into the outlet groove of the record, the abutment 124*d* will push on the arm 102*d* so as to thereby swing the entire trip starter clockwise, thus bringing the tip of the lever 110*d* into the path of the rotating nose 122*d*. If this takes place when the stylus member still passes through the groove of normal pitch on a phonograph record, the lever is not swung sufficiently to enable the front edge 123*d* of the nose 122*d* to grip the tip of the lever 110*d*, and the passage of the nose will only result in a rejection of the lever 110*d* which in its turn will cause a slight change of the angle between the two portions of the trip-starter lever without transmitting this movement back to the lever 102*d*, 104*d*, because as mentioned hereinabove, the friction between the two levers and between the entire trip-starter lever and the chassis plate are different.

When, however, the stylus member enters the outlet groove on the record which is of higher pitch than the playing groove, the velocity with which the entire trip-starter lever is swung is increased, so that the front edge 123*d* of the nose is capable of gripping the tip of the lever 110*d* and pushing this lever back against the action of the spring 114*d*, whereby the flap 111*d* engages the abutment 120*d* on the cam disc and imparts an initial starting movement thereto.

When the front surface of the nose 122*d* has rotated sufficiently to release the tip of the lever 110*d*, the spring 114*d* will push the lever 110*d* forward again. This takes place instantaneously, and so early that the remaining surface of the nose has not passed the tip of the lever 110*d*, with the result that the corner point 129*d* behind the inclined surface 128*d* near the front end of the lever 110*d* will hit the nose 122*d* somewhere behind its front edge, which will result in that the nose imparts a push to the lever 110*d* in a direction away from the rotating nose so as to thereby ensure that the tip can be engaged by the nose when it passes during its next revolution.

When the cam disc has rotated an entire revolution, the abutment 120*d* will, in the manner described hereabove, adjust for any undesired position of the trip-starter lever and swing the latter to its desired initial position.

The driving roller 32*d*, which may be either a frictional roller or a pinion, is movable between two positions. In one position—the driving position—the driving roller is interposed between the rotating turntable spindle 34*d* and the cylindrical surface of the cam disc, and in the other position the driving roller is moved out of this position so as not to engage the spindle 34*d*. This decoupling can be effectuated in two different ways: either by forcing displacing the driving roller from its position of engagement with the turntable spindle, or thereby that the driving roller enters a recess 42*d* in the periphery of the cam disc. This recess is so located relative to the cam tracks of the cam disc that the cam disc, in the position shown in FIG. 48, will be in the playing position in which the cam track follower on the lever 28*d* is allowed to move freely in a recess in the cam disc without any resistance, so as to enable the stylus member on the tone arm to follow the playing groove in the record that is played.

In order to obtain these movements, the driving roller is arranged freely rotatable on a lever 44*d*, which at one end is bifurcated at 46*d*, as shown in FIG. 50. This end is supported in a slot in a bracket 48*d* secured under the chassis plate of the phonograph. The other end of the lever 44*d* is, by means of a keyhole-shaped slot 50*d*, guided in an annular groove provided in a pin 52*d* (FIGS. 48 and 49) secured on the chassis plate. A spring 54*d* is interposed between the end of the latter portion of the lever 44*d* and a suitably fixed part.

As is most clearly shown in FIG. 48, the parts are so located that the driving roller is located on the one side of the connecting line between the centre of the turntable and the centre of the cam disc, so that the spring 54*d* will press the driving roller into engagement with the cam disc. The direction of that end of the lever 64*d* which is guided on the pin 52*d* will support the action of the spring, so as to pull the driving roller in the direction of the connecting line between the two centres. The tension of the spring 54*d* and the location of the parts are so adapted that when the driving roller enters the recess 42*d* in the cam disc, the spring is not capable of pulling it out of this position, and simultaneously the recess is so deep that the driving roller in this position is removed so much from the spindle 64*d* that the same runs idle.

When the trip-starter lever gives the cam disc an initial movement in the direction of the arrow shown in FIGURE 50, which is sufficient to bring the driving roller out of the recess 42*d*, the pull exerted by the spring 54*d* will ensure that the driving roller again engages the spindle 34*d* so as to rotate the cam disc one revolution, until the driving roller enters the recess again. This normally takes place every time a record is changed.

The lever 44*d* carrying the driving roller is furthermore provided with an upwardly-extending flap 56*d*, which forms an abutment for the control lever 38*d*. This lever acts as a member capable of displacing the entire lever 44*d* with the driving roller to make it possible that the driving roller can be decoupled not only as described in the above by entering the recess 42*d*, but also be displacing the lever 44*d* in the direction of the arrow shown at one end thereof.

The control lever 38*d* is in the form of an elongated member having its one end guided in a recess 58*d* in a stationary sleeve 60*d*, which also serves as a guiding sleeve for the vertical spindle of the ballast arm. As shown in FIGS. 50 and 55 this sleeve 60*d*, which is firmly secured to the chassis plate, has below the recess 58*d* a plane surface so that the control lever 38*d* is supported on one side of the sleeve only see FIGURE 55 for further details. Furthermore, the sleeve has a longitudinal bore for passage of the ballast arm spindle 62*d*, and in this bore there is diametrically opposite the recess 58*d* provided a longitudinal slot for a rod 64*d*, which is movable in its longitudinal direction, and at its lower end is provided with a foot portion 66*d* resting on the top surface of the control lever 38*d* adjacent the edge of a longitudinal recess 68*d* therein, which enables that the control lever 38*d* can be displaced longitudinally forward and backward. To secure a substantially horizontal level of the control lever 38*d* parallel with the chassis plate 10*d*, there is interposed between an eye 70*d* (FIG. 50) in the control lever 38*d* and an eye 72*d* in a recess in the chassis plate a strong hairpin-shaped spring 74*d*. This spring 74*d*, and the points at which engage its end on the chassis plate and the control lever respectively, are so adapted to the length of the slot 68*d* that the control lever can be displaced longitudinally in the direction of the arrow shown in FIG. 50, to pass beyond the point of equilibrium of the spring before the end of the lever touches the abutment 56*d*. Simultaneously, the further displacement beyond the point of equilibrium is large enough to allow the control lever 38*d* to move the lever 44*d* with the driving roller to the above-mentioned decoupled position in which the driving roller is not lying in the recess 42*d*, see FIG. 49. The normal position of the control lever is that shown in FIGS. 48, 50 and 51, in which an abutment 76*d* has moved the control lever 78*d* for the phonograph motor switch (not shown) to a position closing this switch.

The movement of the control lever to this position can either be effected by means of an abutment 82*d* on the lower end of the ballast arm spindle 62*d*, or by means of the manual control knob 40*d*. The abutment 82*d* is arranged on a sector 84*d* and engages, in a manner not shown in detail, a flap 86*d* on the control lever 38*d* when the ballast arm is lifted and turned inwardly. Thus the movement of the ballast arm causes the control lever to be moved to close the motor switch, as is more specifically described in my basic U.S. patent application 225,946 or British patent application 21,331/51.

The same movement of the control lever can be obtained by moving the knob 40*d* to the position shown in FIG. 47, in which, as is more clearly shown in FIG. 55, the lower end of the pivotable lever 88*d* will abut against one end of the slot 90*d* in the control lever through which the lever 88*d* extends. A movement of the control lever in the opposite direction for the purpose of opening the switch by means of an abutment 77*d* is obtained by moving the control lever in the direction of the arrow shown, while it is possible also to allow this movement to be made under manual control either by means of the ballast arm when this is swung outward, as described in my basic U.S. application 225,946 or my British patent application 21,331/51, or by means of the control lever 88*d*. It has been found advantageous not to allow manual stop control, because it involves the risk that the phonograph may be stopped during its sequence of operations where some of the parts are locked together, i.e. especially when the cam track follower on the arm 28*d* is following one of the tracks in the cam disc.

It is therefore preferable to allow the control lever 38*d* to be moved to the switch-opening and decoupling position under influence of the control mechanism only.

It is desirable, however, to allow the mechanism to be started manually.

To this end, the control lever 38*d* is provided with an abutment 39*d*, and furthermore the control lever is not only movable in its longitudinal direction but in another direction, preferably tiltable in a perpendicular direction, such as is more specifically shown in FIG. 55.

This tiltable arrangement serves a double purpose, and the tilting can be effected in two different ways.

As shown in FIG. 55, the top end of the rod 64*d* extends slightly above the tip of the sleeve 60*d*, so that the ballast arm, when allowed to be lowered as the last record in the magazine is being supplied to the turntable, will engage the top of the rod 64*d* to push it downward. The weight of the ballast arm is so adapted that it exerts a pressure on the rod 64*d* that is sufficient to tilt the control lever 38*d* to the position shown in dotted lines in FIG. 55, in which the abutment 39*d* enters the path of an abutment 92*d* on the cam disc 26*d*. This abutment is so located on the cam disc that it will displace the control lever 38*d* to its switch-opening and decoupling position after a relatively short angular rotation of the cam disc only, when started by the action of the trip starter after termination of the playing of the last record. The cam disc is provided with a neighbouring recess to that recess in which the cam track follower can move freely during the playing of a record, and the angle through which the cam disc is allowed to rotate from the playing position until it is stopped by the engagement between the abutments 92*d* and 39*d* is not longer than that during which the tone arm is still free to swing in horizontal plane, while preferably the tone is raised in this stop position.

As mentioned, it is also possible to use the control knob 40*d* for initiating the movement of the control lever 38*d* to the stop and decoupling position. For this purpose, the control lever 38*d* is provided with a pawl-like member 94*d*, for example, a relatively soft leaf spring, which in the normal playing position of the cam disc with the driving roller in the recess 42*d*, is located in a notch or the like 96*d* in the topside of the cam disc. By moving the control knob 40*d* to the position II in FIG. 50, in which the lower end of the lever 88*d abuts the lefthand end of the slot 90***d*, it is possible to give the control lever 38*d* a limited longitudinal displacement in the direction of the arrow shown. This displacement is not sufficient to move the control lever beyond the dead point of the spring 74*d*, but it is sufficient to allow the pawl spring 94*d* to transmit an initial movement to the cam disc to restart to the rotation of the same. If the control knob 40*d* is not further actuated and immediately released again, the changing operation is started so as to supply a new record during the normal sequence of operations of the entire mechanism. If, however, the knob 40*d* is moved to the position III in FIG. 50, the nose 89*d* on the lower end of the lever 88*d* will tilt the control lever in the same manner as the rod 64*d*, and if the knob is kept in that position for a short while, the abutment 92*d* will engage the abutment 39*d* and displace the entire control member to the switch-opening and stop position in the same manner as described herein above in connection with the tilting of the control lever under influence of the weight of the ballast arm.

It is understood that the mechanism described enables a plurality of functions, which in prior record-changing phonographs have required a plurality of members, to be performed by the control lever only. These functions are:

Closing the switch,
Opening the switch,
Bringing the driving roller to its engaging position,
Decoupling the driving roller, Giving the cam disc an initial movement to reject a record, Stop the phonograph after the last record, Stop the phonograph under manual control if desired.

As will be understood from the above description, an important feature of the invention resides in separating the supporting member for the driving roller from the control lever, whereby the possibility of giving the control lever a plurality of functions is obtained. An important feature also resides therein that the control lever has a relatively large movement in connection with operating the switch lever 78*d*. This again is connected with the desirability of interposing the switch spring between the lever 38*d* and the chassis plate, instead of as usual in the switch itself, where it is normally possible to arrange a relatively weak spring only. By arranging the spring in the manner shown and described, it is possible to make it strong enough to overcome the tension of the spring 54*d*.

Another important feature resides therein that the control lever 38*d* in the driving position is free from engagement of the lever 44*d*, because it allows larger tolerances between the parts than in the case where they are interconnected. Also, the function of the springs 74*d* and 54*d* are made independent in contradiction to the previous embodiments where the parts are connected in such a manner that one single spring serves to keep both the control lever 38*d* and the lever 44*d* in the driving position.

The modifications of the invention described herein above comprise various important features of specific advantage. One important feature of the invention resides, broadly speaking, in the utilization of the rotation of the cam disc to preset the trip-starter lever in a desired position. This feature enables a simplification of the entire construction, because the only members necessary in order to perform this function are an abutment on the cam disc and an abutment surface on the trip-starter lever. This feature is also advantageous as it avoids the necessity of moving the tone arm to an exterior position outside the periphery of the record to be played. This again leads to such other simplification of the entire record-changing mechanism as is described in my co-pending applications U.S.A. Patent application 225,946 and British Patent application 21,331/51, in which the main feature, seen in one aspect, resides therein that the tone arm, after termination of the playing of a record, is caused to travel across the underside of the lowermost record in the magazine in engagement with the surface thereof to a position adjacent the edge of said record, in which position the tone arm travel path is interrupted by suitable record size-testing means.

Seen from another aspect, this simplified record-changing construction resides in moving the tone arm across the underside of a record to be played until an abutment on the tone arm passes beyond the edge of said record, whereafter the tone arm is moved slightly inwardly to cause said abutment to engage the end of the record to displace it sidewardly to feed it down to the playing position.

Another important feature of the invention resides in that stop position of the phonograph in which the tone arm is left in its raised position, but is free to be swung by hand so as thereby to utilize the topside of the tone arm as an auxiliary support for the records when placed in the magazine. In addition to the advantage of avoiding the trouble of using both hands for loading the magazine with a stack of new records, this feature also has the advantage that it contributes to the simplification obtainable by the above-named aspects of my prior inventions.

Another important feature of the invention resides in providing a stop position for the phonograph by means of the tone arm movement control member or cam disc.

This feature is important as it ensures that the mechanical parts of the phonograph always assume the same relative position in that stop position, so that when restarting the phonograph, the parts are always started from the same mutual position again.

This feature is also tied up with the use of the top of the tone arm as an auxiliary support for the phonograph record when the magazine is loaded, because the necessity of leaving the tone arm in its raised position to be swung freely by hand requires that the cam track follower must assume a predetermined position relative to the cam tracks, and such position can only be obtained when the stop position is a well-defined position that does not vary.

It will be understood that the invention is not limited to the modifications shown and described, and that various features can be designed otherwise within the scope of the invention.

While I have in my embodiment designed the manual control in the form of a tiltable lever having three operative positions, it will be understood that instead of this, a push button control can be used within the scope of the invention. Such push button control may, for example, comprise three push buttons having operating surfaces to engage the control lever 38*d* to bring it in to any one of the three positions into which it is brought by the positions I, II and III of the tiltable control lever. Such push button system belongs to common knowledge and is widely used, for example, for wave-length range selection in radio sets, so that those skilled in the art would easily be able, from the brief information given herein, to design a suitable push button system to take over the manual control of the movements of the control lever 38*d*. If such push button system is used, for example three push buttons may be adopted, that push button which serves to tilt the control lever is preferably designed to be locked in its depressed position, and to be released in response to restarting the phonograph by depressing the restarter push button or by swinging the ballast arm to pull the control lever to its righthand end position.

The main elements of the record changer as shown in FIGURE 58 is a base plate 10*e*, a rotatable turntable 12*e* driven by a motor (not shown), a centre spindle 14*e* having a recess or platform 16*e* for supporting the records in the magazine, a movable tonearm 18*e* and a stabilizer-or-ballast arm 20*e* adapted to abut the top side of a stack or records. A control knob 22*e* is connected with a gear mechanism in the motor to shift the latter between various velocities. A further control member 24*e* serves to start or stop the phonograph or, if desired, initiate the series of changing movements during playing.

The mechanical parts of the phonograph as shown in FIGURE 59*e* comprise as a main element a cam disc 26*e*, a trip starter generally designated by reference numeral 28*e* serving to start the movements of the tone arm after playing of a record and a control rod 38*e* adapted to be actuated by means of the control member 24*e*.

The cam disc, which in the embodiment shown is in form of a pinion is driven from a driving pinion 32*e* on the spindle of the turntable through a gear wheel 34*e*.

The tone arm is by means of a hollow spindle 36*e* rotatably supported in a bushing 38'*e*. For the purpose of lifting the tone arm there extends down through the hollow spindle 36*e* a pull rod or the like which at its lower end is provided with a nut 42*e* FIGURE 60 that by means of cooperation with a pivotally arranged two-armed lever 44*e* is capable to transmit a downwardly directed pull through the rod 42*e* to the tone arm so that the latter is raised. As clearly shown in FIGURE 60*e* the lever 44*e* is supported on a bridge 46*e* the left hand end of which serves to support the main bearing for the turntable and the right hand end of which is kept in spaced relationship from the base plate by means of a distance piece 48*e*. The lever 44*e* is at one end provided with a roller or wheel 50*e*, which by means of a spring 52*e* interposed between the lever 44*e* and the bridge 46*e* is kept in engagement with the underside of a cam portion of the cam disc serving to control the vertical movements and referred to hereinafter as the vertical curve.

It will appear from the following how the spring and the position of the nut 42e on the pull rod 40e should be adjusted.

At the lower end of the tone arm spindle 36e there is firmly secured a control arm 56e, FIG. 60. This arm comprises two parts of which the top portion 56a (FIG. 59) is firmly secured on the spindle 36e for example as shown by inwardly directed projections gripping in a longitudinal slot in the end of the spindle 36e. The main portion 56e of the arm is provided with a round hole. The part 56e further has an upwardly extending flange 57e and the part 56a is provided with another upwardly extending flange 57a.

The two parts are connected in such a manner that a screw 58e passes through a screw threaded hole in the flange 57a and abuts against the flange 57e. Another screw 60e passes through a hole in the flange 57a and is secured in a screw-threaded hole in the flange 57e. Between the head of the screw 60 and the flange 57a a spring 62e is interposed.

It will be understood that if during the operation of the mechanism the tone arm for some reason should be influenced in a direction of anticlockwise rotation at a stage when the arm 56e is blocked, for instance thereby that a cam track follower arranged on said arm passes through a guiding track in the cam disc, such rotation of the tone arm can be allowed against the action of the spring 62e because this will result only therein that the interior end of the screw 58e is lifted from its engagement against the flange 57e while the spring 62e is compressed.

The arm 56e is as clearly shown in the section in FIGURE 60 at one end provided with a bifurcated portion in which a cam track follower pin 66e is guided which is displaceable in the axial direction against the action of a spring 64e and in the direction perpendicular to the plane of the cam disc.

The cam disc 26e, which is adapted to control the movements of said cam track follower and thereby the movements of the tone arm has a configuration as shown in FIGURE 61 and in more detail in FIGURES 62 and 63.

The cam disc is preferably in the form of a stamped out and pressed blank, which in the simplified embodiment can be given the desired configurations by means of a combined stamping and pressing tool which is a considerable improvement with respect to the costs as all prior known record changing phonographs have had cam discs of cast material in which the cam tracks are provided by means of cutting tools. One reason for the possibility of using such simplified construction of the cam disc is that the invention has reduced the requirement for fine tolerance in the phonograph.

The cam disc 26e is provided with a plurality of cam tracks for controlling the movements of the cam track follower 66e. These cam tracks are as follows: In the playing position the cam track follower 66e can swing freely in an arcuate recess *a* which in the position assumed by the cam disc during the playing of a record has its centre substantially in the axis of the tone arm. In communication with this recess there is provided a neighbouring recess *b* extending to near the edge of the cam disc and the bottom of which is slightly higher than the bottom of the recess *a*. The recess *a* is used to define the height of the cam track follower in the following manner. When the cam track follower is mounted the lower end thereof is allowed to be pressed down under influence of the spring 64e in the recess *a*. Under the lower end of the cam track follower there is then placed a distance piece for example a thin plate of a thickness of ½ mm. In this position a resilient stop washer is clamped on the cam track follower in the position between the lower end of the spring 64e and the top side of the arm 56e. The extent to which the lower end of the cam track follower can be pressed downwardly is defined thereby. Accordingly the cam track follower will not be able to touch the bottom of the track *a* so that the cam track follower can swing freely in said track. The bottom of the track *b* is by means of an inclined surface $b_1$ connected with the recess *a*. The cam track follower can without any substantial resistance slide up along this inclined surface into the recess *b* the bottom of which is so high that the cam track follower is pressed slightly upwardly against the action of the spring 64e. Furthermore the bottom of the recess *b* is provided with ribs $b_2$ that are concentric with the cam disc and between which tracks are formed merging in a cam track *c* that is leading inwardly and thus will control the movement of the cam track follower and thereby the tone arm in an inward direction. The bottom of the track *c* is slightly lower than the bottom of the recess *b* but higher than the bottom of the recess *a*. From the recess *a* an inclined surface $a_1$ leads up to a slightly outwardly directing track $a_2$ which will move the cam track follower and the tone arm in an outward direction. The tracks $a_2$ and *c* merge at a point corresponding to such an angular position of the tone arm that the feeler member and drop control member of the latter is slightly outside the periphery of a record of the smallest size to be played.

It will be understood that irrespectively of the position of the cam track follower within the recess *a* or the tracks $a_2$ or *c* or within the recess *b* assumed initially, a rotation of the cam disc will result in movement of the cam track follower to the merging point B which consequently in the embodiment shown is the initial position for the further operations.

From the merging point B there extends a general control track *d* leading in the outward direction but provided with a plurality of cam sections, of which some are leading temporarily inwardly. These tracks comprise an initial portion $d_1$ leading inwardly and thus causing the tone arm to be swung inwardly. It will be understood that the movement of the tone arm will be such that if the cam disc is started when the cam track follower is in the track *a*, the tone arm will swing outwardly during the passage in the track $a_2$, and when the feeler member on the tone arm is arrived at a position outside the edge of a record of the smallest size to be played, the tone arm will be swung inwardly. If the initial position has been another one, in which the cam track follower for example has been in the exterior side of the recess *b*, the cam track follower will first be guided to the track *c*, whereafter the tone arm by the passage of the cam track *c* follower in said track will be swung inwardly and continue to do so during the passage of the cam track follower in the track section $d_1$. The vertical curve or cam portion 54e of the cam disc has a raising section $R_1$, raising the tone arm to abut the underside of the lowermost record in the magazine before the tone arm has reached the merging point B. If the movement is in the outward direction, the tone arm will be moved into engagement with the lowermost record and if the latter is of the smallest size, the feeler member of the tone arm will snap over the edge of the record when the cam track follower reaches adjacent the merging point B. The bias caused by the spring 52e will serve the purpose of biasing the tone arm feeler against the underside of the record.

As shown in FIGS. 60, 64 and 65, the tone arm feeler comprises an abutment or knob 70e arranged on the top side of the tone arm. Below this knob 70e there is arranged an inclined guiding surface 72e, the top edge 72a of which forms an inclined angle with the longitudinal direction of the tone arm so that the engagement with thin and thick records is secured correctly in the manner already explained in connection with FIGURES 36–43.

If the lowermost record happens to be a record of the smallest size, the knob 70e will engage the edge thereof when the cam track follower has passed through a part of the track portion $d_1$. The further passage of the cam track follower in said track section $d_1$ will be prevented thereby and the cam track follower will be pressed up over an inclined surface $d_2$ provided at the exterior wall of the track section $d_1$, whereafter the cam track follower will be brought into abutment with an edge $d_3$ at the top of said inclined surface, see in more detail FIGURES 61, 62, 63.

Below said edge $d_3$ there is provided at the interior end of the track section $d_1$ a platform. Further the interior end of the track section $d_1$ communicates with the next track section $f_1$ of the main track. The track section $f_1$ is outwardly leading. The platform serves to define an inlet to a branched-off track $e$ for records of the smallest size to be played. The edge $d_3$ continues in an edge section $d_4$ extending into the area of the outwardly leading track section $f_1$ above the bottom thereof. The edge $d_4$ further continues in an edge $d_5$ following the configuration of the track $e$. Also the edge $d_5$ extends into the area of the track section $f_1$, where the edge $d_5$ continues in an edge $d_7$ opposite the edge $d_6$ so as to define between said latter edges $d_6$ and $d_7$ a narrow passage through which a groove or annular recess 65*e* (FIGS. 66 and 67) adjacent the lower end of the cam track follower 66*e* can pass if the cam track follower remains in the bottom of the track sections $d_1$ and $f_1$. Said passage is, however, not broad enough to allow passage of the cam track follower when the latter has passed up on the platform extending outside the edges $d_3$ and $d_4$ at the lower end thereof. The entrance to the track $e$ is at $e_1$ provided with a bottom portion slightly higher than the bottom of the track $e$ but preferably slightly lower than the plane of the platform. This means that if the cam track follower 66*e* due to abutment of the tone arm knob 70*e* against a record of the smallest size has been brought up to rest on the platform, the lower end of the cam track follower will be guided resting on that platform along the edges $d_3$ and $d_5$ and slide down at the entrance $e_1$ to the track $e$ which as previously mentioned is the guiding track for the movement of the tone arm when playing records of the smallest size. These positions are shown and indicated with the letters $a'$, $b'$ and $c'$ in FIGURE 68, confer the section XV—XV in FIGURE 63. The position $b'$ is shown in section in FIGURE 14, confer section XIV—XIV in FIGURE 63.

If as indicated in FIGURE 69 there is no record of the smallest size in the magazine, the lower end of the cam track follower 66*e* will remain in the bottom of the track section $d_1$, and be guided into the track section $f_1$ with the edges $d_6$ and $d_7$ extending into the recess 65*e* in the track follower such as shown in the section in FIGURE 69 in the position $a''$ and $b''$.

The track section $f_1$ guides the track follower so much in an outward direction that the tone arm knob 70*e* in the position of the cam track follower at the point C FIGURE 61 will be outside the edge of a phonograph record of intermediate size. From this point a further track section $h_1$ leads inwardly in precisely the same manner as the track section $d_1$. This track section is provided with an inclined edge $h_2$ FIGURE 62 corresponding to the inclined edge $d_2$ and above said edge there is provided a platform $h_3$ as well as guiding edges $h_3$ and $h_4$ which, together with a further edge $h_5$, define the entrance to a branched-off track $f$ for records of intermediate size. This track $f$ is provided with an inlet $f_1$. The movements and the mode of operation for the passage of the track follower through the section mentioned are precisely the same as described hereinabove, i.e. provided that there is no record of intermediate size the tone arm will be allowed to oscillate slightly forth and back during the passage of the track follower in the bottom of the sections $f_1$ and $h_1$ to be guided to a further section $g_1$. If the abutment 70*e* abuts against the edge of a record of intermediate size, the cam track follower will be guided up on the platform $h_3$ and thereby by means of the "out-of-level-crossing" into the branched-off track $f$.

The entrance to the exterior cam track $g$ for records of the largest size is unobstructed at the end of the track section $g_1$.

The initial part $e_2$ of the track $e$ is concentric with the cam disc and continues substantially between the sections marked 3 and 4 into an inwardly leading section $e_3$. In other words when the cam track follower has been guided in the track $e$ it will during a short time interval remain in the same angular position i.e. the abutment 70*e* will remain into engagement with the edge of the record and when the cam track follower thereafter enters the section $e_3$ the tone arm will be swung slightly inwardly so much as to enable that the abutment 70*e* imparts a sidewardly directed push to the lowermost record in the magazine such as described in connection with the modification described hereinabove, for example, as shown in FIGURES 37–46.

The track $e$ has an outwardly leading section $e_4$ following section $e_3$ adapted to move the tone arm slightly in an outward direction to secure that the dropping record will not hit the tone arm when fed down. By passage in the subsequent track section $e_5$ the tone arm remains in the same angular position outside the periphery of the dropping record and by passage of the track follower in the section $e_6$ the tone arm is swung inwardly to the correct angular position for setting the stylus member on the surface of the record which takes place in the track section $e_7$ after which follows a section $e_8$ of slightly larger width than the other sections so that the cam track follower by passage in said latter section is capable to move with so much side play that the stylus is capable to find its way down into the initial groove of the record. The length of the track section $e_8$ corresponds substantially to one revolution of the turntable.

The other cam tracks have corresponding sections that are referred to with the letters $f$ and $g$ with corresponding indices as used for the track $e$.

The vertical curve, following the raising section $k_1$ is provided with a section $k_2$, in which the tone arm is kept raised biased against the underside of the record whereafter follows a section $k_3$ serving to lower the tone arm slightly at that time when the record has been fed down to the turntable. Thereafter the vertical curve has a neutral section $k_4$ keeping the tone arm in waiting position during a suitable time interval and when the tone arm is guided inwardly again the lowering will be initiated in the section $k_5$, whereafter the tone arm remains lowered in the section $k_6$. After playing the tone arm is immediately raised in section $k_7$ as soon as the cam disc is started and the tone arm is kept raised in the section $k_8$ to an intermediate position until it is raised up to abut the underside of the record so as already described.

The movements mentioned hereinabove are clearly illustrated in the movement diaphragm of FIGURE 61*a*.

The edges $d_3$, $d_4$, $d_5$, $h_1$, $h_4$ and $h_5$, which in the "out-of-level-crossings" extend along the exterior side of the tracks $d_1$, $e$ and $h_1$, $f$ are provided by means of sheet metal pieces 72*e*, 74*e* and 76*e*, secured on the top side of the cam disc. Besides serving as guiding surfaces these pieces also are serving the purpose to reinforce the edges of the cam tracks at those places thereof where the drop of records is controlled. The arrangement of these pieces are also necessitated as a result of using a stamped-out and pressed-up blank for the cam disc as it is not possible by pressing the cam disc only to obtain sufficient sharp edges. Seen from a production angle it is, however, more advantageous to make the cam disc of an up-pressed blank and then secure the top pieces for example by riveting than making a cast cam disc in which the tracks are made later by cutting tools as was done heretofore in the prior art. The small platforms $d_3$ and $h_3$ are of thin material for example 1/10 mm. bronze that extend under the piece 72*e* and are secured together therewith.

As it will appear from the above specification an important feature of the modification here described is to prevent the movement of the feeling member by abutment against the edge of a phonograph record in order to select the further travel path of the tone arm in response to the size of the record tested.

As to this inventive concept it does not matter whether the feeling member is combined with the drop control member or combined with the tone arm.

It will therefore be understood that the invention is not limited to guiding the tone arm in the outward direction into engagement with the underside of the record so as to effectuate an inwardly directed movement in the edge orbit thereof.

It may just as well be possible to start the movement of the tone arm from its exterior position in a continuous path so that the resistance against the movement caused by abutment between the abutment 70*e* and the edge of a record serves to select the adequate cam track with same manner as described in the reference to FIGURES 12–23.

Such a further modification is indicated in FIGURE 73 in which the cam disc from the recess *a* has an outwardly leading cam section $a_3$ that continues in the inwardly leading cam section $c_2$ corresponding to such an angular position of the tone arm that the abutment 70*e* of the latter is outside the periphery of the record of the largest size. The exterior track $g'$ which corresponds to the largest records has at its entrance a portion $g'_1$ that will normally prevent the cam track follower from entering the track $g'$ unless an abutment between the knob 70*e* and the edge of a large record will be capable to raise the track follower over the section $g'_1$ into the track $g'$. If there is no record of large size, the cam track follower will be guided inwardly in the section $c_2$, until it abuts the edge of a record of medium size if such size is found in the stack at the bottom in which event the cam track follower will be lifted over a section $f'_1$ at the entrance of the second track $f'$ corresponding to records of intermediate size. If there are no records of this size, the track follower will be guided directly into the track $e'$ corresponding to records of the smallest size.

If it is desired to use this sequence of movements in connection with playing records of different sizes mixed in arbitrary sequence, it is necessary to assure that the horizontal movement of the tone arm is rather exactly defined with the abutment 70*e* in the plane of the lowermost record in the stack. If it is desired to play very thin records it will therefore not be possible to utilize the full advantage of the inclined guiding surface below the abutment 70*e* in the manner described with reference to FIGURES 37–43.

If it is desired to use these advantages of the inclined guiding surface, it is possible by the modification of FIGURE 74 to load the magazine with the largest records in the bottom and the smallest records in the top of the stack, because in such event it will be possible to guide the top edge 72*a* of the inclined guiding surface above the underside of the lowermost record in the stack when the tone arm is moved in the inward direction.

In FIGURES 74 and 75 is shown a modification of the "out of-level crossing-system" in which the necessity of providing an annular recess near the lower end of the cam track follower is avoided. It has been found that under certain circumstances this will weaken the cam track follower so much that an excessive pressure necessary in the stage of dropping the records may damage the track follower. Also the described embodiment requires a certain accuracy which can be avoided by the following embodiments.

The general construction of the cam disc is shown FIGURE 74 and the track sections are exactly the same as in the embodiment of FIGURE 61, and therefore only the constructional features that are different compared with the FIGURE 61 will be described herein.

With reference to the first inwardly leading track section $d_1$ the exterior wall thereof is as in the case of FIGURE 61 at the interior end provided with an inclined surface $d_2$. When the tone arm abutment 70*e* engages the record of smallest size, the cam track follower 66*e* will be pressed up along this inclined surface as indicated in FIGURE 75. At the top of this surface the cam track follower will at its lower end abut against an edge $d_3$ that is defined by a part of the front edge of a plate 72*e* secured on the top side of the cam disc. Below this plate 72*e* there is arranged about a pin 73*e* a thin plate 78*e* having a platform $d_4$ extending outside the edge $d_3$. This platform $d_4$ has such an extension that it will wholly or partly close the entrance to the outwardly directed continuation $f_1$ of the track portion $d_1$. Furthermore the front edge of the platform $d_4$ extends substantially in such a manner in continuation of the track section $d_1$ that it will be capable to guide the track follower into the branched-off track *e* for playing records of the smallest size.

The lower end of the track follower 66*e* is provided with a recess 67*e* of such a height that the lower end 67*a* of the cam track follower, which has a reduced diameter, will be capable to be guided in abutment with the front edge of the platform $d_4$.

The operation of this embodiment is such that if the cam track follower is forced up along the inclined surface $d_2$ the portion of the cam track follower having the largest diameter will initially be brought into abutment with the edge $d_3$. By the further rotation of the cam disc the control of the movements will be taken over by the front edge of the platform $d_4$ by abutting against the lower reduced diameter portion 67*a* of the cam track follower. The edge of the platform $d_4$ as well as the initial portion of the track section *e* is concentric with respect to the cam disc and so selected with respect to its distance from the centre that the cam track follower in the position shown in FIGURE 75 in dotted lines will correspond to an angular position of the tone arm with the abutment against the edge of a record of the smallest size in which position the tone arm will remain.

The cam track follower will be guided thereby into the branched off track *e* where the front edge 74*a* of a reinforcement plate 74*e* may be provided of a configuration capable to engage into the annular recess 66*a* on the lower end of the cam track follower 66*e*.

If desired this front edge 74*a* can at the entrance to the track portion *e* have an inclined guiding surface capable to grip the recess 66*a* already when the cam track follower enters the track *e* so as to guide it safely down in said track and keep it down therein safely.

As mentioned hereinabove the thin plate 78*e* is swingingly arranged on the pin 73*e*. This swinging takes place against the action of a spring 80*e*, which at one end is bent to engage a notch 79' adjacent the rear end of the plate 78*e* and the other end of which is secured at a suitable place below the cam disc. The spring 80*e* will keep the plate 78*e* in the position shown in full lines in FIGURE 74, e.g. thereby that a notch 79*a* with its bottom engages one of the rivets or screws that serve to keep the plate 72*e* in position.

If there is no record of the smallest size in the bottom of the stack of records to prevent the movement of the cam track follower in the track section $d_1$, the track follower will be guided inwardly and thereafter out in the track section $f_1$. At the entrance thereof the track follower will hit the front edge of the platform $d_4$ with the result that it will swing the entire plate 78 to the position shown in dash and dot lines against the action of the spring 80*e* and thereby open the entrance to the track section $f_1$.

For the purpose of testing and controlling the movements of the tone arm by records of medium size the track section $f_1$ continues in an inwardly leading section $h_1$ the exterior side of which in the same manner as in the case of the track section $d_1$ has an inclined surface $h_2$, the top of which is limited by an edge $h_3$ of the plate 72e. Below this edge there is also here a platform $h_4$ defined by a projection part of the plate 78e. The mode of operation here corresponds to the operation already described and when the track follower is guided into the branched-off track *f* for records of medium sizes the track follower is gripped also in this track by a projecting edge of a reinforcement plate 76e which engages in the recess 66a. Preferably the plate 76e also is provided with an extending edge on the other side that extends into the exterior cam track *g* in order to retain the cam track follower in the bottom thereof during the passage therein.

The other track sections are of configurations corresponding to the already described embodiment and will therefore not be repeated here.

The tone arm bearing arrangement is shown specifically in FIGURES 76–78 and comprises in broad terms a spring for adjusting the needle pressure, said spring being at one end connected with a spindle, which in its turn is so firmly connected with the tone arm that it can only be forcibly rotated.

On the top of the vertical hollow tone arm spindle 38e there is secured a bracket comprising a substantially horizontal platform 112e having side flanges 114e and 116e. In the side flanges are provided holes in alignment for the passage of a spindle 118e. The holes are simply drilled in a gauge and the alignment thereafter provided by means of reamer. Around the spindle 118e there is arranged a helical spring having a portion 120e which is wound tightly on the spindle so as to clamp thereon and another portion 122e surrounding the spindle loosely.

The end 124e of the spring is extended and at its end secured to one of the flanges.

It will be appreciated that with the direction of winding of the spring, the spring will be tensioned when the spindle 118e is turned in direction of the arrow shown. The tone arm is carried by the spindle 118e in the manner shown in FIGURES 77 and 78.

The tone arm 20e has at its rear end a cup-shaped head which is open downwardly. In this head there are moulded two oppositely arranged brackets in which in the moulding process are provided transverse slots 134e and 136e in alignment, said slots being adapted to receive the ends of the spindle 118e which extend beyond the flanges 114e and 116e.

One end of the spindle is provided with a notch 118a for a screw driver and in order to allow passage thereof through the wall of the head 128e a hole is provided therein.

The ends of the spindle 118e are clamped into the recesses 134e and 136e by means of two steel spring plates, one of which only referred to as 156e is shown. The spring plate 156e is tightened on the top of the bracket 132e to press the spindle down into the recess by means of a screw 158e.

In the moulding process there is further provided in the head 128e two other brackets 140e and 150e adapted to carry a bridge 152e to which the pull rod 40e adapted to transmit the power raising the tone arm is connected. The rear end of the bridge 152e as seen in the direction of the tone arm is kept in engagement with the bracket 150e by means of a spring under the head of a screw 154e. This screw head also serves the purpose of forming a stop that limits the raising of the tone arm by abutting the platform 122e, as can be most clearly seen in FIGURE 78 and thereby define that horizontal plane to which the tone arm is raised when moving inwardly to engage the edge of the records.

From FIGURE 78 it will also be understood that the spring 122e will counteract the force transmitted by the weight of the tone arm, which acts counterclockwise on the spindle 118e. By turning the spindle 118e counterclockwise the tension of the spring can be increased so as to thereby adjust the needle pressure.

It will be understood that the requirement for a satisfactory operation of the tone arm bearing arrangement hereinabove described is that the clamping of the spindle 118e in the recesses 134e and 136e is strong enough to prevent the spring fron turning the spindle, even if it is in its most tightened condition. In other words the spindle should be clamped so tightly that it can be turned only by means of a screw driver in order to adjust the tension of the spring and thereby the needle pressure.

It will be understood that this type of an arm bearing arrangement is only illustrated as an example and that various modifications thereof will be possible within the scope of the invention.

A convenient design of a complete record changing phonograph incorporating the features described in connection with the modifications of FIGURES 58–78 is shown in FIGURES 79 through 89 of which FIGURES 79*a* and 79*b* are exploded views showing the entire parts of the record changing phonograph, while FIGURE 80 is a perspective view of a part of the phonograph as seen from the bottom. FIGURES 81 through 89 are showing the parts of the phonograph in a plurality of plan views and vertical sections in different positions to illustrate the operation.

With reference to FIGURES 79*a* and 79*b* the record changer comprises a base plate assembly 10e, a pick up arm assembly 24e, a turntable and centre spindle assembly 12e, a cam disc assembly 26e, a trip-starter assembly 104e, a control assembly 38e and a ballast arm assembly 22e.

The chassis plate assembly comprises the chassis 10e of rectangular configuration and having a plurality of apertures and holes for receiving the movable parts.

The chassis assembly also comprises a bridge 50e having a body portion and at one end an upwardly extending rim 50a with a pair of flanges 50b, which extend in the plane of the body portion of the bridge for securing that end of the bridge 50e that has a depressed bowl-formed portion 50c in alignment with a hole 10c in the chassis plate adapted to receive the turntable spindle.

At the other end of the bridge 50e a distance piece 51e is provided to support the bridge under the chassis plate in such a position that a hole 10'e near the other end of the bridge is in alignment with the centre of the pick-up arm assembly when the latter is mounted in a hole 10'e in the chassis plate 10e.

The turntable assembly comprises the centre spindle 18e for supporting the phonograph records above the turntable and to be used alternatively with an adapter spindle 18a for use when playing 45 r.p.m. records with large center hole. Furthermore the turntable assembly comprises the turntable 12e, a supporting main bearing 16e secured below the turntable by means of three screws and having moulded thereon the main idler gear wheel 34 and the trip starter control projection or nose.

The bearing 16e has a centre bore for receiving a centre bearing pin 16a the top of which is hollow and adapted to receive the lower end of the interchangeable spindles 18e and 18a. A ball bearing structure 16b comprising a plurality of rollers, a ball cage and washers surrounds the lower end of the spindle pin 16a and rests in the bowl-formed depression 50c in the bridge 50e. The entire structure is kept in position by a nut and washer secured on a screw threaded lower end of the spindle 16a that extends through a hole in the bottom of the bowl 50c. When assembled the top of the pin 16a extends above the surface of the turntable; the turntable is preferably prevented from being removed by a horse shoe clamping washer 16c clamped on the top of the pin 16a.

The motor assembly that is not shown in FIGURES 79a and 79*b* and is adapted to be mounted with the control knob for selecting the speed of the turntable extending up through a hole 104 at the rear left hand corner of the base plate 10e. The motor provides a drive with a resilient rubber belt or the like engaging in an annular recess on the exterior side of the flange of the turntable 12 as described with reference to FIGURES 11 and 11a.

The spindle 18e is preferably of moulded thermoplastic material with an interior reinforcement as will be more fully explained hereinafter.

The pick-up assembly 24e comprises the pick-up arm generally designated by reference numeral 24e being of slightly curved configuration and having at its rear end an annular hollow housing 128e.

For further details of the pick-up bearing reference may be made to FIGURES 76–78.

In broad terms the pick-up bearing assembly comprises a hollow centre spindle 36e having on its top secured thereto a bearing bridge 112e. This structure is by means of a plurality of small parts secured in the interior of the annular casing portion 128e. 118e is a horizontal pivot pin and spring structure about which the vertical movement of the pick-up arm takes place and that also serves to balance the pick-up arm to regulate the needle pressure on the record. The pick-up raising pull rod 40e extends through the interior of the hollow spindle 36e. The lower end of the pin 40e extends as previously mentioned through a hole in the bridge 50e and furthermore through a hole in the pick-up raiser lever 30e that belongs to the cam disc assembly. At the lower end the pin 40e is provided with an adjustable nut and counter-nut structure 40e. The pick-up head 24b is hollow and receives the pick-up cartridge that may be of any type obtainable in the open market. A suitable pick-up cartridge is that turn-over type known under the trademark "Ronette" but any other good cartridge can be used.

The pick-up spindle 36e is rotably supported in a bearing bushing 36c secured on the base plate 10e by means of screws. A suitable ball bearing structure 36e is included between the top of the bushing 36c and the bottom of the bridge 112e. Another ball bearing structure 36f surrounds the spindle 36e below the bushing 36c. The assembly is made by mounting these parts together and securing the two ball bearings with their ball cages in engagement with the top and bottom end of the bushing respectively by means of a nut 36g tightened against the lower ball bearing washer on a screw threaded lower portion of the spindle 36e.

The pick-up arm assembly also includes a pair of cam follower arms 56e and 57e that by means of washers are secured on the lower end of the spindle 36e.

For further details concerning this part of the pick-up arm assembly reference is made to FIGURE 50. The cam follower assembly comprises a cam follower pin 66e adapted to move in the various cam tracks of the cam disc as more fully explained in the following.

The cam disc assembly comprises as its main part the cam disc 26 for details of which reference is made to the foregoing figures. In broad terms the cam disc is in the form of a large pinion stamped out of a blanket of suitable material, such as steel. By pressing there is provided one curve section or cam portion *k* for controlling the vertical movement of the pick-up arm and another curve section comprising a plurality of cam tracks for controlling the horizontal movement of the pick-up arm. The cam disc is supported on the bridge 50e with a pin extending through a hole and secured by a nut and washer. To the cam disc assembly also belongs the pick-up arm raising control lever 30e. This arm is pivotally secured below the bridge 50e and has at one end a roller 30a extending through an opening in the bridge so as to cooperate with the cam portion *k*.

The cam disc assembly further comprises an intermediate gear wheel 32e rotatably mounted on a pin 32a secured below a gear wheel lever 44e having its one end supported in a bracket 46e secured to and extending below the base 10e and its other end secured by a slot 50a gripping in a recess of a pin secured to and extending below the base plate 10e. A spring 54e is interposed between the gear lever 44e and the flange 50b of the bridge and serves to keep the intermediate gear wheel 32e in driving position between the main driving gear wheel 34e and the cam disc 26e with a bias in the direction of the cam disc.

The trip starter assembly 28e comprises two trip starter levers 102e, 104e and 106e. These are mounted on a common pin 100e secured to and extending below the base plate 10e. The lever 102e, 104e is the upper lever and abuts against a pair of ribs 107e, 109e pressed into the chassis plate at substantially the same distance on either side of the pin 100e so as to form the only surface against which the lever 102e, 104e bears. The lever 106e is supporter on the same pin 100e by a key-hole-like opening 112e and a spring 114e serves to keep the two levers 102e/104e and 106e in such a mutual position in which a recess in the pin 100e is in the narrow end of the key-hole 112e which means with the front end of the lever 106e in its most projecting position enabling it to be brought into the path of the rotating nose on the turntable bushing. A pair of ribs 116e, 118e serves as abutment between the lever 106 and the lever 102e, 104e and thereby that the latter ribs are arranged closer to the pin 100e a two-way frictional connection is established so that the friction between the lever 106e and the lever 102e, 104e is less than the friction between the latter lever and the base with the result that the lever 106e can be pushed back by means of the rotating nose without transmitting its movement to the lever 102e, 104e while on the other hand a counterclockwise turning of the lever 102e, 104e by engagement of its right hand end with the cam track follower arm 82e of the pick-up assembly also will result in counterclockwise turning of the lever 106e to approach its left hand end tip to the rotating nose.

For further details of this part of the construction reference is made to FIGURES 56 and 57.

The control assembly comprises a control lever 38e, a switch 81e for the phonograph motor and a control member 88e for controlling the stop, start and rejection.

The switch 81e is secured in an opening 81a in the base plate. The switch has a switch operating pin 78e adapted to cooperate with a pair of abutments 77a and 77b on the control rod 38e.

At the right hand end the rod 38e has a slot 68e by means of which the rod is supported at that end in a horizontal slot 58a in an extension of bushing 58e for the vertical spindle 62e of the ballast arm 22e. This bushing is secured on the base plate with said extension extending below the same through the hole 10d. The bushing is also provided with a slot 88a in alignment with a slot 88b in the base plate for the passage of the manually operated control lever 88e that is pivotally arranged on a small pin 88d.

For details with respect to this part of the structure reference is made to FIGURE 50.

A stop control rod 64e is slidably movable in the vertical direction which extends within in a slot in the interior of the bushing 58e and rests with a substantially horizontally bent foot portion 66e on the top of the rear end of the control rod 38e extending towards that edge which is remote from the switch abutments 77a and 77b.

Extending parallel with the slot 68e there is another slot 90e through which the lower end of the lever 88e extends. An upwardly extending lip 90a is also provided to cooperate with the lever 88e as more clearly shown in the modification of FIGURES 47–57.

On the lower end of the ballast arm spindle 62e is provided a disc 82e having a pair of abutments 82a and 82b adapted to cooperate with a downwardly extending lip 90b on the front edge of the control rod 38e. The disc 82e further has a circular edge portion. A rod 95e rigidly secured on the bottom of the base plate is surrounded by a spring 95a, which at its lower end has an abutment 95b resting on the top of the disc 82e so as to thereby bias the ballast arm assembly with a downwardly directed force.

It will be appreciated that the general lay out and design of the record changing phonograph described briefly with reference to the exploded view of FIGURES 79a and b comprises details that are described in more detail in preceding modifications, especially in the modification shown in FIGURES 47–57.

The cam disc structure used in this phonograph is assumed to be the modification shown in FIGURES 74 and 75, and therefore, in the plan view of FIGURE 81 and in the following plan views the various cam sections are referred to by the same reference numerals as in FIGURES 74 and 75.

FIGURE 81 and the section of FIGURE 82 serves to illustrate the operation of the trip starter mechanism that automatically serves to start the cam disc after playing of a record. Therefore in FIGURE 81 the trip starter mechanism is shown in heavy lines, while the other parts of the record changer in order to facilitate the survey of the operation of the trip starter mechanism is shown in thin lines.

As already explained hereinabove the cam track follower 66e moves freely in the cam track *a* during playing of the record. When the stylus member of the tone arm pick-up comes near the outlet groove of the record during the playing thereof, the abutment on the arm 56e will abut against the left hand end of the trip starter lever arm 102e. Since as the connection between this trip starter lever arm is connected with the trip starter lever 106e in such a manner that the latter will participate in the movement of the lever 102e, 104e when influenced by the tone arm movement, the entire trip start lever assembly will be swung counterclockwise to be brought into engagement with the rotating nose on the turntable spindle such as explained in more detail in connection with FIGURES 47–57.

As long as the stylus member is passing through a sound track of normal pitch the rotating nose will be capable to reject the trip starter lever arm 106e against the friction of the connecting link between the two arms. When, however, the stylus member enters the outlet groove of the record having an increased pitch, the counterclockwise movement of the entire trip starter lever assembly will be sufficient to enable that the rotating nose on the turntable spindle will grip the left hand front end of the lever 106e. This will result in pushing this lever backwardly relatively to the lever 102e/104e to the position shown in dotted lines in FIGURE 81. As a result of this push the abutment 118e on the right hand end of the lever 108e which in this position is opposite the abutment 120e on the cam disc will hit the latter abutment and thereby rotate the cam disc initially to the position shown in dotted lines in FIGURE 81 which will bring the gear wheel 32e which during the playing has been running idle into engagement with the gear wheel 34e so as to thereby initiate a rotation of the cam disc in the position of the gear wheel also shown in dotted lines in FIGURE 81.

The cam disc will thereby effectuate an entire revolution until the gear wheel 34e again falls in the recess in the periphery of the cam disc, which again will allow the main driving gear wheel 32e to run idle.

During the last part of the rotation of the cam disc, until the parts again are in the position shown in full lines in FIGURE 81, the abutment on the cam disc will engage an inclined surface on the right hand end of the trip starter lever 106e just in front of that part which forms the starting abutment of said lever in order to thereby adjust the initial mutual position of the entire trip starter lever assembly as well as the mutual position of the two trip starter levers as explained in detail in connection with the modification of FIGURES 47–57.

The cam disc may also be started for the purpose of rejecting a record by operating the manual control lever 88e, which will impart a longitudinal displacement to the control rod 38e.

This operation and the following operations of the control lever 38e will be described only in short terms, because the entire construction of this part of the phonograph and the mode of operation thereof is specifically disclosed in the modification FIGURES 47–57.

In FIGURE 83 the control rod 38e and the driving gear wheel 34e are shown in heavy lines, while the other parts of the phonograph, which do not belong to the function of these parts are shown in thin lines. The position shown in full lines corresponds to the playing position of the various parts in which the gear wheel 34e is disengaged from the driving wheel 32e by dropping into the recess in the periphery of the cam disc so that the driving wheel 32e runs idle. If it is desired to reject a record, the small knob 40e on the top of the manual control lever 88e is pushed towards the right and immediately relieved again. This will bring an abutment or pawl member such as for example a thin leaf spring 94e secured to the underside of the rod 38e to engage an abutment 96e on the top of the cam disc so as to thereby impart an initial movement to the cam disc to the position shown in dotted lines in FIGURE 83. This will in the same manner as when the cam disc is started by means of the trip starter lever mechanism result therein that the gear wheel 34e is brought out of the recess into engagement with the driving wheel 32e whereby the cam disc rotates an entire revolution and the controls of the various parts is effectuated as described.

In the following the various operations and sequences thereof will be described with reference to FIGURES 84 through 89.

FIGURE 84 is a plan view of the various parts of the phonograph with the cam track follower 66e at the point B of the cam disc just at the entrance to the cam track portion $d_1$. As clearly seen in this plan view this corresponds to the position of the tone arm in which the abutment 70e is just outside the periphery of a record of the smallest size. The tone arm is thereby under influence of the spring 52e between the raising lever 30e and the bridge so that the tone arm is raised to the position shown in FIGURE 85, where the top edge of the inclined guiding surface 72e is above the underside of the lowermost record in the stack supported on the centre spindle.

When the cam track follower thereafter moves in the track section $d_1$, the tone arm will move inwardly. This will as explained with reference to FIGURES 58–75 result therein that initially the inclined guiding surface 72e will hit the lower edge of the record with the result that the tone arm against the action of the biasing spring will be guided downwardly into such a horizontal plane in which a safe engagement between the knob 70e and the edge of the lowermost record is secured. As also seen clearly in FIGURE 87, this will, because the lowermost record in this figure is a record of the smallest size, bring the underside of the record entirely up on the platform defined above the edge 72a over the inclined surface 72e. This engagement will take place before the cam track follower has passed entirely through the cam track section *d*. This will therefore result therein that the tone-arm and accordingly the arm supporting the cam track follower will be prevented from any further inwardly directed movement, so that the cam track follower will press against the exterior side of the track section $d_1$ with the result that the cam track follower will be guided up over the inclined surface on the exterior side thereof to rest on the platform $d_3$ which will result therein that the cam track follower will be guided in the branched-off track $e_2$ as previously explained with reference to FIGURES 61 et sequitur. This position of the cam track follower is clearly illustrated in FIGURE 88 in combination with the abutment between the knob $70e$ and the edge of the lowermost record.

A further modification of the record size feeler system in the inclined guiding surface as shown and described with reference to FIGURES 33 to 37 is shown in FIGURE 90. In FIGURE 90, the inclined guiding surface in front of the record engaging knob 70*f* is divided into two portions 72*f* and $72f_2$ separated by a substantially horizontal portion $72f_1$.

The reason for this modification is that it has been experienced that in certain countries the diameter of records supposed to be of a standard size may vary within certain limits up to ½″ diameter. If, as illustrated schematically in FIGURE 91 the inclined guiding surface of FIGURE 37 is used it might happen that the bias of the tone arm will bring the inclined guiding surface up to such a horizontal level that the knob 70*f* will snap up over the edge of the next lowermost record in the stack with the result that the knob will engage that record. Since the next lowermost record, however, is prevented from being sidewardly displaced this will result in a clamping of the tone arm and interrupting of the operation of the record changer.

By, however, providing the two inclined surfaces separated by a horizontal or substantially horizontal portion $72f_1$ the operation will even under such disadvantageous circumstances be satisfactory as clearly illustrated in the schematic end view of FIGURE 92.

It has further been found convenient in order to facilitate handling of very thin records to provide a slightly pressed-up rib in addition to the knob 70*f* as illustrated in FIGURE 93. This will result therein that when the tone arm is handling very thin records in a manner already described with reference to FIGURES 36 and 37 the thin records will run up on the rib so as to utilize only a very reduced part of the height of the engaging knob 70*f*.

As will be appreciated the modifications of my record changer according to FIGURES 58–89 comprise the use of the so-called solid spindle. It has previously been the practice to make such a spindle of steel. This requires, however, a considerable accuracy and a lot of operations. The surface of the spindle must be smooth and the location of the platform as well as the bottom surface on which the spindle rests in the bushing of the turntable is rather critical. Therefore in broad terms I provide a spindle of the solid type in which the exterior surfaces are defined by a moulded plastic material and the mechanical rigidities are obtained by an interior reinforcement.

The manner in which this spindle is designed appears from FIGURES 94 and 95.

The core member or interior reinforcement for the spindle according to the invention comprises a lower portion 10*f* of cylindrical configuration and made of a suitable hard material such as steel. At a suitable place there is provided an annular recess or the like 12*f* for the purpose of keeping the exterior plastic material in position. In the top end of the portion 10*f* there is provided a bore in which the lower end of a rod 14*f* of reduced diameter fits tightly. The rod 14*f* has a portion 16*f*, which is made flat for example by pressing and simultaneously a part of the portion 16*f* is bent so as to form a sloping angle with the longitudinal section of the spindle. Above the flat portion 16*f* there extends a top portion of cylindrical configuration in parallel relationship with the lower portion 14*f*. The flat pressed portion 16*f* is pressed to such an extent that the width thereof substantially corresponds to the thickness of the lower portion 10*f*. With these explanations the construction of the interior reinforcement member will clearly appear from FIGURE 94. The bore in the lower member 10*f* and the diameter of the rod 14*f* are so adapted that the latter rod can be kept in position by friction.

As to the dimensions the length of the lower rod may by way of example be 2″. If by way of example the diameter of the final spindle is ¼″, the width of the flattened portion 16*f* of the rod 14*f* must be approximately 3/16″. It will be understood that the rod prepared in the manner described herein does not require any accuracy. The hole in the lower rod can be drilled in an automatic machine, and the flattening and deformation to provide the inclined part 16*f* can be made in one operation in a press.

The sub-assembly comprising the core is placed in a form the interior space of which defines a hollow space corresponding precisely to the desired exterior configuration. The plastic material is extruded within the form, whereafter the spindle is finished in one operation without the necessity of any subsequent grinding. As a suitable material linear polyamides may be mentioned, and especially such material, which is known in the trade under the name "nylon" has been found suitable.

The spindle is thereby as shown in FIGURE 95. At the lower end of the spindle the layer of thermoplastic material 12*f′* forms a substantially cylindrical rod 18*f*, the thickness of which in the section shown in FIGURE 95 decreases to the point 20*f*, where the thickness is less than the diameter of the portion 18*f*. The portion 18*f* terminates at the upper end in a platform 22*f* adapted to support the records resting on the spindle and centered by means of the offset top portion 24*f*, which is formed as an upper cylindrical portion of the thermoplastic material. The portion 24*f* terminates at its lower end in a surface 26*f* substantially parallel with the platform 22*f* and being spaced axially above the platform 22*f* a distance less than the thickness of two records but larger than the thickness of one record so as to allow the lowermost record in the stack supported on the platform to be sidewardly displaced so as to relieve it from the platform.

In a mould is furthermore provided a notch so that the exterior plastic coating which at the lower end terminates to form a cylindrical shoulder is provided with a projection 28*f* adapted to fit in a notch in the centre bushing of the turntable, in which the lower end 10*f* of the spindle is received when placed into the operating position in the record changer. The correct position of the spindle relatively to the other parts of the record changer is ensured thereby.

It will be appreciated that the design of the solid spindle described hereinabove comprises a new technique in the design of such spindles and is a contribution to simplicity, cheap production and a uniform product, because the interior reinforcement does not require any accuracy at all. The moulding of the exterior plastic coating is a simple moulding which only requires that the core is placed into position in the mould. The moulded spindle is fully finished in one operation and does not require any subsequent mechanical operations at all.

It will be appreciated that the spindle can be modified in various respects within the scope of the invention, especially with respect to the embodiment of the interior reinforcement. It is essential only that the interior core has the necessary mechanical strength while the exterior moulded surface provides the desired configuration of the spindle in one operation.

It will be appreciated that the invention with respect to the cam disc is not limited to the modifications described hereinbefore.

Thus in FIGURES 96 and 97 further modifications are shown.

The inwardly directed cam track section is referred to by reference numeral 92*g* and the outwardly leading cam track section by 96*g* and the entrance to the branched-off cam track is referred to by 98*a*. The walls of the cam tracks are substantially perpendicular to the plane of the cam disc. The exterior wall of the track section 92*g* is provided with an inclined surface portion 112*g* near the inlet end. As long as the cam track follower 66*e* moves within the track section 92*g* it will remain in the bottom until it arrives at the inclined wall section 112*g* whereas in the case of the modification of FIGURES 58–89, the abutment 70*e* on the top of the tone arm engages the edge of the lowermost record in the stack. This will mean that the cam track follower 66*e* will be sidewardly biased and therefore against the action of its spring slide up along the inclined surface 112*g* to the platform 114*g* from which it will be guided over the lip 110*g* extending from a swingingly arranged plate member 100*g* that swings about a pin 102*g* and is guided on the surface of the cam disc by means of a pin and slot connection 106*g*, 108*g*.

The plate further has an uppressed front wall portion 116*g* that serves to guide the cam track follower as shown in the various positions in dotted line into the branched-off cam track section 98*a* the entrance to which is formed by an inclined portion 118*g*.

One of the embodiments of FIGURES 58–89 utilizes the advantages of an oscillating movement of the record size feeler system and is capable only to handle a limited number of sizes of records as the subsequent guiding of the tone arm after testing of the record has to take place in a predetermined path due to the fact that the tone arm is used for pushing the record sidewardly to relieve it from the spindle.

It is very well possible, however, to combine the advantages of the modification of FIGURES 12–23 with the advantages of the oscillating movement of a record size feeler system such as will appear from the following description of the modification shown in FIGURES 98–107.

This modification is supposed to use a record drop control system independent of the tone arm, for example in the form of a so-called center drop control which term comprises a spindle having a mechanism built into the same comprising a primary support for the stack of records and a secondary support temporarily that is capable to support the next lowermost record and the stack resting thereon, when the lowermost record is relieved by the operation of the primary support that might either be supporting members that can be retracted in the center spindle or otherwise members that can relieve the lowermost record in the stack.

Such center spindles are normally operated by a rod extending down through the lower end of the spindle. Such center spindles are known in the field in a plurality of various embodiments which belong to common knowledge so that those skilled in the art will easily be able to provide an adequate spindle for use in connection with the following modification to be described.

The only part of this modification that will be described is the drop control system shown in FIGURES 98 and 99.

Below the bridge 50*g* there is provided a structure capable to effectuate a combined movement. This structure comprises a plate 150*g* having a pair of abutment ribs 152*g* and 154*g* bearing against the underside of the bridge. The plate further has a roller 156*g* forming a third support against the underside of the bridge and adapted to cooperate with a cam portion 158*g* formed by a depression in the bridge. A spring 160*g* is interposed between the bridge and an uppressed lip 162*g* in the plate 150*g* and serves to keep the parts in their mutual position. At the rear end of the plate 150*g* there is provided a keyhole-like aperture 164*g* for the passage of the lower end of the centre spindle 18*g* which is provided with a portion 19*g* of reduced diameter. The plate 150*g* has an upwardly extending end wall 168*g* that passes up through an arcuate aperture 70*g* in the bridge 50*g*. Above the bridge the member 150*g* has an arcuate arm 170*g* having one surface 170*a* of substantially concentric location relatively to the cam disc. This portion passes into a surface 170*b* eccentrically disposed relatively to the cam disc and then follows an inclined surface 170*c*. On the top of the cam disc 60*g* there is provided an abutment such as a roller 180*g* for moving the member 150*g* as will be described hereinafter.

When the cam disc rotates and the cam track follower has entered the cam track section 98*c* when using the phonograph as a record changer, the abutment roller 180*g* will be in a position to start engagement with the eccentric surface 170*b*. This surface is of such configuration that the engagement between the abutment roller and the surface will cause a movement of the member 150*g* which is as well a counterclockwise swinging about the centre spindle extending down through the keyhole 164*g* as a movement in the longitudinal direction in such a manner as to bring the narrow portion of the keyhole 164*g* to grip about the portion 19*g* of the spindle 18*g* having a reduced diameter. This will cause the roller 156*g* to run up on the cam 158*g* with the result that the spindle end will be pulled downwardly whereby the mechanism built into the centre spindle will cause the lowermost record to be released. After the releasing the structure is gradually freed by the passage of the engagement roller along the inclined surface 170*c*. The spring 160*g* which pulls in an inclined direction will then pull the entire structure back to the original position with the lower end of the spindle again released from the narrow portion of the keyhole 164*g*.

It will be appreciated that this mechanism is of great simplicity and does not require any critical mounting or a plurality of moving parts. Simultaneously it provides for a soft movement without any "clicks." It will be appreciated that this part of the mechanism also can be adapted easily to effectuate other kinds of movements such as for example a pure oscillation in case of the use of a centre spindle which has an eccentrically disposed lower end that requires a rotation in order to release the records from the magazine.

In other words it will be understood that this part of the mechanism can be adapted easily to be used in connection with any type of centre spindles known in the field.

While in the modification described with reference to FIGURES 12–23 the testing of the records takes place by moving the tone arm in a direction inwardly to engage the periphery of the lowermost record with the abutment on the tone arm, another modification is possible as shown in FIGURES 100–104. It has been found that when moving the tone arm for testing the size of the records in an inward direction it is rather critical to adjust the horizontal level in which the tone arm should travel in the event that different sizes of records should be played in mixed relationship so that according to the embodiments described it is most convenient to load the magazine with the largest size records in the bottom and then the decreased sizes towards the top of the stack of the records.

The embodiment illustrated in FIGS. 100–104 will, however, enable the records to be played safely irrespectively of the fact that they are in mixed relationship and moreover the specific embodiment enables any size of records to be played, also sizes that are not standard sizes.

The cam disc as shown in FIGURE 100 in plan view has a playing recess 280*g* and an exterior elevated section 286*g*. The playing recess terminates at an inclined wall portion 288*g*. As in the case of the preceding embodiment the lower end of the tone arm spindle is provided with a trip starter actuating arm 370*g* FIGURES 103 and 104 and a cam track follower 374*g* which can be swung relative to one another when overcoming the friction of the friction link. The cam track follower is designated by reference numeral 376*g* and its actuating spring by 378*g*. The trip starter actuating arm 370*g* is provided with an abutment 380*g* adapted to engage a guiding surface 390*g* on the cam disc. The abutment 380*g* does not extend into the playing recess 280g but is allowed to move freely over the surface of the cam disc until it engages the surface 390g that follows an inclined path and merges with the end wall 288g of the playing recess 280g near the entrance of the outlet 282g to form the playing recess 280g.

The end wall 288g as well as the guiding surface 290g serve to lead the tone arm in the inward direction.

From the outlet 282g there extends a cam track 292g. This cam track leads outwardly but is winding and composed of the following sections. First follows a track section 292a, which is substantially concentric with the cam disc. Then follows an inwardly leading section 292b, from which there is branched off a track $\mathbf{298g_1}$ corresponding to the track 98g in the cam disc of FIGURES 96 and 97. The cam track 292b further extends in an outwardly leading track portion 292c, the entrance to which is closed by a cam selector member $\mathbf{200g_1}$ corresponding to the plate 100 in the previous embodiment. Then follows again an inwardly leading track 292d, from which is branched off the same track $\mathbf{298g_1}$ as from the track 292b. Thereafter follows again an outwardly leading track portion 292e followed by an inwardly leading portion 292f, then again an outwardly leading portion 292g, an inwardly leading portion 292h, an outwardly leading portion 292i, and an inwardly leading portion 292k. At the end of either of the inwardly leading portions there is a track selection member corresponding to the track selection 100g in the previous embodiment and a branched-off track, in the present instance two, referred to as $\mathbf{298g_2}$ and $\mathbf{298g_3}$. For the sake of convenience there are arranged two track selector plates the other of which is referred to by $\mathbf{200g_2}$. The track selector plates are movable against the action of the springs in precisely the same manner as described in connection with the plate 100g in the previous embodiment. At either of the inwardly extending track portions the plates $\mathbf{200g_1}$ and $\mathbf{200g_2}$ are provided with concentric portions having a rib corresponding to the rib 116g. Also these inwardly extending portions have an inclined surface corresponding to the surface 112g defining therebehind a platform corresponding to the platform 144g. In either of the inlets to the outwardly leading track portions the plates $\mathbf{200g_1}$ and $\mathbf{200g_2}$ are provided with extensions or fingers corresponding to the finger 110g in FIGURE 96 so as to allow passage of the track follower from the platforms corresponding to the platform 114g over the top of the lip corresponding to the lip 110g down in the branched off track.

The oscillations effectuated by the movement of the track finder in the track generally designated by reference numeral 292g having the various oscillations or windings is so adapted that the tone arm when moving outwardly in this track will oscillate back and forth in a manner to cover the entire range of record sizes from the smallest to the largest.

The operation is substantially as follows:

When the cam disc is started, the tone arm will initially be raised from the surface of the record. Then, if incidentally the cam track follower 376g is near the abutment 380g, it will be the cam track follower that engages the end wall 288g of the playing recess 280g with the result that the tone arm will be swung outwardly. The level of the tone arm during the movement is slightly below the underside of the lower-most record in the magazine if the latter is loaded. If incidentally the parts are not in such a position, for example assume a position as shown in FIGURE 103, the cam track follower cannot hit the end wall 288g. In such case, however, the abutment 380g will hit the guiding surface 390g with the result that it will be that guiding surface which serves to move tthe tone arm inwardly. In this event the cam track follower 376g will hit the other end wall surface 288g of the playing recess 280g and as these two end walls are merging towards the outlet 282g of the playing recess, it will result in a relative initial adjustment of the cam track follower 376g and the abutment 380g which is the same as the relative initial adjustment of the trip starter operating arm 370g and the cam track follower arm 374g to the position shown in FIGURE 104.

Then in the cam track section 292a the tone arm is slightly outside the periphery of the record of the smallest size to be played. During the passage in this track the tone arm is raised to its top position. When the track follower is moved inwardly in the section 292b, the feeler action caused by engagement between the knob on the tone arm and the edge of a record will cover any size, for example between 20 and 17½ cm. When the knob on the tone arm engages the edge of the record of any size therebetween, the cam track follower will, as previously described, be pressed against the outer side of the track portion 292b and thereby be forced up on the platform corresponding to the platform 144g passing over the lip of the plate $\mathbf{200g_1}$ down in the initial part of the track portion $\mathbf{298g_1}$. If there is no record of this size, the tone arm will move a bit further out by passing the track follower through the section 292c. Then it will be moved inwardly again in the section 292d. This movement will cause the plate $\mathbf{200g_1}$ to be pushed back against the action of the spring corresponding to the spring 104g in the previous embodiment. The section 292d may for example cover the range between 22.5 and 20 cm. If there is any record in this range, the track follower will move in the same track $\mathbf{298g_1}$ as from the first section 292b. If there is no record in this range, the track follower will again push the plate $\mathbf{200g_1}$ back and move out in the track portion 292e, then in again in the track portion 292f, which may cover the interval between 25 and 22.5 cm. Then the track follower moves out in the section 292g, and then in the section 292h, which may cover the interval between 27.5 cm. and 25 cm. Then the track follower moves out in the section 292i, and then in again in the section 292k, which may cover the interval between 30 and 25 cm.

If there is no record at all in the magazine, the track follower will pass out in the most exterior cam track 296g, which is the stop control track corresponding to the track 96g in the previous embodiment.

It will be understood that by this arrangement the entire range of records between for example 17½ and 30 cm. will be covered, so that the record changer is capable to play any size of record therebetween.

It will be appreciated that it is not necessary to provide three track sections $\mathbf{298g_1}$, $\mathbf{298g_2}$ and $\mathbf{298g_3}$ as shown. When this has been adapted it is because of the necessity of moving the tone arm outside the periphery of the record after testing, while the drop control is operating. It is of course within the scope of the invention to have one track section only which in such event will cause a movement of the tone arm to a position outside the periphery of a record of the largest size to be played any time during the operation of the drop control.

It will further be appreciated that the constructions of phonographs and record changers as described herein provide for a far-reaching standardization of the parts so that the same parts can be utilized for making various types of phonographs and record changers. According to a preferred embodiment the cam disc is composed of a circular blank in the form of a pinion or the like. The various parts between which the cam tracks are formed are then in the form of stamped out parts that are secured to the top side of the blank by screws, rivets, spot welding or in any other convenient manner.

Thus it will be understood that the basic construction of the phonograph including the chassis turntable and the bridge as well as the tone arm is standard for a plurality of types of phonographs. In case of various individual types, it is necessary only to provide the cam disc with different configurations of tracks as per desire. Also the drop control mechanism can be individual and interchangeable so as to comply with the different requirements.

It will also be appreciated that as a result of this principle of standardizing, the phonograph can be adopted in connection with such type of phonograph in which the drop control is caused by the movement of the tone arm itself as described with reference to FIGURES 58–59.

It will further be understood that the invention is not limited to the embodiments described hereinbefore but that various modifications can be possible within the scope of the invention.

It will be appreciated that since the tone arm is biased against the underside of the stack of records and allowed to oscillate in an inward direction by passing through the inwardly leading track portions of the track 292*g*, it must be assured that the abutment 40*g* on the tone arm will not come into engagement with the next lowermost record of a size covered by any of the inwardly directed movements.

Therefore there is preferably provided according to the invention below the abutment 40*g* a guiding surface extending in the direction of the centre of the turntable so located that said guiding surface will prevent the abutment 40*g* from coming into engagement with any other records than the lowermost one.

How this can be arranged is indicated in FIGURES 105, 106 and 107.

Extending below the abutment 40*g* in substantially parallel relationship with the plane of the stack of records there is provided a surface 40*a* in such a plane below the top edge of the abutment 40*g* that will allow the latter to snap over the edge of the record and get into engagement therewith but will prevent the abutment from snapping up to such a level that it will engage the next lowermost record provided this would be possible during an inwardly directed movement of the tone arm.

As illustrated in FIGURES 105 and 106 the guiding surface 40*a* has no effect if there is such a substantial difference between the lowermost record *b* and the next lowermost record *a* that the difference will not be covered by an inwardly directed oscillation of the movement of the tone arm.

If, however, the lowermost record *b* and the next lowermost record *c* as shown in FIGURE 107 does not vary more in diameter than a range that will be covered by one inwardly directed movement of the tone arm, the surface 40*a* will prevent the tone arm from snapping up to such a level that it can engage the edge of the next lowermost record with the abutment 40*g* during the inwardly directed movement of the tone arm that will cover such a range within which both records *b* and *c* are lying.

It will be appreciated that the length of the surface 40*a* should be sufficient to provide this action during either of the oscillations of the tone arm in the inwardly leading track portions, i.e. the length of the surface 40*a* should be slightly more than the height through which the tone arm abutment passes during either of its inwardly directed movements.

I claim:

1. In a record changing phonograph having a tone arm the combination of non-retractable record size test means on said tone arm, an intermittently movable control mechanism including control means operable to move the tone arm, from its position after termination of the playing of a record to its correct start-of-play position selected from a plurality of start-of-play positions to initiate playing of a record, through an oscillating path consisting of a plurality of inwardly and outwardly leading paths correlating the swinging movements of the tone arm to different ranges of records of predetermined sizes while said record size test means is in engagement with the underside of the next record to be played, said control means operable to move the tone arm being provided with first means effectively producing said oscillating path of the tone arm and second means effectively producing a further travel path for the tone arm, and means operable in response to the engagement of said record size test means and said record edge during inward movement of said tone arm to selectively make said further travel path to respond to the size of said record tested.

2. A record changing phonograph for playing a plurality of records of different sizes comprising a rotatable turntable for supporting the records during the playing thereof, a spindle extending above said turntable and having a supporting means vertically spaced from said turntable to support a stack of records to be supplied successively from said supporting means to said turntable by a sidewardly directed displacement of the lowermost of said records in said stack, a tone arm movable in a path between each playing of a record, a playing member supported by said tone arm including stylus means to engage the sound track of a record during playing thereof, tone arm moving means movable between each playing of a record for controlling the movement of said tone arm between each playing of a record, an abutment member on the top of said tone arm, said tone arm moving means including means for moving the tone arm outwardly with said abutment along the surface of the lowermost record in said stack supported on said spindle, means for sequentially moving said tone arm inwardly in the edge orbit of a plurality of records of predetermined sizes with said abutment member in a plane operative to engage a record edge, means operable by such engagement between said abutment member and the edge of a record during inward movement of said tone arm to select the further travel path of said tone arm in response to the size of said record, means operable to move said tone arm with said abutment member in a further path to displace said record sufficiently in a sideward direction by said tone arm to relieve it from said supporting means, and means operable thereafter to set said stylus member substantially in the initial groove of said record.

3. As an article of manufacture adapted to be used in a phonograph, a record size feeler adapted to be secured to the top of a phonograph tone arm, comprising a supporting portion on said tone arm having a top surface and effectively provided with an aperture, a knob on said supporting portion and having at least an inclined front surface with the top edge thereof projecting beyond that of the bottom, said knob extending above said supporting portion, and a small roller on said supporting portion capable to rotate substantially without friction and having a part of its periphery extending up through said aperture with its periphery slightly above the top of said knob.

4. As an article of manufacture for a record changing phonograph having a tone arm and a cam track follower operatively connected therewith for playing a plurality of records of different sizes: a cam disc for controlling the movement of said tone arm by said cam track follower, said cam disk being provided with a cam configuration including a winding track having a plurality of sections sequentially leading outwardly from the center of the cam disk and inwardly towards the center thereof, at least one track section branched off near the end of at least one of said inwardly leading track sections, a playing recess which enables free movement of said track follower upon swinging movement of the tone arm during playing of a record communicating with said branched-off track section, and means operatively associated with said inwardly leading track section and said track follower and operable to effectively provide for the passage of said track follower from said inwardly leading track section to said branched-off track section.

5. A cam disc as claimed in claim 4 for use in connection with a cam track follower that is movable against resilient action substantially perpendicularly to the plane of said cam disc, wherein said last-mentioned means comprises means for providing an out-of-level crossing of said cam track follower over the entrance of at least one of said outwardly leading track sections into a corresponding one of said branched-off track sections.

6. A cam disc as claimed in claim 5, further comprising bridge means extending across at least a portion of the width of said one outwardly leading track section adjacent the entrance thereof, said bridge means being substantially in alignment with the entrance of said branched-off track section.

7. A cam disc as claimed in claim 6 in which said bridge means is movable against resilient action between a first position forming a bridge across the entrance of said outwardly leading track section and a second position providing passage through the entrance thereof.

8. A cam disc as claimed in claim 5, wherein said inwardly leading track section of said winding track is provided with an inclined exterior wall section.

9. A cam disc as claimed in claim 8, further comprising a swingingly arranged member movable on the surface of said cam disc outside said inclined wall portion of said inwardly leading track section, said member having an edge portion that at least along a part of its length is spaced from the top of said inclined wall portion so as to define a platform on the top of said cam disc between the top edge of said inclined wall portion and said edge portion of said member, and bridge means operable to provide a guiding surface from said platform across the entrance of the following outwardly leading track section into the branched-off track section adjacent the end of said inwardly leading track section.

10. A cam disc as claimed in claim 9 in which said swingingly arranged member is provided with a lip extending into the entrance of said outwardly leading track section and having its surface substantially in alignment with the top surface of the cam disc defining said platform.

11. A record changing phonograph for playing a plurality of records of different sizes, comprising a power driven turntable to support the records during the playing thereof, a spindle extending above said turntable and having a supporting means vertically spaced from said turntable to support a stack of records to be supplied selectively to said turntable, a tone arm movable in a path between each playing of a record and having a playing member comprising stylus means to engage the sound track of a record, means for controlling the movement of said tone arm between each playing of a record, record size feeler means on said tone arm including a low friction member extending above said tone arm and a trailer abutment slightly lower than said low friction member, said tone arm moving means including means for alternatively moving the tone arm outwardly along the surface of the lowermost record in said stack supported on said spindle with said low friction member biased thereagainst and inwardly to allow said trailer abutment to engage the edge of the lowermost record, if any, within a predetermined record size range covered by said inwardly directed movement, means operable by said engagement between said record feeler abutment and the edge of a record to select the further travel path of said tone arm in response to the size of said record, means operable after said selection to feed said lowermost record to the turntable, and means operable to thereafter set said stylus member substantially in the initial sound groove of said record.

12. In a record changing phonograph having a tone arm including stylus means, control means for moving said tone arm between each playing of a record, a power driven turntable, a support for a stack of records vertically spaced from said turntable, means for sequentially supplying the lowest record from said stack to a playing position supported on said turntable, comprising: a rotatable cam disc having cam means for controlling the horizontal movements of said tone arm, means for controlling the vertical movements of said tone arm, transmission means operatively connecting said tone arm with said cam means controlling said horizontal movement, said cam means controlling said horizontal movements having track means for moving the tone arm to effectuate a plurality of outwardly directed movements each followed by an inward movement while being in the raised position thereof, further track means operatively connected with a track portion of said first- mentioned track means effecting an inwardly directed movement and operable to land the tone arm in the correct start-of-play position on a record of predetermined size in response to engagement between said tone arm and the edge of said record, while in said stack, during inward movement of the tone arm, and means operatively associated with said cam disk and operable to effectively provide against outwardly and subsequently inwardly directed movements of said tone arm in the absence of any engagement between said tone arm and the edge of a record of said predetermined size.

13. A record size test arrangement for a record changing phonograph that includes horizontal and vertical control means operable to control vertical as well as horizontal movements of the tone arm between each playing of a record, said tone arm including an abutment projecting therefrom permanently, said vertical control means being operative to retain the tone arm substantially in the plane of the record to be tested during a test movement caused by said means controlling said horizontal movements, said control means operable to control the horizontal movements of the tone arm including means effectively guiding the tone arm through a plurality of alternate inward and outward movements, first means operatively associated with the control means operable to control said horizontal movements and operative to enable each of said inward movements to be completed and to be followed by a subsequent outward movement in case of absence of obstruction during any of said inward movements on the part of said tone arm, means effectively providing a further travel path, and means operatively associated with said control means operable to control said horizontal movements and operative to select said further travel path of said tone arm in the place of a subsequent outward movement thereof upon interruption of any of said inward movements.

14. Apparatus as claimed in claim 13, in which distance means is provided for keeping said abutment in spaced relationship from the surface of said record approximately until said abutment passes the edge of a record.

15. Apparatus as claimed in claim 13, in which resilient means is provided to cause said abutment to snap over the edge of a record during an outwardly directed movement, and in which further positioning means for the level of the tone arm during the subsequent inwardly directed movement is provided to cause said abutment to engage the edge of said record.

16. Apparatus as claimed in claim 14, in which said distance means is a light friction member adapted to roll on the surface of the record to be tested.

17. Apparatus as claimed in claim 13, in which said control means for said horizontal movements of said tone arm has control portions causing said inward movements to take place only in the edge orbit of records of a plurality of predetermined sizes, and in which transmission means is provided between said horizontal control means and said tone arm including a member fast with said tone arm.

18. Apparatus as claimed in claim 13, in which said control means for said horizontal movements of said tone arm includes a plurality of means for causing inward movements of a magnitude each covering a range between different sizes of records, and in which transmission means between said horizontal control means and said tone arm is provided including a member capable of yielding in essentially the horizontal direction relatively to said tone arm.

19. Apparatus as claimed in claim 18, further comprising means for presetting the initial position between said tone arm and said member capable of yielding in essentially the horizontal direction relatively thereto.

20. Apparatus as claimed in claim 13, in which said control means includes a cam disc having a track for controlling the horizontal movements of the tone arm during testing of a record that is composed of a plurality of sections capable of leading a cam track follower alternately inwards and outwards.

21. A control mechanism for a record changing phonograph having a tone arm comprising in combination a cam disc having a plurality of cam tracks, an arm connected with said tone arm and having a track follower to be guided in said tracks of said cam disc for causing swinging movement of said tone arm, resilient means allowing movement of said track follower in a direction substantially perpendicular to the plane of said cam disc, means operable to obstruct swinging movement of said tone arm as caused by guiding of said track follower in at least one of said tracks, one wall portion of at least one of said tracks being in the form of a ramp for causing said track follower to climb said ramp when the movement of the tone arm is obstructed and thereby to leave said track.

22. A record changing phonograph having a turntable, means for supporting a record in spaced relationship to said turntable, means for causing said record to be supplied to the turntable, an abutment on the tone arm and a control mechanism as claimed in claim 21 in which said cam disc in combination with means for raising the tone arm includes a track causing said track follower to be guided inwardly to swing the tone arm inwards to engage said abutment on the tone arm against the edge of said record supported on said turntable, a continuation track of said inwardly leading track beginning remote from the interior end of said inwardly leading track separated therefrom by an exposed surface portion of said cam disc, said inwardly leading track having its exterior wall in the form of a ramp adjacent its interior end for thereby causing said track follower to leave said inwardly leading track by climbing said ramp and to pass over said exposed surface portion of said cam disc to be deposited in said continuation track.

23. A record changing phonograph as claimed in claim 22, in which said inwardly leading track at its interior end continues in an outwardly leading track which extends between said exposed portion of said cam disc above said ramp at the beginning of said continuation track and in which bridge means is provided operable to guide said track follower from said exposed surface portion of said cam disc across the entrance to said outwardly leading track to be deposited in said continuation track.

24. A record changing phonograph as claimed in claim 23, including resilient means allowing said bridge means to yield whereby the entrance to said outwardly leading track portion is opened.

25. A record changing phonograph as claimed in claim 22, in which a plurality of inwardly leading track sections are provided in different distances from the centre of said cam disc and in which the interior end of each inwardly leading track through an outwardly leading track portion is connected with the exterior end of the next inwardly leading track whereby a winding track is defined, and that adjacent the interior end of each of said inwardly leading track portions a continuation track is provided and that further the entrance to each of said outwardly leading track portions is closed by a bridge member movable against resilient action to allow opening of the entrance to said outwardly leading track portion.

26. In a record changing apparatus having a tone arm including stylus means and a feeler abutment operable to engage the edge of the next record to be played for feeling the size thereof, a power driven turntable and supporting means for a stack of records above said turntable, means operable to release said records one by one to the turntable to be played by said stylus means in combination: a cam member rotatable between each playing of a record, tone arm lifting control means operable having a plurality of tracks for controlling swinging movement of the tone arm, tone arm swinging control means including a cam track follower operable to follow said cam tracks of said cam member, the track arrangement of said cam member including a recess in which said cam follower can move freely during playing of a record, a record size feeler track communicating with said recess and operable to control swinging movement of the tone arm to engage the feeler abutment thereof against the edge of the record whereby the swinging movement of the tone arm is interrupted, the track arrangement further including track means for swinging the tone arm outwardly to enable the record to be dropped and a landing track arrangement for swinging the tone arm inwardly, said landing track arrangement being timely operable with said lift means for causing the tone arm to be landed with its stylus means in the start-of-play position thereof, the track arrangement including at least one track having an outlet in the form of a ramp, means for supporting the track follower to climb said ramp with the interruption of the swinging movement of the tone arm in a position governed by the size of the record engaged determining the climbing of the ramp and the position of the track follower in its approach to the landing track in which it passes a surface of the cam member.

27. In a record changing phonograph having a turntable, a tone arm structure including a cam follower and a support for a stack of records above said turntable to be released from said support one by one comprising in combination: a cam disc having a feeler track operable to swing said tone arm to move a portion of said tone arm to engage the next record to be played for measuring the size thereof, said cam disc further including an outwardly leading track operable to swing the tone arm to an exterior position after measuring the size of the record during the part of the change cycle when the record is released onto the turntable, a landing track for thereafter moving the tone arm inwardly to be landed on the record in the correct start-of-play position depending on the size of the record measured, and a ramp forming an outlet from at least one of said tracks, and means enabling the track follower to yield to climb said ramp when the swinging movement of the tone arm is interrupted, the track follower climbing said ramp and passing an exposed surface portion of the cam disc behind said ramp at such radial distance from the centre of said cam disc as governed by the size of the record engaged.

28. In a phonograph having a tone arm and a control mechanism operable to swing said tone arm through a cycle including a cam disk having a plurality of track portions and a track follower structure including track follower means and connecting means operatively connecting said track follower means with said tone arm to control the swinging movement of said tone arm by guidance of said track follower means in the track portions of said cam disc, said cam disc including a first track portion and a second track portion operable in sequence to control swinging of said tone arm, said first and second track portions being effectively interconnected with each other by a surface portion in said cam disc, offset vertically with respect to said track portions, and a ramp leading from said first track portion to said surface portion, and said track follower structure being provided with means to enable said track follower means to yield and to thereby leave said first track portion by climbing said ramp and thereafter pass over said offset surface portion to said second track portion.

29. A record changing phonograph for playing a plurality of records of different sizes comprising in combination: a tone arm structure including abutment means and a tone arm spindle having a pivot axis, a track follower operatively connected with said tone arm spindle to swing about said pivot axis, a turntable for supporting records during the playing thereof, spindle means having supporting means for supporting a stack of records above said turntable, and release means adapted to release the records in sequence from said supporting means to said turntable, a control cycle mechanism including cam means having a plurality of cam portions, first means operable to actuate said release means in response to rotation of a first one of said cam portions, second means operable to raise and lower said tone arm in response to rotation of a second one of said cam portions, and third means effectively providing a plurality of start-of-play positions for a single control cycle including a third cam portion and said track follower and operable to swing said tone arm about said pivot axis through a control cycle consisting of a plurality of outward and subsequent inward movements in the edge orbit of records of different sizes with each inward movement being correlated substantially to a different range of record sizes to engage said abutment means with the peripheral portion of the next record to be released during the inward movements corresponding to the size of the record, if any, while said record is supported on said spindle means and to thereby provide for the start-of-play position for said tone arm corresponding to the size of the next record to be played.

30. In a record-changing phonograph for playing records of different sizes, in combination: a tone arm having stylus means and a feeler abutment extending non-retractably from the top side thereof, a cam track follower operatively connected to said tone arm, a turntable operable to support the records during playing thereof, means operable to support records above said turntable to be released in sequence so as to descend to said turntable, control means including means operable to raise and lower said tone arm between a position enabling said tone arm stylus means to engage a record supported on a turntable for playing said record and an upper position enabling said feeler abutment to engage a record supported on said support means above said turntable, said control means further including a cam member having track means operable to control the horizontal movements of said tone arm by said cam track follower, said track means including a winding track having a plurality of track sections sequentially leading outwardly and inwardly, each of said inwardly leading track sections being operable to move said tone arm inwardly to engage said feeler abutment on said tone arm with the edge of a record of a predetermined different size supported on said support means above said turntable, each of said outwardly leading track sections being operable to swing said tone arm outwardly to perform a subsequent inward movement under control of the next inwardly leading track section in the absence of any previous engagement between said feeler abutment and a record of a size correlated to the previous inwardly leading track, and means associated with said track follower and said cam disk and operable to swing said tone arm to the start-of-play position on a record engaged during one of said inwardly leading movements.

31. In a phonograph having a tone arm provided with a feeler abutment, a control mechanism having a cam disk and operable to swing said tone arm through a control cycle, and means operatively connecting said control mechanism with said tone arm, said control mechanism comprising first means effectively forming at least one inwardly leading track operable to swing said tone arm inwardly to engage said feeler abutment with the edge of a record of predetermined size, the exterior wall of said inwardly leading track being in the form of a ramp adjacent the inner end of said track, said connecting means including a track follower operable to climb said ramp in response to engagement between said feeler abutment and said record edge, second means forming a further track effectively interconnected with said inwardly leading track, third means including a surface portion in said cam disk operable to effectively provide a passage for said track follower to said further track after said track follower has climbed said ramp, fourth means effectively forming an outwardly leading track which communicates with the inner end of said inwardly leading track to guide said track follower outwardly, said third means including yieldable bridge means operable to yield to provide effectively a passage for said track follower through said outwardly leading track.

References Cited in the file of this patent

UNITED STATES PATENTS

| | | |
|---|---|---|
| 2,289,355 | Green | July 14, 1942 |
| 2,426,978 | Alexandersson | Sept. 9, 1947 |
| 2,498,333 | Faulkner | Feb. 21, 1950 |
| 2,521,990 | Metcalfe et al. | Sept. 12, 1950 |
| 2,529,474 | Stolberg | Nov. 7, 1950 |
| 2,570,040 | Thorens et al. | Oct. 2, 1951 |
| 2,628,843 | Comstock | Feb. 17, 1953 |
| 2,637,558 | Fisher | May 5, 1953 |
| 2,712,940 | MacDuff | July 12, 1955 |
| 2,818,263 | Dale | Dec. 31, 1957 |